(12) United States Patent
Rasmussen

(10) Patent No.: US 10,637,531 B2
(45) Date of Patent: Apr. 28, 2020

(54) EXTENDED RANGE COMMUNICATIONS FOR ULTRA-WIDEB AND NETWORK NODES

(71) Applicant: SIERRA NEVADA CORPORATION, Sparks, NV (US)

(72) Inventor: Donald Rasmussen, Sparks, NV (US)

(73) Assignee: SIERRA NEVADA CORPORATION, Sparks, NV (US)

( * ) Notice: Subject to any disclaimer, the term of this patent is extended or adjusted under 35 U.S.C. 154(b) by 0 days.

(21) Appl. No.: 16/289,041

(22) Filed: Feb. 28, 2019

(65) Prior Publication Data

US 2019/0199395 A1  Jun. 27, 2019

Related U.S. Application Data

(62) Division of application No. 15/803,220, filed on Nov. 3, 2017, now Pat. No. 10,263,661.

(Continued)

(51) Int. Cl.
*H04B 1/711* (2011.01)
*H04L 1/00* (2006.01)
(Continued)

(52) U.S. Cl.
CPC .......... *H04B 1/711* (2013.01); *H04B 1/1027* (2013.01); *H04B 1/7101* (2013.01); *H04B 1/713* (2013.01);
(Continued)

(58) Field of Classification Search
CPC ...... H04B 1/711; H04B 1/7101; H04B 1/713; H04B 1/1027; H04B 1/7095;
(Continued)

(56) References Cited

U.S. PATENT DOCUMENTS 5,355,371 A   10/1994  Auerbach et al.
5,852,630 A * 12/1998  Langberg ............ H04L 27/2647
                                                    375/219

(Continued)

FOREIGN PATENT DOCUMENTS

WO   WO-2016/100611 A1   6/2016

OTHER PUBLICATIONS

Agrawal, Amar. "Distributed Algorithms for Mobile Ad Hoc Networks." PowerPoint Presentation. Date last modified Apr. 19, 2005. 20 pages.

(Continued)

*Primary Examiner* — Siu M Lee
(74) *Attorney, Agent, or Firm* — Mintz Levin Cohn Ferris Glovsky and Popeo, P.C.

(57) ABSTRACT

A system is provided that can introduce data redundancy into wireless communications, and in particular ultra-wideband (UWB) wireless communications to increase the communication range when transmitting data that has low transmission rates. Multipath degradation, introduced by the extended communications range, can be mitigated by frequency hopping between the orthogonal frequency-division multiplexed symbols of the ultra-wideband waveform. Frequency hopping can place adjacent symbols in different frequency channels for filtering. Data redundancy can be expanded in the time domain and/or the frequency domain, resulting in extended range.

6 Claims, 22 Drawing Sheets

Related U.S. Application Data

(60) Provisional application No. 62/438,814, filed on Dec. 23, 2016, provisional application No. 62/438,831, filed on Dec. 23, 2016, provisional application No. 62/438,683, filed on Dec. 23, 2016.

(51) Int. Cl.
- H04B 1/713 (2011.01)
- H04B 1/10 (2006.01)
- H04B 1/71 (2011.01)
- H04L 1/18 (2006.01)
- H04L 1/08 (2006.01)
- H04B 1/7073 (2011.01)
- H04B 10/61 (2013.01)
- H04B 1/7095 (2011.01)
- H04B 1/7163 (2011.01)

(52) U.S. Cl.
CPC ............ *H04L 1/0002* (2013.01); *H04L 1/004* (2013.01); *H04L 1/0071* (2013.01); *H04L 1/08* (2013.01); *H04L 1/1819* (2013.01); *H04B 1/7073* (2013.01); *H04B 1/7095* (2013.01); *H04B 1/7163* (2013.01); *H04B 10/613* (2013.01)

(58) Field of Classification Search
CPC .. H04B 1/7063; H04B 1/7073; H04B 10/613; H04L 1/1819; H04L 1/08; H04L 1/004; H04L 1/0002; H04L 1/0071
See application file for complete search history.

(56) References Cited

U.S. PATENT DOCUMENTS

| | | |
|---|---|---|
| 6,072,795 A | 6/2000 | Poulter |
| 6,115,830 A | 9/2000 | Zabarsky et al. |
| 6,195,687 B1 | 2/2001 | Greaves et al. |
| 6,363,416 B1 | 3/2002 | Naeimi et al. |
| 6,638,218 B2 | 10/2003 | Bulat |
| 6,757,898 B1 | 6/2004 | Ilsen et al. |
| 6,801,943 B1 | 10/2004 | Pavan et al. |
| 6,839,541 B2 | 1/2005 | Alzoubi et al. |
| 6,889,338 B2 | 5/2005 | Srinivasan et al. |
| 6,993,587 B1 | 1/2006 | Basani et al. |
| 7,011,629 B2 | 3/2006 | Bulat |
| 7,058,367 B1* | 6/2006 | Luo ............... H04B 7/0669 455/101 |
| 7,264,590 B2 | 9/2007 | Casey et al. |
| 7,333,528 B1 | 2/2008 | Miao |
| 7,387,607 B2 | 6/2008 | Holt et al. |
| 7,421,578 B1 | 9/2008 | Huang et al. |
| 7,430,608 B2 | 9/2008 | Noonan et al. |
| 7,436,801 B1 | 10/2008 | Kanterakis |
| 7,451,221 B2 | 11/2008 | Basani et al. |
| 7,461,130 B1 | 12/2008 | Abdelaziz et al. |
| 7,532,585 B2 | 5/2009 | Kim et al. |
| 7,587,465 B1 | 9/2009 | Muchow |
| 7,590,550 B2 | 9/2009 | Schoenberg |
| 7,649,872 B2 | 1/2010 | Naghian et al. |
| 7,691,059 B2 | 4/2010 | Bulat |
| 7,801,030 B1 | 9/2010 | Aggarwal et al. |
| 7,970,633 B2 | 6/2011 | Bulat |
| 7,974,924 B2 | 7/2011 | Holla et al. |
| 8,126,728 B2 | 2/2012 | Dicks et al. |
| 8,126,729 B2 | 2/2012 | Dicks et al. |
| 8,126,730 B2 | 2/2012 | Dicks et al. |
| 8,131,564 B2 | 3/2012 | Dicks et al. |
| 8,131,565 B2 | 3/2012 | Dicks et al. |
| 8,131,566 B2 | 3/2012 | Dicks et al. |
| 8,140,356 B2 | 3/2012 | Dicks et al. |
| 8,155,982 B2 | 4/2012 | Dicks et al. |
| 8,214,489 B2 | 7/2012 | Ballette et al. |
| 8,225,015 B2 | 7/2012 | Gao-Saari et al. |
| 8,255,238 B2 | 8/2012 | Powell et al. |
| 8,260,709 B2 | 9/2012 | Holla et al. |
| 8,310,336 B2 | 11/2012 | Muhsin et al. |
| 8,380,631 B2 | 2/2013 | Dala et al. |
| 8,396,801 B1 | 3/2013 | Dala et al. |
| 8,396,802 B2 | 3/2013 | Dala et al. |
| 8,396,803 B1 | 3/2013 | Dala et al. |
| 8,396,804 B1 | 3/2013 | Dala et al. |
| 8,549,142 B2 | 10/2013 | Goose et al. |
| 8,583,958 B2 | 11/2013 | Surkov |
| 8,792,384 B2 | 7/2014 | Banerjee et al. |
| 8,908,537 B2 | 12/2014 | Fedyk et al. |
| 8,942,228 B1 | 1/2015 | Chen et al. |
| 9,031,070 B2 | 5/2015 | Mentze et al. |
| 9,391,805 B2* | 7/2016 | Wang ............... H04L 47/15 |
| 2003/0129993 A1 | 7/2003 | Overy et al. |
| 2003/0148767 A1 | 8/2003 | Sugaya et al. |
| 2003/0204625 A1 | 10/2003 | Cain |
| 2004/0233972 A1 | 11/2004 | Karaoguz |
| 2005/0094574 A1 | 5/2005 | Han et al. |
| 2005/0132154 A1 | 6/2005 | Rao et al. |
| 2005/0190818 A1 | 9/2005 | Sunaga et al. |
| 2005/0276255 A1 | 12/2005 | Aiello et al. |
| 2006/0125356 A1 | 6/2006 | Meek et al. |
| 2006/0221856 A1 | 10/2006 | Quiroz |
| 2006/0240777 A1 | 10/2006 | Ruuska |
| 2006/0253557 A1 | 11/2006 | Talayco et al. |
| 2007/0152837 A1 | 7/2007 | Bischoff et al. |
| 2007/0213600 A1 | 9/2007 | John et al. |
| 2007/0230594 A1 | 10/2007 | Mo et al. |
| 2008/0052127 A1 | 2/2008 | Rosenfeld et al. |
| 2008/0065416 A1 | 3/2008 | Mazar et al. |
| 2008/0086658 A1 | 4/2008 | Takahasi |
| 2008/0088437 A1 | 4/2008 | Aninye et al. |
| 2008/0144493 A1 | 6/2008 | Yeh |
| 2008/0288646 A1 | 11/2008 | Hasha et al. |
| 2009/0088607 A1 | 4/2009 | Muraca |
| 2009/0257475 A1 | 10/2009 | Haque et al. |
| 2009/0292555 A1 | 11/2009 | Brown |
| 2010/0142409 A1 | 6/2010 | Fallon et al. |
| 2010/0318699 A1 | 12/2010 | Gao-Saari et al. |
| 2010/0329317 A1* | 12/2010 | Tzannes ............... H04L 1/0025 375/222 |
| 2011/0051906 A1* | 3/2011 | Cioffi ............... H04B 3/32 379/32.04 |
| 2011/0081858 A1 | 4/2011 | Tolentino et al. |
| 2011/0196965 A1 | 8/2011 | Romero et al. |
| 2012/0047133 A1 | 2/2012 | Wang |
| 2012/0124412 A1 | 5/2012 | Surkov |
| 2012/0173281 A1 | 7/2012 | DiLella et al. |
| 2013/0170499 A1 | 7/2013 | Ramanujan et al. |
| 2013/0191688 A1 | 7/2013 | Agarwal et al. |
| 2013/0218588 A1 | 8/2013 | Kehr et al. |
| 2014/0181027 A1 | 6/2014 | Whitehead et al. |
| 2014/0210616 A1 | 7/2014 | Ramachandran |
| 2014/0298091 A1 | 10/2014 | Carlen et al. |
| 2014/0301431 A1 | 10/2014 | Nair et al. |
| 2014/0303994 A1 | 10/2014 | Johnson |
| 2014/0330582 A1 | 11/2014 | Tong et al. |
| 2014/0330584 A1 | 11/2014 | Pillers et al. |
| 2015/0033295 A1 | 1/2015 | Huster |
| 2015/0319226 A1 | 11/2015 | Mahmood |
| 2016/0037386 A1* | 2/2016 | Pitchaiah ............... H04W 28/20 709/226 |
| 2016/0156502 A1 | 6/2016 | Fugitt et al. |
| 2016/0380778 A1 | 12/2016 | Shen et al. |
| 2017/0027436 A1* | 2/2017 | Lee ............... A61B 3/032 |
| 2017/0063731 A1 | 3/2017 | Muller et al. |
| 2017/0063965 A1 | 3/2017 | Grenader |
| 2017/0116289 A1 | 4/2017 | Deshmukh et al. |
| 2017/0126603 A1 | 5/2017 | Chen et al. |
| 2017/0222877 A1 | 8/2017 | Sagot et al. |
| 2018/0004908 A1 | 1/2018 | Barrus et al. |
| 2018/0034904 A1 | 2/2018 | Roy et al. |
| 2018/0054219 A1 | 2/2018 | Qian et al. |
| 2018/0059754 A1 | 3/2018 | Shaikh et al. |
| 2018/0091588 A1 | 3/2018 | Qin et al. |
| 2018/0097845 A1 | 4/2018 | Chen et al. |
| 2018/0183489 A1 | 6/2018 | Rasmussen |

(56) References Cited

U.S. PATENT DOCUMENTS

2018/0183656 A1 6/2018 Jones
2018/0262401 A1 9/2018 Shah et al.
2018/0331940 A1 11/2018 Jadhav et al.

OTHER PUBLICATIONS

Al Shayeji, Mohammad, et. al. "Analysis and Enhancements of Leader Elections Algorithms in Mobile Ad Hoc Networks." *ACEEE International Journal of Network Security* vol. 2, No. 4, (2011), 5 pages.

Chandra, Ranveer, et. al. "Anonymous Gossip: Improving Multicast Reliability in Mobile Ad-Hoc Networks." *21st International Conference on Distributed Computing Systems*, (2001), Mesa, AZ. pp. 275-283. 9 pages.

Chung, Hyun, et. al. "Optimal Regional Consecutive Leader Election in Mobile Ad-Hoc Networks." *2011 Proceedings of the 7th ACM SIGACT/SIGMOBILE International Workshop on Foundations of Mobile Computing*, New York, NY. (2011), pp. 52-61. 17 pages.

Comstock, Jonah. "American Well sues Teladoc for alleged patent infringement." Mobilehealthnews.com. Jun. 8, 2015. Web. Retrieved Jun. 29, 2015. 2 pages. Source URL: http://mobihealthnews.com/44163/american-well-sues-teladoc-for-alleged-patent-infringement/.

Jayapal, Cynthia and Sumathi Vembu. "Adaptive Service Discovery Protocol for Mobile Ad Hoc Networks." *European Journal of Scientific Research*, vol. 49, No. 1, (2011), pp. 6-17.

Malpani, Navneet, et. al. "Leader Election Algorithms for Mobile Ad Hoc Networks." *2000 Proceedings of the 4th International Workshop on Discrete Algorithms and Methods for Mobile Computing and Communications*. (2000), pp. 96-103. 8 pages.

Melit, Leila and Nadjib Badache. "A Highly Adaptive Leader Election Algorithm for Mobile Ad Hoc Networks." *International Conference on Advanced Aspects of Software Engineering ICAASE*, Nov. 2-4, 2014, Constantine, Algeria. (2014), pp. 181-184.

Singh, Anu, et. al. "A Process Calculus for Mobile Ad Hoc Networks." *Science of Computer Programming*, vol. 75 No. 6, (2010), pp. 440-469. 19 pages.

Toner, Stephen and Donal O'Mahony. "Self-Organising Node Address Management in Ad-hoc Networks." *Personal Wireless Communications*,(2003), Lecture Notes in Computer Science, vol. 2775., pp. 476-483. 6 pages.

Vasudevan, Sudarshan, et. al. "Design and Analysis of a Leader Election Algorithm for Mobile Ad Hoc Networks." *2004 Proceedings of the 12th IEEE International Conference on Network Protocols*, Washington, DC. (2004), pp. 350-360. 11 pages.

Vasudevan, Sudarshan, et. al. "Secure Leader Election in Wireless Ad Hoc Networks" Umass Computer Science Technical Report 01-50, (2001). 31 pages.

* cited by examiner

EXTENDED RANGE COMMUNICATIONS FOR ULTRA-WIDEB AND NETWORK NODES

CROSS-REFERENCE TO RELATED APPLICATIONS

This is a division of U.S. patent application Ser. No. 15/803,220, titled "Extended Range Communications for Ultra-Wideband Network Nodes," filed on Nov. 3, 2017, which claims priority to and the benefit of U.S. Provisional Patent Application No. 62/438,683, titled "UWB Extended Range Communications for Patient Care Devices," and filed on Dec. 23, 2016, U.S. Provisional Patent Application No. 62/438,831, titled "Estimation of Interference in Wireless Communications," and filed on Dec. 23, 2016, and U.S. Provisional Patent Application No. 62/438,814, titled "Burst Rate Selection for Ultra-Wideband Communication," and filed on Dec. 23, 2016, the disclosures of which are incorporated herein by reference in their entireties for all purposes.

TECHNICAL FIELD

The subject matter described herein relates to interference estimation, burst data rate control, multipath degradation mitigation, enhanced data message structuring and data spreading to wireless communication for robust data communications supporting various data rate transmissions to nodes within the wireless communications network.

BACKGROUND

In communication networks, wireless signals can be influenced by interference and multipath which can distort the signals received by a receiver, causing a change in the data, or a failure of the data to be properly transmitted to the receiver. The receipt of distorted signals at a first network node from a second network node can require (1) a transmission of a failure message being sent from the first network node to the second network node, and (2) retransmission of the data. Retransmitting data can be inefficient and increase the network traffic producing additional interference within the communications network.

SUMMARY

In one aspect, the presently described subject matter is directed to a data system. The system can include one or more of the following components. Examples of the components can include a data generator configured to at least generate data. A spreading code generator can be provided that is configured to at least generate a spreading sequence for the data. A signal generator can be provided that is configured to at least generate an ultra-wideband modulated signal of the data for transmission. A direct sequence spread signal generator can be provided that is configured to at least generate a direct sequence spread signal by combining the spreading sequence to the data. A signal modulator can be provided that is configured to at least map the spread data to one or more signal elements of the ultra-wideband signal. A transmitter can be provided that is configured to at least transmit the direct sequence spread signal elements of the ultra-wideband signal.

In some non-limiting variations, one or more of the following components can be included in the system. A data cipher can be provided that is configured to at least encrypt the data. A chip cipher can be provided that is configured to at least encrypt the direct sequence spread signal.

In some variations, the spreading sequence can be a time-based spreading sequence that spreads the data. The time-based spread data sequence can comprise a sequence of chips and the direct sequence spread signal generator can be configured to at least interleave the sequence of chips that are mapped into modulation symbols in the ultra-wideband signal.

The spreading code generator can be configured to at least change a start location for the spreading sequence of each symbol in the data. The direct spreading sequence can be spread across some or all the subcarriers of the ultra-wideband signal. The ultra-wideband signal can comprise multiple subcarriers and the spreading sequence can be spread across some or all the multiple subcarriers. In some variations, the spreading code generator can comprise a time-based spreading code generator for generating a time-based spreading sequence. The spreading code generator can comprise a frequency-based spreading code generator for generating a frequency-based spreading sequence.

In one aspect a method is provided. The method can include one or more operations. The one or more operations can include generating data representative of information generated by one or more input devices. A spreading sequence can be generated. An ultra-wideband signal of the data can be generated. A direct sequence spread signal can be generated by combing the spreading sequence to the ultra-wideband carrier signal. The direct sequence spread signal can be transmitted.

In some non-limiting examples, one or more of the following operations can be added. The data can be encrypted. The direct sequence spread signal can be encrypted. The spreading sequence can be a time-based spreading sequence. The time-based spreading sequence can comprise a sequence of chips. The operation can include interleaving the sequence of chips mapped into modulation symbols in the ultra-wideband signal.

A start location for the spreading sequence for each symbol in the data can be changed. The spreading sequence can be a frequency-based spreading sequence. The ultra-wideband signal can comprise multiple subcarriers and the spreading sequence can be spread across the multiple sub carriers.

In one aspect, a system is provided that is configured for introducing data redundancy into wireless communications, and in particular ultra-wideband (UWB) wireless communications to increase the communication range and combatting multipath degradation when transmitting data that operates at lower transmission rates.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. In addition, computer systems may include Field-Programmable Gate Arrays (FPGAs) or custom Application Specific Integrated Circuits (ASICs) that may implement sections or the entire design of the current subject matter. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a telemedicine system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
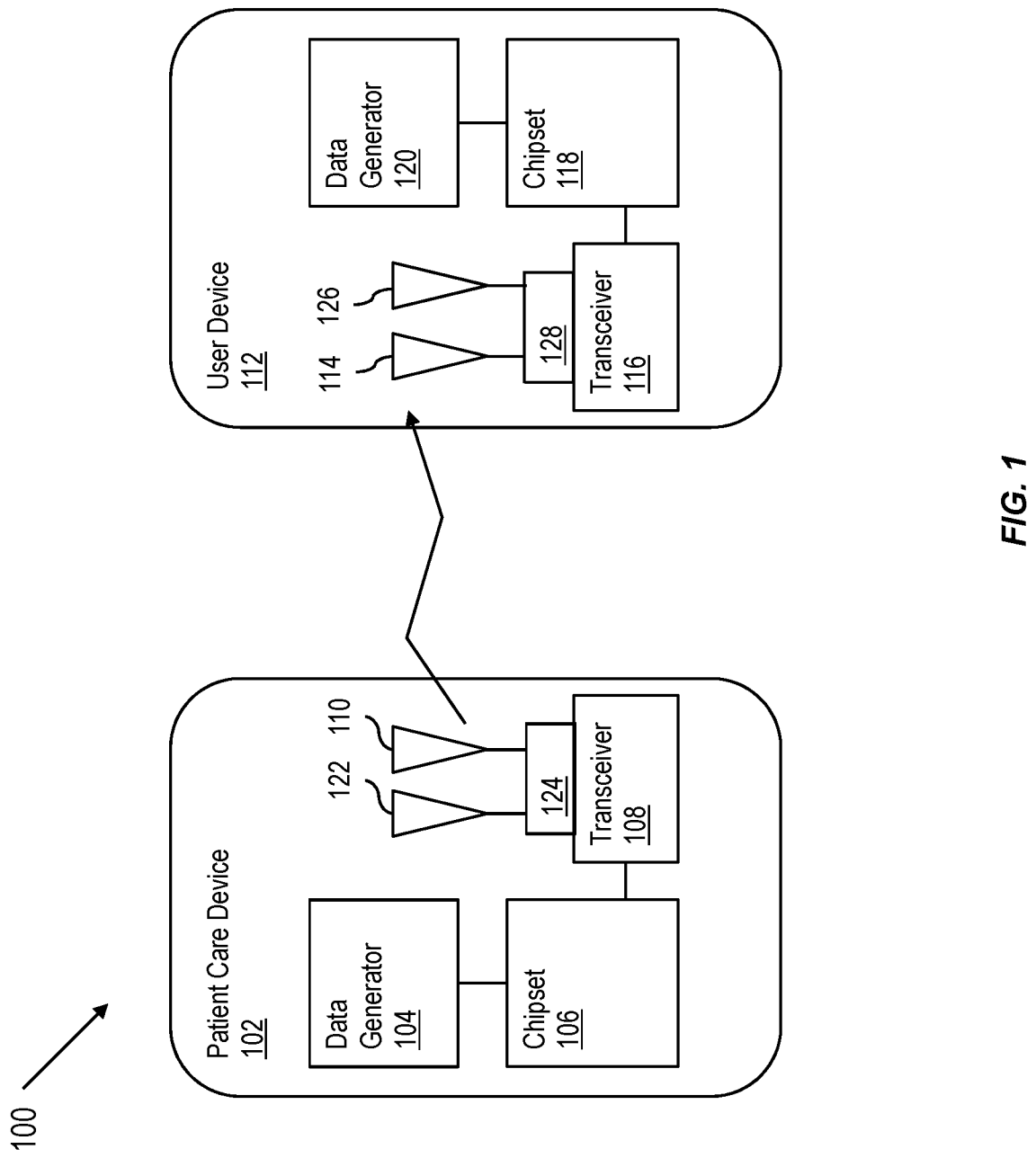
FIG. 1 is an illustration of a system having one or more features consistent with the presently described subject matter.

Retransmitting data can be inefficient and increase the network traffic producing additional interference within the communications network. Efficient sensing and characterization of the communications channels between the different network nodes along with the data throughput requirement provide the key parameters for proper selection of data burst rate and whether to spread the data for robust communications. Continuous channel monitoring enables transmission parameters to be modified to support the changing channel conditions versus interference, multipath, communications range, and network topology. Known data throughput requirements for different network node connections can be used to minimize the selection range of the transmission parameters and/or the assignment of different communications channel for supporting higher and lower data throughput requirements. Lower data throughput requirements enable more redundancy though data spreading to be added to the ultra-wideband (UWB) wireless communications signal for extended communications, multipath mitigation, and/or increased communications link margin. Higher data throughput requirement for transmissions like video require high burst data rate that can be achieved by selection of the an independent UWB channel with the estimated lowest interference from measured channel data that is independent from the lower burst data rate UWB channel.

The range of ultra-wideband (UWB) signals can be increased by increasing the transmission power of the ultra-wideband signal. Alternatively, the range of ultra-wideband signals can be extended by adding data redundancy to the ultra-wideband signals. Adding data redundancy requires transmitting the same data packet multiple times. If a data packet becomes corrupted during transmission, a duplicate data packet will be shortly received that can be appropriately combined with the corrupted data packet for proper reception of the transmitted data. Transmitting the same data packet multiple times can make the ultra-wideband signal more susceptible to being intercepted and possibly be exploited by a third-party. Similarly, increasing the transmission power of a signal, to increase the likelihood that the signal reaches its destination, can also increase the likelihood that the signal will be intercepted by a third-party.

In some examples, multipath degradation, introduced by the extended communications range, can be mitigated by frequency hopping between the orthogonal frequency-divisional multiplexed (OFDM) symbols. Frequency hopping places adjacent symbols in different frequency channels for filtering. For example, multiband orthogonal frequency-divisional multiplexing (MB-OFDM) can provide a limited maximum data redundancy of 4, which corresponds to 2 of the same symbol in both the time (on a different symbol) and frequency (on different sub-carrier on the same symbol) domain. By placing the same symbol on different sub-carriers mitigates performance degradations introduced by frequency nulls in the channel introduced by multipath destructive interference. This approach can be expanded by increasing the redundancy in both the time and frequency domain resulting in extended range at the expense of reducing the data throughput capability.

Presently described is an approach to increase the data redundancy of a transmission of an ultra-wideband waveform, while avoiding the transmission of the same redundant data multiple times. This approach can increase data redundancy while not increasing the likelihood that the signal will be intercepted by a third-party.

In some variations, the presently described subject matter can include a direct sequence spreading technique to be applied to the signal prior to the signal being modulated across multiple sub-carrier frequencies. For example, the signal can be the subject of a direct spreading technique prior to being subject to an orthogonal frequency division multiplexing (OFDM) process.

An alternative or complementary approach to increase the data redundancy of a transmission of an ultra-wideband waveform, while avoiding transmission of the same redundant data multiple times, can include subjecting the signal to an OFDM data spreading technique that is implemented prior to encrypting the data. Some typical direct-sequence spreading techniques increase the signal bandwidth by multiplying a data modulation of the signal by a higher chip-rate. However this will increase the signal bandwidth. The presently described OFDM data spreading technique can require spreading the data and then mapping the spread data into the OFDM signal. The presently described OFDM data spreading technique can maintain the same ultra-wideband signal bandwidth at a reduced data rate. In some variations, such a spreading approach may require a modification to the standard ultra-wideband MB-OFDM transmitter/receiver architecture. In some examples, this modification can be implemented in a Software Defined Radio (SDR), Field Programmable Gate Array (FPGA) design, chipset, or the like. For chipset implementation using existing UWB chipsets, for example, the data spreading may be done prior to data encryption, in the transmitter, and the despreading may be done after data decryption, in the receiver.

In digital communications, symbol rate, which can also be known as baud rate and modulation rate, is the number of symbol changes, waveform changes, or signaling events, across the transmission medium per time unit using a digitally modulated signal or a line code. Each symbol can represent or convey one or several bits of data. In some implementations, increasing data redundancy can include repeating symbols in the time and/or frequency domain. Repeating symbols in the time and/or frequency domain can include adding a spreading sequence to the symbols.

Many data communication systems use a modulated carrier signal to transfer data. For example, the frequency of a tone can be varied among a set of possible values. In synchronous data communication systems, the frequency of a tone can only be modified at fixed intervals. The presence of one particular frequency during one of these fixed intervals constitutes a symbol. In a modulated communication system, the term "modulation rate" can be used synonymously with the term "symbol rate."

In radio-frequency communications, spread-spectrum techniques can be methods by which a signal generated with a particular bandwidth can be spread in the frequency domain, resulting in a signal with a wider bandwidth. Spreading in the frequency domain can occur in technologies that aid in the security of the signal, increase resistance to natural interference of the signal, increase noise, increase jamming, to prevent detection of the signal or to limit power flux density. For example, spread spectrum can use a noise-like signal structure to spread a narrowband information signal over a wide band of frequencies. A receiver in such a system can be configured to correlate the received signals to retrieve the original information signal.

Frequency-hoping spread spectrum can include switching a carrier among many frequency channels when transmitting radio frequency signals. In some variations, the switching of the carrier among many frequency channels can be performed using a pseudorandom sequence that is known to both the transmitter and the receiver of the radio frequency communication system. Interference and/or multipath null at a particular frequency will likely only affect that particular frequency in the transmission, allowing all other transmissions to be communicated properly. Where the same data is carried at multiple frequencies, a full data set can be received without the need to retransmit the data.

Time-hoping spread spectrum can include changing the transmission time of a signal. The transmission time can be changed randomly by varying the period and duty cycle of a pulse (carrier) using a pseudo-random sequence. Each part of the transmitted data communication will have intermittent start and stop times.

Direct-sequence spread spectrum is a transmission method that modulates the signal. A modulation scheme can be employed to modulate a bit sequence. The bit sequence can be known as a Pseudo Noise code. The Pseudo Noise code can include a radio pulse that is much shorter in duration (with a larger bandwidth) than the original signal. The modulation of the signal scrambles and spreads the pieces of data throughout the transmission.

In wireless communications, multipath is the phenomenon that results in radio signals reaching the receiver via two or more paths. Multipath can cause multipath interference, including constructive interference, destructive interference, and phase shifting. This can distort the data packets transmitted on the signal.

To mitigate OFDM symbol degradation caused by multipath interference for the extended range communications, the frequency hopping capability per Fourier Frequency Transform (FFT) block is implemented on the UWB waveform for the different data redundancy approaches.

For some patient care devices, the data rate required for wireless transmission of medical data from the patient care device to a user device of a medic or health provider can be less than 2.5 kbps. A low data rate, such as 2.5 kbps, can allow for the extension of the communications range by increasing the data redundancy in the ultra-wideband (UWB) multi-band orthogonal frequency division multiplexing (MB-OFDM) waveform, instead of increasing the transmission power. Methods for increasing data redundancy in the ultra-wideband waveform can include repeating symbols in both the time and frequency domain, adding a spreading sequence to the symbols, using coherent symbol combining of the despread symbols before the error correction process or majority logic detection of redundant bits after the error correction process, or the like.

Coherent symbol combining provides the largest processing gain by adding the despread chips of a symbol together before making a symbol decision. To achieve this higher processing gain, the signal is demodulated using a coherent receiver that tracks the frequency and phase of the receiver signal. In addition, the receiver needs the added hardware complexity to sum the despreaded symbol components that are placed on different OFDM subcarriers using frequency domain spreading (FDS) and/or across different OFDM symbols using time domain spreading (TDS). The receiver given in FIG. 4 and FIG. 5 use coherent symbol combining to maximize the processing gain of the receiver.

In error detection and correction, majority logic decoding is a method to decode repetition symbols. The decoding of the repetition symbols can be based on the assumption that the largest number of occurrences of a particular symbol was the intended transmitted symbol. The receiver given in FIG. 6 uses majority logic decoding to achieve processing gain for the received signal.

FIG. 1 is an illustration of a system 100 having one or more features consistent with the presently described subject matter. The system 100 can include one or more patient care devices 102. A patient care device 102 can be a wireless device capable of taking medical readings of a patient, control the administering of medications to a patient, or the like. A patient care device 102 can include an electrocardiogram, a heartrate monitor, a blood oxygen monitor, a blood pressure monitor, a thermometer, a glucose monitor, a syringe pump, a scale, a temperature regulator, or the like.

The patient care device 102 can include a data generator 104. The data generator 104 can include one or more components of the patient care device 102 that is configured to monitor one or more of a state of a patient, send an alert based on a patient failing condition, a state of the patient care device 102, or the like. The data generator 104 can be configured to generate data associated with the monitoring of the one or more of a state of a patient, a state of the patient care device 102, or the like.

The patient care device 102 can include a chipset 106. The chipset 106 can be configured to perform one or more of the functions of the presently described subject matter. For example, the chipset 106 can be configured to support data spreading, data encryption, data decryption, data modulation, carrier signal generation, or the like.

The patient care device 102 can include a transceiver 108. The transceiver 108 can include a data transmitter and/or a data receiver. The transceiver 108 can be configured to generate a radio waveform based on an input from the chipset 106.

The patient care device 102 can include an antenna 110. The antenna 110 can be configured to convert electrical power received from the transceiver 108 into radio waves, and vice versa. In transmission, the transceiver 108 can supply a radio waveform to one or more terminals of the antenna 110. The antenna 110 can be configured to radiate the energy generated by the transceiver 108 in electromagnetic waves. In reception, the antenna 110 can be configured to intercept at least part of the power of an electromagnetic wave and produce a voltage at one or more terminals of the antenna 110. The antenna 110 and/or the transceiver 108 can include an amplifier configured to amplify the voltage produced at the one or more terminals of the antenna 110.

The system 100 can include one or more user devices 112. The user device 112 can be a device used by a medical provider. The user device 112 can be configured to receive data from one or more patient care devices 102. The user device 112 can include one or more display devices configured to present information to a user of the user device 112.

The user device 112 can comprise an antenna 114. The antenna 114 can be configured to detect at least a part of the power of electromagnetic waves generated by the antenna 110 of the patient care device(s) 102. The antenna 112 can perform similar functions as the antenna 110 of the patient care device 102. The user device 112 can comprise a transceiver 116. The transceiver 116 can perform one or more functions similar to the transceiver 108 of the patient care device 102. The user device 112 can comprise a chipset 118. The chipset 118 can be configured to perform one or more similar functions to the chipset 106 of the patient care device 102. The user device 112 can include a data generator 120. The data generator 120 can be configured to convert data from the chipset 118 into data that can be presented on a display of the user device 112. The data generator 120 can be configured to receive data representative of an input or instruction from the user of the user device 112 and pass the data to the chipset 118 for manipulation and eventual transmission by the transceiver 116.

In some variations, the patient care device 102 can comprise a second antenna 122. The second antenna 122 can comprise a higher gain antenna. The higher gain antenna may be used only during reception of signals, for example, signals transmitted by the user device 112. The patient care device 102 may comprise a radio frequency switch 124. The radio frequency switch 124 can be configured to cause the transceiver 108 to connect to the appropriate antenna for transmission and reception paths of the patient care device 102. Similarly, the user device 112 can comprise a second antenna 126. The second antenna 126 can comprise a higher gain antenna used only during reception of signals, for example, signals transmitted by one or more patient care devices 102. The user device 112 can comprise a radio frequency switch 128 configured to cause the transceiver 116 to connect to the appropriate antenna for transmission and reception paths of the user device 112. In some variations, the patient care device 102 and the user device 112 can comprise multiple transceivers, one for each antenna.

Two transceivers in the user device 112 can enable the user device to setup two networks on different independent UWB channels for implementing independent higher and lower data throughput channels for connection with various devices. The higher data throughput channel supports video transmissions over shorter communications distances. The lower data throughput supports lower data throughput transmissions from and to multiple patient care devices 102 over longer communications distances with higher channel interference and multipath channel degradations.

Although the components of the patient care device 102 and the user device 112 are illustrated as separate components, this is for illustrative purposes only. The components of the patient care device 102 and the user device 112 can be provided, for example, as a single integrated circuit, as two or more integrated circuits, as separate integrated circuits, software defined radio architecture, Field Programmable Gate Array (FPGA) design, a combination of hardware and software design elements or the like.

Figure 2:
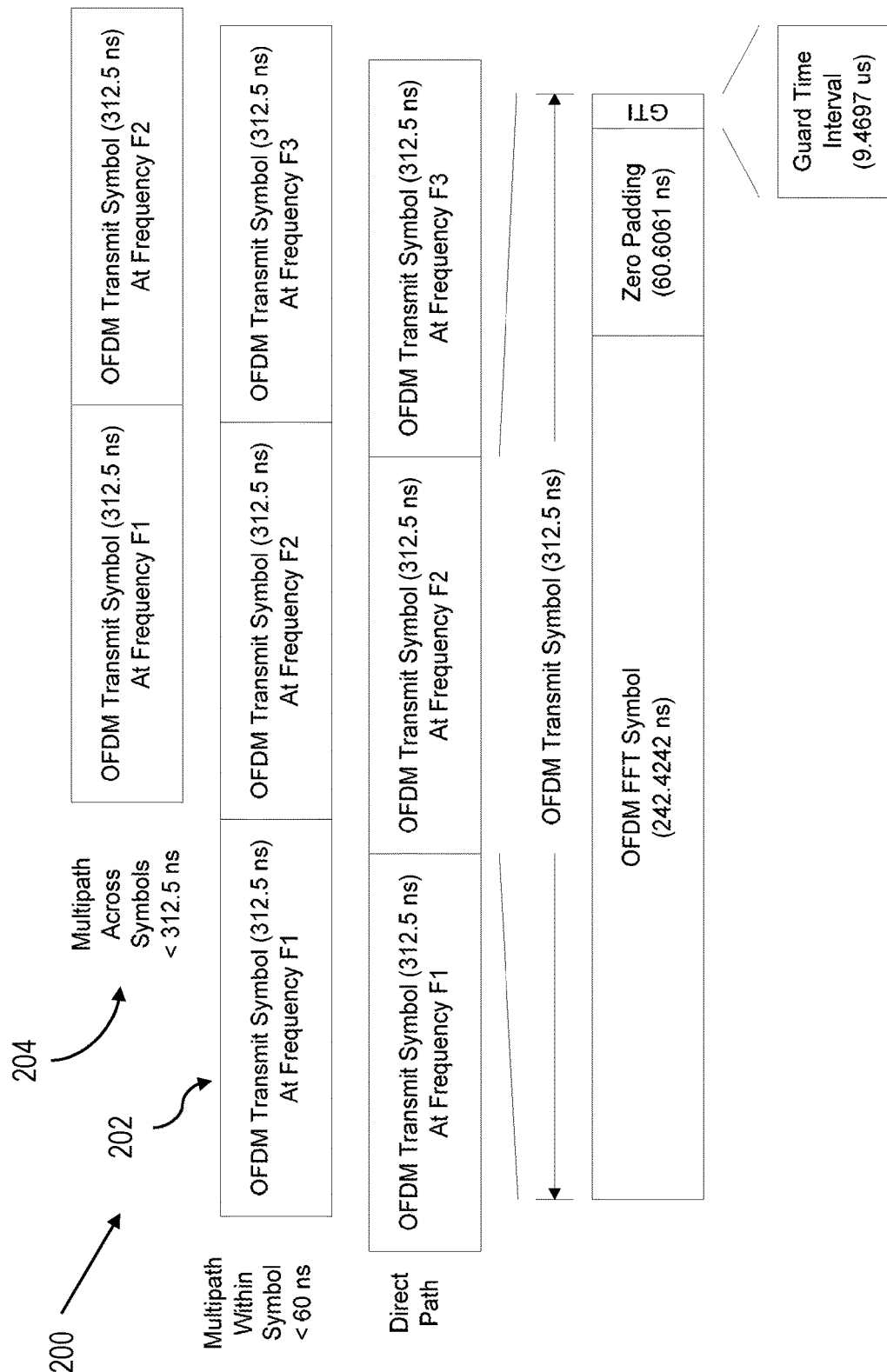
FIG. 2 is an illustration of impact of different multipath signal delays on the reception of an orthogonal frequency division multiplexing signal generated by a device having one or more features consistent with the presently described subject matter.

FIG. 2 is an illustration of a signal 200 generated by a device having one or more features consistent with the presently described subject matter. FIG. 2 shows a typical ultra-wide band (UWB) multi-band orthogonal frequency-division multiplexing (MB-OFDM) transmit signal having two different multipath delay conditions with respect to the direct path, the direct path being, for example, the path taken directly between the patient care device 102 and the user device 112. The signal 200 may be subject to multipath delays. For multipath delays less than 60 ns, referred to multipath delay within an OFDM symbol 202, the multipath signal can fall within the zero padding section of the signal 200. For multipath delays greater than 312.5 ns, referred to multipath delay across OFDM symbols 204, the multipath signal can fall with the boundary of the next adjacent OFDM symbol. As shown in FIG. 2, frequency hopping to a different carrier frequency (corresponding to a different UWB channel) can place the multipath signal, delayed greater than 312.5 ns, at a different carrier frequency (corresponding to a different UWB channel) than the direct path, thus enabling the receiver to filter out the multipath signal. For the multipath delay less than 60 ns, the channel estimation algorithm can be configured to determine the channel effects and can maximize the receiver detection using both the direct and multipath signal. In addition, data spreading can be applied to the UWB waveform if it supports the required data throughput to help mitigate the multipath degradation.

For multipath delays greater than 60 ns, the channel estimation can be configured to operate on the direct path signal only, and frequency hopping can be used to cause the symbol delayed greater than 60 ns to be transmitted on a different carrier frequency than the direct path, thus enabling the receiver to filter out the multipath signal. If frequency hopping did not occur, for multipath delays greater than 60 ns, the previous OFDM symbol may be in the same detection window as the present OFDM symbol. If these OFDM symbols operated at the same carrier frequency (UWB channel), the previous OFDM symbol would interfere and degrade the detection of the present OFDM symbol. However, since these OFDM symbols are at different carrier frequencies, filtering provides rejection of the previous OFDM symbol to mitigate receiver degradation. On such situations, the channel estimation algorithm can provide no signal improvement by using the multipath signal.

Table 1 shows examples of available frequency channels for ultra-wideband band group 3, 4, 5 and 6. For each UWB channel, the signal bandwidth is 528 MHz, which correspond to the difference between the upper and lower channel frequency. In addition, the center frequencies are separated by 528 MHz. In the example shown in Table 1, three channels are available for use in ultra-wideband band groups 3, 4 and 6, while only two frequency channels are available in ultra-wideband band group 5. Table 2 shows single or frequency hopping channels within a band group, defined by the Time Frequency Code (TFC). The UWB band numbers defining the channels used for the hopping sequences are related to the channels defined in Table 1.

TABLE 1

Band Group Operational Frequencies

| UWB Band Group | UWB Band Number | Channel Frequencies (MHz) | | |
|---|---|---|---|---|
| | | Center Freq | Lower Freq | Upper Freq |
| 3 | 7 | 6600 | 6336 | 6864 |
| | 8 | 7128 | 6864 | 7392 |
| | 9 | 7656 | 7392 | 7920 |
| 4   6 | 10 | 8184 | 7920 | 8448 |
| | 11 | 8712 | 8448 | 8976 |
| | 12 | 9240 | 8976 | 9504 |
| 5 | 13 | 9768 | 9504 | 10032 |
| | 14 | 10296 | 10032 | 10560 |

TABLE 2

UWB Single or Hopping Channels

| Band Group | Single Channel or Channel Hopping Sequence Using UWB Band Numbers Versus TFC Number | | | | | | | | | |
|---|---|---|---|---|---|---|---|---|---|---|
| | 1 | 2 | 3 | 4 | 5 | 6 | 7 | 8 | 9 | 10 |
| 3 | (7, 8, 9, 7, 8, 9) | (7, 9, 8, 7, 9, 8) | (7, 7, 8, 8, 9, 9) | (7, 7, 9, 9, 8, 8) | 7 | 8 | 9 | (7, 8, 7, 8, 7, 8) | (7, 9, 7, 9, 7, 9) | (8, 9, 8, 9, 8, 9) |
| 4 | (10, 11, 12, 10, 11, 12) | (10, 12, 11, 10, 12, 11) | (10, 10, 11, 11, 12, 12) | (10, 10, 12, 12, 11, 11) | 10 | 11 | 12 | (10, 11, 10, 11, 10, 11) | (10, 12, 10, 12, 10, 12) | (11, 12, 11, 12, 11, 12) |
| 5 | | | | | | 13 | 14 | (13, 14, 13, 14, 13, 14) | | |
| 6 | (9, 10, 11, 9, 10, 11) | (9, 11, 10, 9, 11, 10) | (9, 9, 10, 10, 11, 11) | (9, 9, 11, 11, 10, 10) | 9 | 10 | 11 | (9, 10, 9, 10, 9, 10) | (9, 11, 9, 11, 9, 11) | (10, 11, 10, 11, 10, 11) |

Channel hopping can mitigate receiver degradation introduced by multipath signals for an extended range communication. In some variations, the robustness of the existing UWB MB-OFDM signal can be increased to enable an extended communication range. In some examples, the link margin can be increased by increasing the transmit power and/or antenna gain. The link margin is the difference between a receiver's sensitivity (i.e., the minimum received power at which the receiver will still work) and the actual received power. Increasing the antenna gain can result in no additional power consumption of a transceiver, such as transceiver 108 of the patient care device 102 illustrated in FIG. 1.

An increase in transmit power can increase power consumption of the transceiver, such as transceiver 108 of the patient care device 102 illustrated in FIG. 1. Using increased antenna gain, increased transmit power or both increased antenna gain and increased transmit power can result in the transmit radio frequency power level of a transceiver, such as transceiver 108, being increased. This increase in radio frequency transmit power can degrade the low probability of detection (LPD) and the low probability of interception (LPI) of the ultra-wide band signal provided by ultra-wide band waveforms. Thus, making it more likely that the signal can be detected and intercepted by a third-party. To mitigate this degradation in low probability of detection (LPD) and low probability of interception (LPI) performance, the ultra-wideband system, such as system 100 illustrated in FIG. 1, can be configured to use a second higher gain antenna that is only used during reception of data, such as antenna 122, of the patient care device 102, and/or antenna 126, of the user device 112, illustrated in FIG. 1. The radio frequency switches, 124 and 128, can be configured to facilitate connection to the appropriate antenna for separate transmit and receive paths.

Use of additional hardware components in a communication system, such as using the second antennas 122 and 126 and radio frequency switches 124 and 128, can cause an increase in interference and/or signal degradation within the network elements. To account for the increase in interference and/or signal degradation, additional data redundancy can be added to the UWB MB-OFDM signal. In some examples, additional redundancy can be possible due to the data rate and packet size of data transmitted using the UWB MB-OFDM signals. For example, the data rate and packet size of medical data generated by a patient care device(s) 102 can be relatively low compared to the capabilities of the communication network on which the patient care device(s) 102 and the user device 112 communicate.

In some examples, additional data redundancy can be provided by expanding the number of repeated symbols in both the time and frequency domains. Table 3 shows examples, in the bottom two rows, of the lowest two data rates that can be implemented for traditional UWB MB-OFDM waveforms. Table 3 is exemplary and shows the data rates for the ECMA-368 standard. The presently described subject matter can be applied to other waveforms and is not limited to the ECMA-368 standard.

TABLE 3

Added Data Redundancy

| Data Modulation | Code Rate | Redundant Coding TDS | Redundant Coding FDS | Burst Data Rate (Mbps) | Coded bits per 6 Mod Symbol | Info bits per Symbol |
|---|---|---|---|---|---|---|
| QPSK | 1/3 | 20 | 4 | 2.67 | 15 | 5 |
| QPSK | 1/3 | 20 | 2 | 5.33 | 30 | 10 |
| QPSK | 1/3 | 8 | 2 | 13.33 | 75 | 25 |
| QPSK | 1/3 | 2 | 2 | 53.33 | 300 | 100 |
| QPSK | 1/2 | 2 | 2 | 80.00 | 300 | 150 |

Lower data rates can be generated by a system, such as system 100 illustrated in FIG. 1, by increasing the time domain spreading (TDS) and frequency domain spreading (FDS). For time domain spreading, a system, such as system 100, can be configured to place redundant coded bits in the time domain at different OFDM symbols. For frequency domain spreading, a system, such as system 100, can be configured to place redundant coded bits on different OFDM subcarriers. In some examples, an ultra-wide band transmitter, such as included in transceivers 108 and 116, can provide the added data redundancy. An ultra-wideband receiver, such as included in transceivers 108 and 116, can be configured to coherently combine the redundant symbols to increase the detection performance of the receivers.

Providing additional data redundancy means that the same symbol is transmitted repeatedly which can result in an increased ability for third-parties to detect and/or intercept the ultra-wideband signals.

In some examples of the presently described subject matter, additional data redundancy can be provided, without transmitting the same redundant data multiple times. For example, a system, such as system 100, can be configured to use direct sequence spreading to encode data bits prior to the OFDM modulation process. The OFDM modulation randomizing the repeated symbols such that any attempt to detect and/or intercept the ultra-wideband signal will result in two separate detected signals for the same symbol and deciphering such detected signals will be more challenging.

For another example, a system, such as system 100, can be configured to use direct sequence spreading to encode data bits at different locations within the transmitter processing enabling the system to used exiting ultra-wideband chipsets or modified architectures using new chipsets, a software defined radio architecture, Field Programmable Gate Array (FPGA) design, combination of hardware and software design elements or the like. One direct spreading approach places the direct sequence spreading after the data encryption, data error encoding and interleaving processes as shown in a system, such as system 400. Another direct spreading approach places the direct sequence spreading after the data encryption and data error encoding as shown in a system, such as system 500. Moving the direct spreading before the data encryption, data error encoding and interleaving processes is shown in a system, such as system 600. For a system, such as system 600, direct sequence spreads the data first. The spread data, known as chips, are processed by the chip encryption, chip error encoding, and chip interleaving before being placed on the MB-OFDM subcarriers. The direct sequence spreading for all three different system configurations causing the same symbols to be randomly changed which will result in the same repeated symbol appearing differently to a detector and/or interceptor of the ultra-wideband signal. Direct sequence spreading systems can increase the signal bandwidth by spreading lower rate data with a higher rate spreading sequence.

Figure 3:
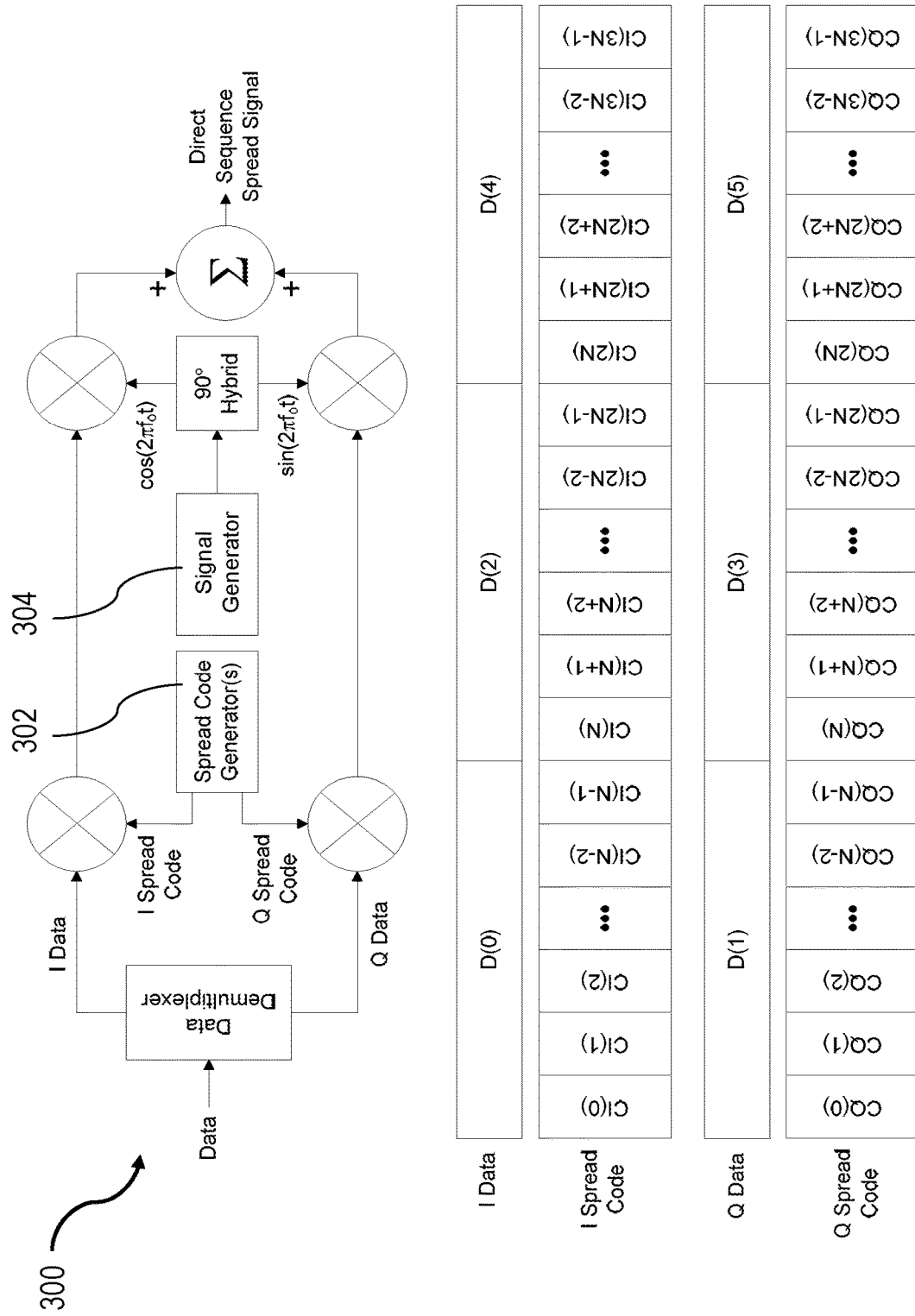
FIG. 3 shows an example of a typical QPSK direct sequence spreading done in the time domain on a single carrier frequency. Placement of an inphase and quadrature spread data on each of the subcarriers of an orthogonal frequency division multiplexing data spread spectrum signal can implement this same approach and provides a system having one or more features consistent with the presently described subject matter.

FIG. 3 shows an example of a typical QPSK direct sequence spreading done in the time domain on a single carrier frequency. FIG. 3 shows the QPSK direct sequence data spread spectrum system 300 having one or more features consistent with the presently described subject matter. The top level QPSK direct sequence data spread spectrum system 300 is a typical direct spreading modulator for a Quadrature Phase Shift Keyed (QPSK) system, where in-phase (I) and quadrature (Q) spreading sequences can be generated by either single or separate spreading code generators 302. The in-phase (I) spreading sequences can modulate the Cosine component of the waveform and the quadrature (Q) spreading sequences can modulate the Sine component of the waveform. FIG. 3 shows a typical QPSK Direct Sequence Spreading Modulator. The I/Q chip rate is N times faster than the I/Q data rate, thereby increasing the signal bandwidth. The chip rate is the number of chips per second used in the spreading signal. The data, spreading code, and spread signals are non-return to zero (NRZ) signals, resulting in +1 or −1 values. A carrier frequency can be generated by a signal generator 304. For this spreading system, the I and Q spread signals can be up-converted to the carrier frequency ($f_o$) by the quadrature mixer operation. This operation corresponds to a single carrier system unlike the UWB MB-OFDM system, which consists of 100 data subcarrier signals, that require an I and Q spreading sequence for each data subcarrier, which can be generated by either a single spreading code generator or separate spreading code generators. Placement of an inphase and quadrature spread data on each of the subcarriers of an orthogonal frequency division multiplexing (OFDM) data spread spectrum signal can be implemented using this same approach that places the direct spread data onto a single subcarrier frequency, where each subcarrier that is using direct sequence spreading requires this modulation structure. As shown in all three OFDM configurations given in FIG. 4, FIG. 5, and FIG. 6, the Inverse Fast Fourier Transform (IFFT) provides an efficient algorithm for placing the direct spread data onto the subcarriers. The IFFT generates the discrete OFDM waveform over an OFDM symbol period by converting the discrete Fourier Transform developed by placing the QPSK direct spread data as an amplitude and phase modulation on each subcarrier. For QPSK direct spreading, only phase modulation is required to implement the direct sequence data spreading, since the direct spread data changes the phase of the subcarrier signal. This subcarrier phase change by the spread data is demonstrated by examining the typical QPSK Direct Sequence Spreading Modulator given in FIG. 3.

For the transmitter, the multiplication operation corresponding to I data multiplied by I spreading code and Q data multiplied by Q spreading code for each subcarrier can be simply performed by a binary multiplier (an exclusive-or operation), resulting in 200 binary multiplier operations; 2 multiplication for each of the 100 data subcarriers for QPSK spreading on each OFDM subcarrier. In some variations, the number of binary multipliers required can be reduced to a lower number by operating the spreading operation at a higher clock rate. As shown in FIG. 3, the typical QPSK direct sequence spreading can be done in the time domain. The multiple data subcarrier signals of the UWB OFDM signal can provide the capability to spread in the time domain, the frequency domain, or the time domain and the frequency domain. Spreading in the time domain places spread data across multiple OFDM symbols, while spreading in the frequency domain places spread data across multiple subcarriers in the same OFDM symbol.

A receiver in the present system can comprise components configured to perform a despreading operation and an accumulator to sum up the despread signal for data detection. The accumulator can perform its operations after the components configured to perform the despreading operation. Using QPSK subcarrier modulation can require two sets (I & Q) of operations. The two sets of operations can include despreading, accumulation and data detection for each subcarrier. To obtain the coherent processing at the receiver, the despreading and accumulator processing can require multi-level processing. The despreading multi-level processing can be reduced by using multi-level exclusive-or gates to multiple two's (2's) complement numbers. Two's complement is an operation performed on binary numbers. The two's complement of an N-bit number is defined as the complement with respect to $2^N$; this is also equivalent to taking the ones' complement and then adding one, since the sum of the number and its ones' complement is all 1 bits. The decision on the accumulated despread signal results in the detection of the corresponding received data signal for each subcarrier. By operating at a higher clock rate, the number of hardware elements required to implement the despreading, accumulation and data detection can be reduced.

Figure 4:
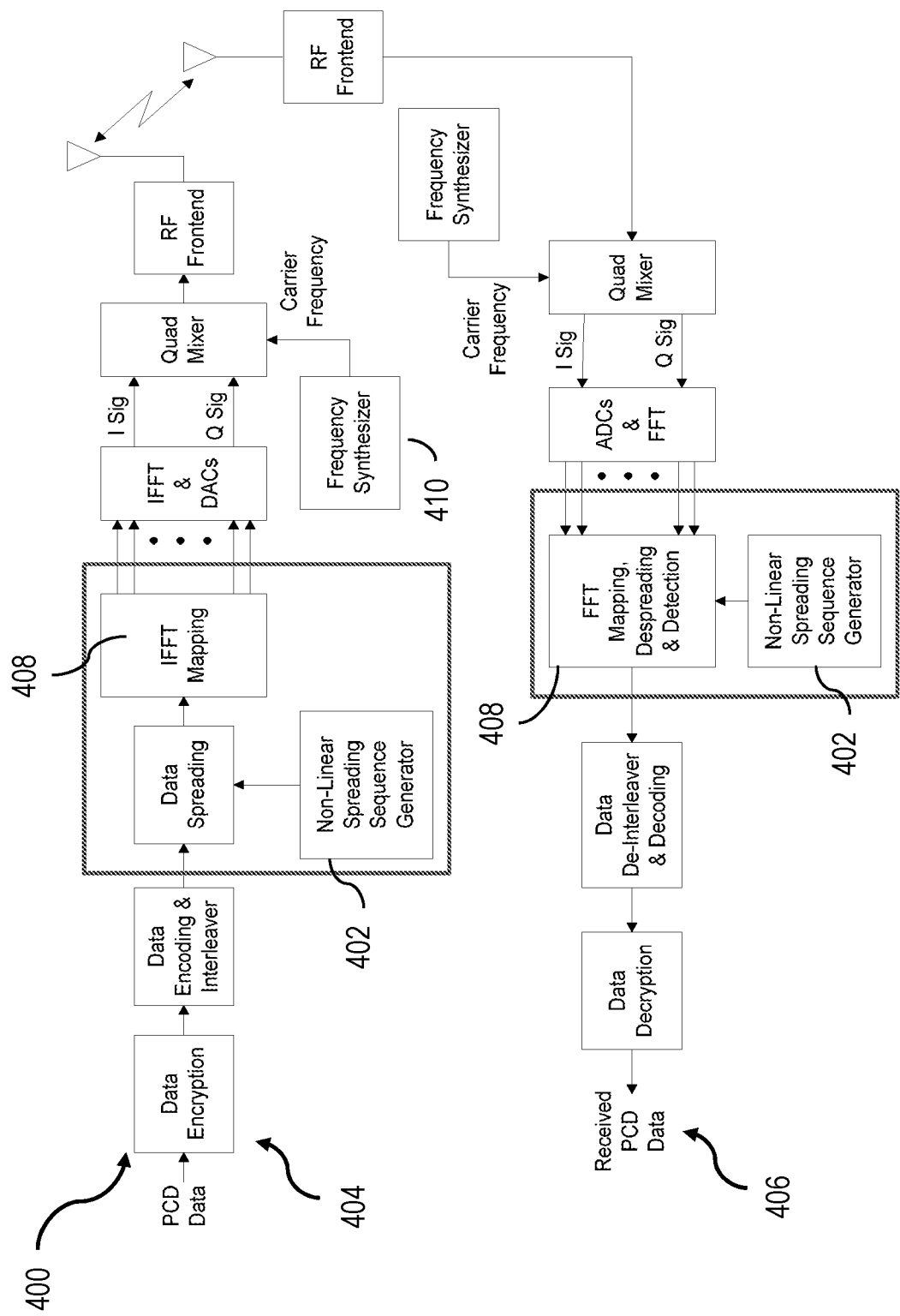
FIG. 4 gives a top level block diagram of an orthogonal frequency division multiplexing data spread spectrum system which places the direct sequence spreading after the data encryption, data error encoding and interleaving processes and having one or more features consistent with the presently described subject matter.

FIG. 4 gives a top-level block diagram of a system 400 having one or more features consistent with the presently described subject matter. The system 400 provides an orthogonal frequency division multiplexing data spread spectrum system which places the direct sequence spreading after the data encryption, data error encoding and interleaving processes. The system 400 can be configured to perform subcarrier direct sequence spreading using a non-linear spreading sequence generator 402 for improved transmission security (TRANSEC) over a linear spreading sequence. The IFFT mapping component 408 provides the capability to spread in the time domain, the frequency domain, or the time domain and the frequency domain by the mapping of the spread data to the OFDM subcarriers for each OFDM symbol. The system 400 shows a transmitter 404 and a receiver 406.

In some exemplary variations, in the transmitter 404, the I and Q signals out of the 128 point Inverse Fast Fourier Transform (IFFT) operate at the same sampling rate of 528 Msps, which provides a subcarrier frequency spacing of 4.125 MHz. Table 4 gives the mapping of subcarriers for the OFDM signal of this exemplary variation. The mapping of subcarriers for the OFDM signal, in Table 4, includes null (no subcarrier modulation) guard, pilot and data subcarriers. Using QPSK spreading modulation, the OFDM signal provides 200 chips of spreading capability (100 chips for each I and Q signals) per OFDM symbol. As shown, the spreading does not impact the subcarrier frequency spacing (4.125 MHz) or UWB channel bandwidth (528 MHz), but requires the spread data to be properly mapped into the IFFT. The IFFT mapping can be performed by an IFFT mapping component 408, for example. Although illustrated as a separate component, the IFFT mapping component 408 can be integrated with one or more components of the transmitter 404 and/or receiver 406.

TABLE 4

| Subcarrier Mapping | | |
|---|---|---|
| Symmetric Subcarrier Index | FFT Subcarrier Index | FFT Subcarrier Type |
| −63 | 65 | Null |
| −62 | 66 | Null |
| −61 | 67 | Guard |
| −60 | 68 | Guard |
| −59 | 69 | Guard |
| −58 | 70 | Guard |
| −57 | 71 | Guard |
| −56 | 72 | Data |
| −55 | 73 | Pilot |
| −54 | 74 | Data |
| −53 | 75 | Data |
| −52 | 76 | Data |
| −51 | 77 | Data |
| −50 | 78 | Data |
| −49 | 79 | Data |
| −48 | 80 | Data |
| −47 | 81 | Data |
| −46 | 82 | Data |
| −45 | 83 | Pilot |
| −44 | 84 | Data |
| −43 | 85 | Data |
| −42 | 86 | Data |
| −41 | 87 | Data |
| −40 | 88 | Data |
| −39 | 89 | Data |
| −38 | 90 | Data |
| −37 | 91 | Data |
| −36 | 92 | Data |
| −35 | 93 | Pilot |
| −34 | 94 | Data |
| −33 | 95 | Data |
| −32 | 96 | Data |
| −31 | 97 | Data |
| −30 | 98 | Data |
| −29 | 99 | Data |
| −28 | 100 | Data |
| −27 | 101 | Data |
| −26 | 102 | Data |
| −25 | 103 | Pilot |
| −24 | 104 | Data |
| −23 | 105 | Data |
| −22 | 106 | Data |
| −21 | 107 | Data |
| −20 | 108 | Data |
| −19 | 109 | Data |
| −18 | 110 | Data |
| −17 | 111 | Data |
| −16 | 112 | Data |
| −15 | 113 | Pilot |
| −14 | 114 | Data |
| −13 | 115 | Data |

TABLE 4-continued

| Subcarrier Mapping | | |
|---|---|---|
| Symmetric Subcarrier Index | FFT Subcarrier Index | FFT Subcarrier Type |
| −12 | 116 | Data |
| −11 | 117 | Data |
| −10 | 118 | Data |
| −9 | 119 | Data |
| −8 | 120 | Data |
| −7 | 121 | Data |
| −6 | 122 | Data |
| −5 | 123 | Pilot |
| −4 | 124 | Data |
| −3 | 125 | Data |
| −2 | 126 | Data |
| −1 | 127 | Data |
| 0 | 0 | Null |
| 1 | 1 | Data |
| 2 | 2 | Data |
| 3 | 3 | Data |
| 4 | 4 | Data |
| 5 | 5 | Pilot |
| 6 | 6 | Data |
| 7 | 7 | Data |
| 8 | 8 | Data |
| 9 | 9 | Data |
| 10 | 10 | Data |
| 11 | 11 | Data |
| 12 | 12 | Data |
| 13 | 13 | Data |
| 14 | 14 | Data |
| 15 | 15 | Pilot |
| 16 | 16 | Data |
| 17 | 17 | Data |
| 18 | 18 | Data |
| 19 | 19 | Data |
| 20 | 20 | Data |
| 21 | 21 | Data |
| 22 | 22 | Data |
| 23 | 23 | Data |
| 24 | 24 | Data |
| 25 | 25 | Pilot |
| 26 | 26 | Data |
| 27 | 27 | Data |
| 28 | 28 | Data |
| 29 | 29 | Data |
| 30 | 30 | Data |
| 31 | 31 | Data |
| 32 | 32 | Data |
| 33 | 33 | Data |
| 34 | 34 | Data |
| 35 | 35 | Pilot |
| 36 | 36 | Data |
| 37 | 37 | Data |
| 38 | 38 | Data |
| 39 | 39 | Data |
| 40 | 40 | Data |
| 41 | 41 | Data |
| 42 | 42 | Data |
| 43 | 43 | Data |
| 44 | 44 | Data |
| 45 | 45 | Pilot |
| 46 | 46 | Data |
| 47 | 47 | Data |
| 48 | 48 | Data |
| 49 | 49 | Data |
| 50 | 50 | Data |
| 51 | 51 | Data |
| 52 | 52 | Data |
| 53 | 53 | Data |
| 54 | 54 | Data |
| 55 | 55 | Pilot |
| 56 | 56 | Data |
| 57 | 57 | Guard |
| 58 | 58 | Guard |
| 59 | 59 | Guard |
| 60 | 60 | Guard |
| 61 | 61 | Guard |

TABLE 4-continued

Subcarrier Mapping

| Symmetric Subcarrier Index | FFT Subcarrier Index | FFT Subcarrier Type |
|---|---|---|
| 62 | 62 | Null |
| 63 | 63 | Null |
| 64 | 64 | Null |

In some variations, IFFT mapping provides time domain spreading of 1, 2 or 4 and frequency domain spreading of 5, 10, 20 and 25. Table 5 shows the burst rates for these different time and frequency domain spreading values. Since the subcarrier frequency spacing of 4.125 MHz is not modified, the increase in time and frequency domain spreading results in a lower burst rate, as shown in Table 5. Table 5 shows that increasing the time and frequency domain spreading increases the direct spreading processing gain.

TABLE 5

QPSK Spreading Burst Rates

| Data Modulation | Code Rate | I/Q Spreading (Chips) Time | I/Q Spreading (Chips) Freq | Total Chips per 6 Mod Symbol | Coded bits per 6 Mod Symbol | Info bits per 6 Mod Symbol | Burst Data Rate (Mbps) | Processing Gain (dB) |
|---|---|---|---|---|---|---|---|---|
| QPSK | 1/3 | 4 | 25 | 1200 | 12 | 4 | 2.13 | 20.00 |
| QPSK | 1/3 | 4 | 20 | 1200 | 15 | 5 | 2.67 | 19.03 |
| QPSK | 1/3 | 4 | 10 | 1200 | 30 | 10 | 5.33 | 16.02 |
| QPSK | 1/3 | 4 | 5 | 1200 | 60 | 20 | 10.67 | 13.01 |
| QPSK | 1/3 | 2 | 25 | 1200 | 24 | 8 | 4.27 | 16.99 |
| QPSK | 1/3 | 2 | 20 | 1200 | 30 | 10 | 5.33 | 16.02 |
| QPSK | 1/3 | 2 | 10 | 1200 | 60 | 20 | 10.67 | 13.01 |
| QPSK | 1/3 | 2 | 5 | 1200 | 120 | 40 | 21.33 | 10.00 |
| QPSK | 1/3 | 1 | 25 | 1200 | 48 | 16 | 8.53 | 13.98 |
| QPSK | 1/3 | 1 | 20 | 1200 | 60 | 20 | 10.67 | 13.01 |
| QPSK | 1/3 | 1 | 10 | 1200 | 120 | 40 | 21.33 | 10.00 |
| QPSK | 1/3 | 1 | 5 | 1200 | 240 | 80 | 42.67 | 6.99 |

In the example shown in Table 5, the first row, I and Q spreading chips are placed in four (4) different OFDM symbols using twenty five (25) subcarriers per OFDM symbol. This spreading configuration corresponds to 100 chips per coded bit (I or Q bit). Since there are 1200 chips in six (6) OFDM symbols, the number of coded bits within these 6 OFDM symbols is 12. For a coding rate of ⅓, the number of information bits transmitted with the 6 OFDM symbol corresponds to 4 bits. The other entries of Table 5 are determined by using one or more of the following relationships. By multiplying the time and frequency spreading values together, the number of chips per coded I or Q bit can be determined. Dividing the total 1200 chips per 6 OFDM symbols by the number of chips per coded bit gives the number of coded bits per 6 OFDM symbols. Multiplying the number of coded bits per 6 OFDM symbols by the coding rate provides the number of information bits per 6 OFDM symbols. By dividing the number of information bits per 6 OFDM symbols by the time length of 6 OFDM symbols (1.875 us) provides the burst data rate. As shown in Table 5, the selection of different time and frequency spreading produces burst data rates from 1.07 to 21.33 Mbps. The lower burst data rates provide the higher processing gain by increasing the number of chips per bit, which results in a lower receiver sensitivity level.

Translation of the OFDM subcarriers to the desired transmission signal frequency range can be generated by a carrier signal generator 410. IFFT mapping with no time spreading, maps the spread data chips to a subcarrier that is separated by 100 divided by the frequency spreading value. For example, row 10 of Table 5, maps the spread data to 20 of the 100 subcarrier with a subcarrier separation of 5 versus row 12 of Table 5, which maps the spread data to 5 of the 100 subcarrier with a subcarrier separation of 20. When time spreading is added to the spreading operation, the frequency mapping is shifted. For time spreading of two (2), the frequency mapping within the OFDM symbol will be shifted differently over two OFDM symbols with this pattern repeating itself. For time spreading of two (2), the first OFDM symbol uses the frequency spreading frequency separation based on the frequency spreading value. The second OFDM symbol will shift the frequency mapping by 2 subcarriers for frequency spreading of 20 and 25, 5 subcarriers for frequency spreading of 10, and 20 subcarriers for frequency spreading of 5. Increasing the time spreading to four (4), results in four different time shifts that are repeated. The first OFDM symbol uses the frequency spreading frequency separation based on the frequency spreading value. The second, third and fourth OFDM symbols will shift the frequency mapping by 1 subcarrier for each symbol for frequency spreading of 20 and 25, 2 subcarriers for each symbol for frequency spreading of 10, and 5 subcarriers for each symbol for frequency spreading of 5. After four symbols this frequency shift will repeat itself.

The Fast Fourier Transform (FFT) output mapping places both the received I and Q signals into the proper sequence for despreading and accumulation for data detection. This FFT mapping algorithm requires added complexity to the design. By placing the received I and Q subcarrier signals into a memory element, proper control of the addressing bus can be used to proper sequence the received signals for despreading of the subcarriers. After despreading, the despread data is deinterleaved followed by data error decoding and correction, the decoded bits are decrypted to provide the PCD information data for a patient care device (PCD) transmission to the user device (UD).

The presently described direct sequence spreading approach can provide coherent detection performance despite additional hardware complexity. In the presently described examples, processing gain for the coherent detection is equal to 10*log 10(N) dB, where N is the number of spreading chips for the I/Q signal. Table 5 shows that the processing gain between 7 and 20 dB can be provided using this approach. For free space path loss, a 6 dB increase in processing gain results in a doubling of the communications range. From Table 3, the lowest burst rate for the existing OFDM system with redundant symbols and no spreading provides a processing gain of 6 dB with the time and frequency redundancy equal to 2 for each domain. The increase processing gain over the existing lowest burst rate provided by spreading is between 1 and 14 dB, which results in a communications range increase of 1.12 to 5.0 times.

Figure 5:
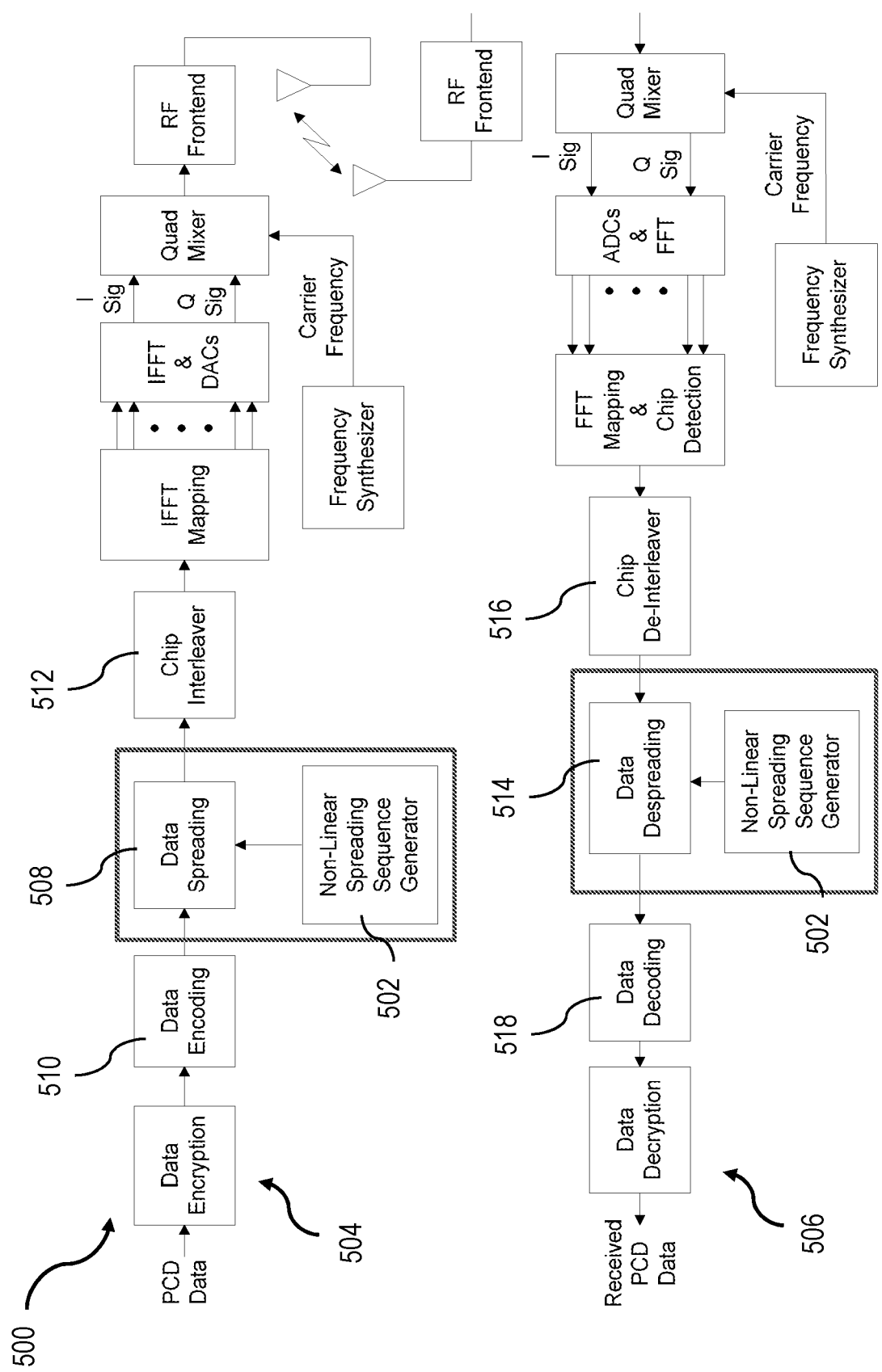
FIG. 5 shows a top level block diagram of an orthogonal frequency division multiplexing data spread spectrum system which places the direct sequence spreading after the data encryption and data error encoding with interleaving being performed on the spread data chips and having one or more features consistent with the presently described subject matter.

FIG. 5 shows a top level block diagram of a system 500 having one or more features consistent with the presently described subject matter. The system 500 may have one or more elements that are similar to one or more elements of the system 400. In some examples, the transmitter 504 and the receiver 506 of the system 500 may have less hardware complexity compared the transmitter 404 and the receiver 406 of system 400. For example, for the transmitter 504 in the system 500, the data spreading operation 508 can be performed between the data error encoding operation 510 and the interleaving operation 512. For the receiver 506 in the system 500, the data despreading operation 514 can be performed between the de-interleaving operation 516 and the data error decoding operation 518. For the system 500, a more typical data spreading/despreading operation can be performed. The chip interleaver can be configured to spread the chips across the OFDM subcarriers. To obtain the full processing gain, the number of quantization levels into the chip de-interleaver operation 516 needs to be greater than one for soft decision despreading. Using hard decision despreading effectively reduces the processing, but simplifies the hardware complexity. The encoded data decision out of the despreading operation can be mapped into a soft decision for improved data error correction in the data error decoding.

Figure 6:
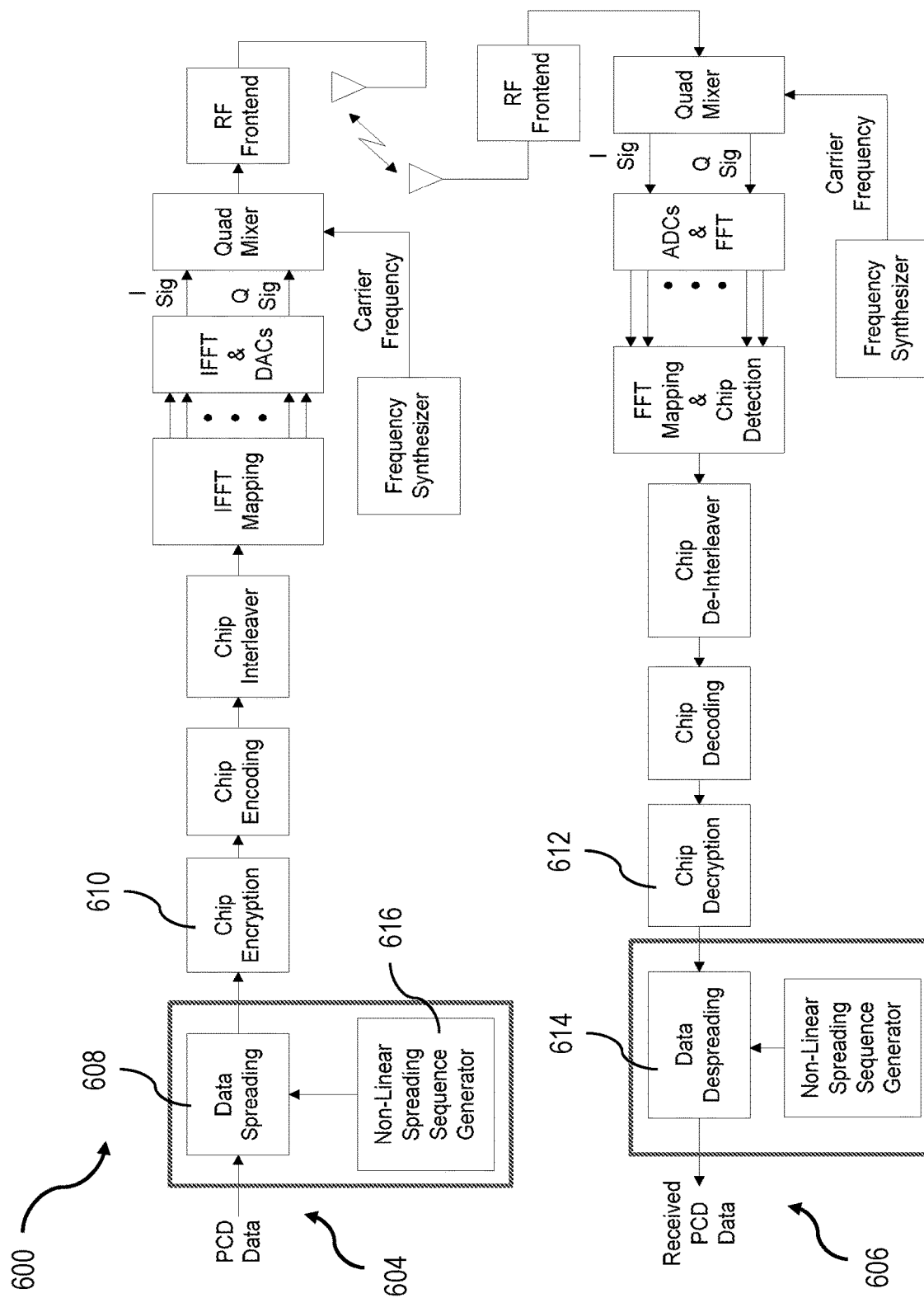
FIG. 6 shows a top level block diagram of an orthogonal frequency division multiplexing data spread spectrum system with data being spread before encryption, error encoding, and interleaving, which is done on the spread data chips, and this system structure having one or more features consistent with the presently described subject matter.

FIG. 6 shows a top level block diagram of a system 600 having one or more features consistent with the presently described subject matter. The system 600 can be configured to perform top level data expansion using spreading. To minimize hardware impact to the ultra-wideband transmitter 604, especially for operation with an existing ultra-wideband (UWB) chipset, the data spreading operation 608 can be placed before the data encryption operation 610 on the transmitter 604. To minimize hardware impact to the ultra-wideband receiver 606, the data despreading operation 612 can be placed after the data decryption operation 614. In some variations, a data redundancy operation (e.g., generating multiple repeats of the same bit) can be implemented. However, in some implementations, such data redundancy operations could compromise the encryption operation. The data can be spread using a non-linear sequence generator 616. The non-linear sequence generator 616 can be configured to change the starting location of the sequence on every transmission to avoid compromise of the encryption operation. In some examples, the non-linear sequence generator 616 can be configured to change the starting location of the sequence according to a predefined pattern.

The spreading operation performed by the data spreader 608 can be configured to convert the input data bit into an N-chip sequence that gets inverted or non-inverted depending on the data bit value. One or more operations, including encryption, error encoding, interleaving, IFFT mapping, subcarrier quad mixing, or the like can be performed after the data spreading by the transmitting device, for each spread chip. One or more operations, including subcarrier quad mixing, FFT mapping, chip detection, decoding, decrypting, or the like can be performed before data despreading by the receiving device, for each chip of the spread data.

In some variation, the configuration of system 600 can reduce the hardware complexity compared to other systems. In some examples, the system 600 may cause degradation in the processing gain by the single quantization level despreading detection of the signal. This single quantization level despreading detection can perform majority logic detection on the despread data. The data detection can handle N/2−1 chip errors (where N equals the number of chips per data bit) and still provide a correct data detection. In examples where the system 600 provides enhanced data performance outside of the transceiver architecture, a spread cyclic redundancy check (CRC) on the data can to be added to the data transmitter 604 and the data receiver 606 for verification of a properly received packet.

Figure 7:
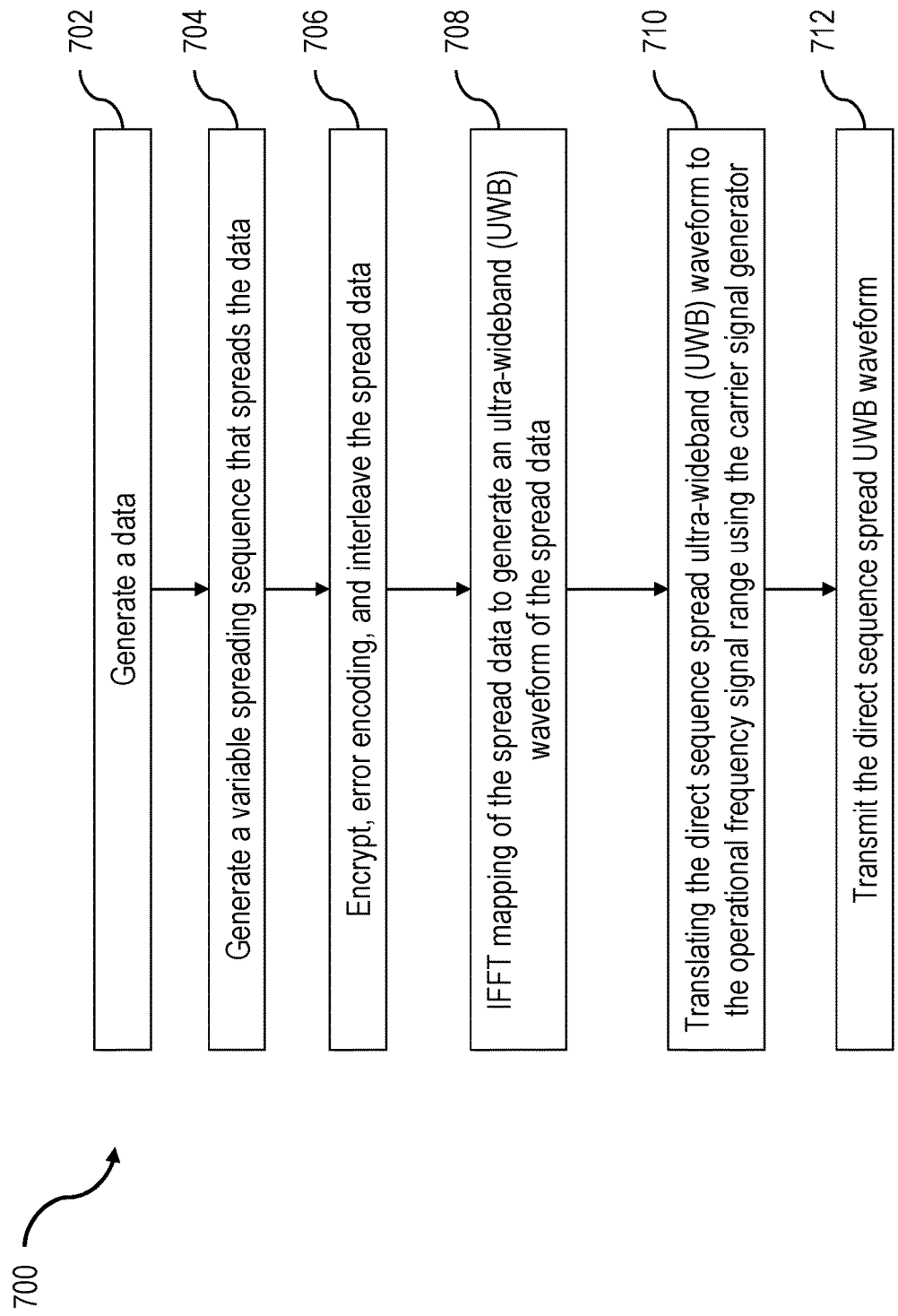
FIG. 7 is a process flow diagram showing a process having one or more features consistent with the presently described subject matter; (comment need work here; what is being presented).

FIG. 7 is a process flow diagram showing a process 700 having one or more features consistent with the presently described subject matter. Process 700 can be performed by one or more processors having one or more features consistent with the present description.

At 702, data can be generated. In some variations, data can be generated by one or more inputs of a patient care device. For example, where the patient care device is a thermometer, the one or more inputs of the patient care device may be a temperature sensor. The temperature sensor can be configured to generate a signal having an indication of a temperature. Where the patient care device is an electrocardiogram, the input of the patient care device may be one or more electrocardiogram leads configured to generate signals associated with a patient's heart and/or other vital systems.

At 704, a variable spreading sequence can be generated for spreading the data. The spreading sequence is used to direct sequence spread the data. The spreading sequence generator can be a pseudo-random spreading sequence generator or nonlinear spreading sequence generator. The pseudo-random order or nonlinear spreading generator parameters can be known by the transmitter and the receiver of a communication system.

At 706, the spread data having been spread by the variable spreading sequence can be encrypted, error encoded, and interleaved. Encryption can include encoding data in such a way that only authorized parties can access it. The encryption can be a symmetric-key encryption scheme. The transmitting device and the receiving device can have the same shared secret key to decrypt the data. The encryption can be a public-key encryption scheme. The encryption key can be published for anyone to use and encrypt messages. However, only the receiving party can be granted access to the decryption key that enables messages to be read. The error encoding processes encodes the message in a redundant way by using an error-correcting code for correction of reception errors at the receiver. The error code parameters are known by the transmitting and receiving devices. Error encoding approaches include the convolutional encoding using the Viterbi algorithm, Turbo codes, cyclic error-correcting codes using Reed-Solomon codes, or the like. Interleaving reorders the spread data to be transmitted so that consecutive spread data chips are distributed over a larger sequence of spread data chips to reduce the effect of burst errors. The interleaving process performed in the transmitter is known at the receiver, so the de-interleaving process provides the proper time order of the spread data for the following receiver processing.

At 708, the IFFT mapping of the spread data to the OFDM subcarriers within the OFDM symbols generates an ultra-wideband (UWB) waveform with direct spread data. IFFT mapping of the spread data to the subcarriers and OFDM symbols can generate time-domain spreading, frequency-domain spreading, time and frequency domain spreading, or the like.

At 710, the carrier signal generator translates the direct sequence spread OFDM subcarriers to the desired transmission signal frequency range.

At 712, the direct sequence spread ultra-wideband (UWB) signal can be transmitted. The direct sequence spread (UWB) signal can be transmitted by a transmitter in the transmitting device, such as a patient care device, user device or the like.

In some variations, the user device(s) and/or the patient care device(s) of the presently described ultra-wideband network can be configured to control the transmission power of the signals transmitted between the user device(s) and/or the patient care device(s).

The presently described addition of the data spreading to the ultra-wideband waveform can increase the processing gain of the signal that can be used to reduce the radio frequency (RF) transmit power for short communication links that do not need the extended communications range or high data rate capability. By reducing the RF transmit power, power consumption and heat generation within the patient care device (PCD) can be reduced, resulting in a longer battery life. In addition, the lower RF transmit power level can improve the Low Probability of Intercept/Low Probability of Detection (LPI/FLPD) performance by driving the signal lower into the noise floor. For example, for communications within a transport vehicle or treatment area, the ultra-wideband network can include short range communication elements such as patient care devices and user devices that collect and monitor medical data of the patient. The medical data of the patient can be supplied by the patient care devices.

For short-range communications operating at a low data rate, the wideband and narrowband signal strength measurements of the received ultra-wideband data signal power provide an estimation of the received signal strength. By comparing this received signal strength estimation against the minimum operational signal strength reference for the data spread signal with an additional controllable signal margin parameter (typical range of 2 to 5 dB), the recommended reduction in RF transmit power can be determined.

To mitigate small changes in RF transmit power levels that do not significantly reduce power consumption or improve LPI/LPD significantly, a power reduction step size of 3 dB or greater may be implemented. To support the maximum processing gain of 20 dB provided by the highest data spreading, the power reduction can support a range of 3 to 21 dB. Before communicating the recommended RF transmit power from the receiver to the transmitter, the receiver can be configured to check the Viterbi error correction across the data packet to verify the reliability of the existing communications link. A high number of error corrections can result in recommending no change in the RF transmit power. At the patient care device, the recommended RF transmit power reduction level can be sent as an attachment to the patient medical data. At the user device, the recommended RF transmit power reduction level can be sent as an attachment to the acknowledgement packet to one or more received data packets.

One non-limiting exemplary advantage of the presently described subject matter can be the increased range of ultra-wideband communications without increasing the transmit power, by taking advantage of the low data transmit rates of medical data transmitted by patient care devices.

Another non-limiting exemplary advantage of the presently described subject matter is reduced power consumption due to the low data rate over the ultra-wideband communication network. The patient care device and the user device can be configured to reduce the transmission power until signal quality falls below a predetermined threshold value. The patient care device and/or the user device can be configured to determine the bit rate of the data to be transmitted and select a transmission power level for that bit rate.

The presently described subject matter can relate to estimating interference in a communication network. In some variations, the presently described subject matter can be applied to multiple devices in the communication network. For example, a communication network may comprise multiple patient care devices, such as patient care device 102 illustrated in FIG. 1. The multiple patient care devices can be configured to communicate with a user device, such as user device 112 illustrated in FIG. 1. In some variations, a communication network can comprise multiple user devices. The multiple user devices and/or the multiple patient care devices can be configured communicate with one another in a communication network.

In one aspect, an estimation of interference at an ultra-wideband (UWB) receiver can be determined. The ultra-wideband receiver can be part of a node operating in an ultra-wideband network. The node can comprise a transmitter and/or a receiver. The transmitter and/or receiver can be separate components within the node or can be part of the same component, such as a transceiver. The estimation of interference can be determined using an interference estimation algorithm that uses the wideband radio frequency (RF) received signal estimation and narrowband orthogonal frequency division multiplexing (OFDM) subcarrier levels of an ultra-wideband waveform combined with the number of symbol error corrections in the decoding processes to estimate the interference level between a transmitting device and a receiving device. Since the interference level within an ultra-wideband network can be significantly different across the ultra-wideband nodes, the interference levels at each node can be estimated and transmitted back to a master node for determination of the interference level across at least a portion of the network. The master node can be configured to process the interference levels across at least a portion of the ultra-wideband network along with its own interference level. The master node can be configured to process this interference data and determine if an operational channel, on which the ultra-wideband communication is being transmitted, needs to be changed in order to reduce the amount of interference in the ultra-wideband communication network.

In response to a determination, by the master node, that using a different channel to communicate is required to reduce interference across the ultra-wideband network, the master node can be configured to transmit channel change information to one or more slave nodes connected to the master node. The slave nodes can be configured to acknowledge the receipt of the channel change message before moving to the selected channel.

In some variations, an ultra-wideband network can be used for telemedicine. A master node, when used in telemedicine, can be a user device (UD) close area medical integration technology (CAMIT) module (UDCM). The UDCM can be connected to a user device platform. The user device platform can include one or more of a tablet, a laptop, another computing device, or the like. In some variations, the user device can provide the computing power to determine the interference estimation within the ultra-wideband network. In some examples, one or more slave nodes connected to a UDCM can include patient care device CAMIT modules (PCDCMs) connected to patient care devices (PCDs) and/or other UDCMs connected to user devices that are slaves to the master mode within the ultra-wideband network. The PCDCMs and/or slave UDCMs can be configured to estimate an amount of interference at their location and communicate the amount of estimated interference level back to the master UDCM.

Figure 8:
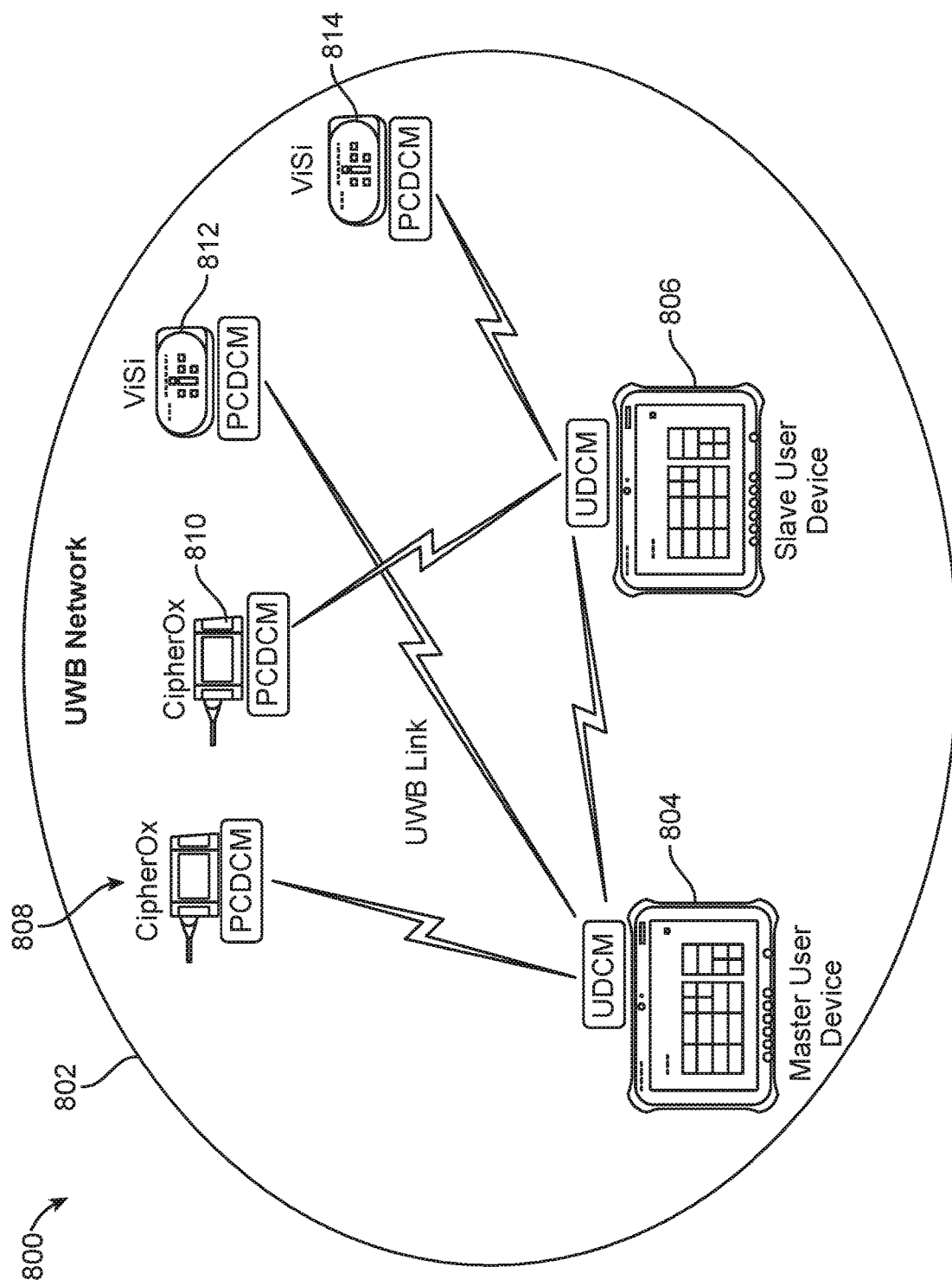
FIG. 8 is a ultra-wideband (UWB) network illustration of a system configuration with two independent UWB links for a user device to two patient care devices with the network having one or more aspects of the presently described subject matter.

FIG. 8 is a schematic illustration of a system 800 having one or more aspects of the presently described subject matter. The system 800 can include an ultra-wide band network 802. In some variations, the ultra-wideband network 802 can include a plurality of devices communicating using one or more shared communication channels. As an example, the plurality of devices can include a master user device 804, one or more slave user devices 806, and one or more patient care devices 808-814. The patient care devices 808-814 can be configured to monitor patients. For example, the one or more patient care devices 808-814 can be configured to monitor an oxygen level, a heartrate, a heartbeat pattern, a temperature, a respiration rate, a blood pressure, or the like.

The master user device 804 can be configured to provide the timing for the ultra-wide band network 802. Patient medical data collected at the patient care devices 808-814 can be transmitted, by the patient care devices 808-814, to an appropriate master user device 804 or slave user device 806.

FIG. 8 shows two patient care devices 808 and 812 in wireless communication with master user device 804. Also shown are two patient care devices 810 and 814 in wireless communication with a slave user device 806. All elements, the master user device 804, the slave user device 806 and the patient care devices 808-814 are all operating within the same ultra-wide band network 802. Interference between these devices can vary significantly. Variations in the interference can be caused by different distances between the different ultra-wide band network elements, localized interference caused by one or more of the ultra-wide band network elements, localized environmental conditions, third-party elements, or the like.

In some variations, one or more of the ultra-wideband network elements can be configured to receive a signal from another one of the one or more ultra-wideband network elements. The one or more ultra-wideband network elements can be configured to determine a received signal strength indication (RSSI) measurement for the signal received from another one of the one or more ultra-wideband network elements. The received signal strength indication measurement can provide an estimation of the input received signal level for proper control of the automatic gain control (AGC) circuitry that a network element needs to apply in order to prevent limiting in the receiver front-end amplification and the analog-to-digital conversion (ADC) process. RSSI is the measure of a relative quality of a received signal to the network element. It is the measurement of power present in the received signal. RSSI output can be, for example, a DC analog level. The RSSI can be sampled by an internal ADC.

In some variations, the one or more ultra-wideband network elements can be configured to determine a received channel power indicator (RCPI). RCPI can be a measure of the received radio frequency power in a selected channel over the preamble to a data packet and the entire received frame of the data packet. In some examples, RCPI can be defined absolute levels of accuracy and resolution with which to compare against.

The received signal strength indicator (RSSI) measurement can provide an estimation of the received signal strength over the wide bandwidth of the UWB signal. The estimation of the received signal strength can include the summation of the desired signal, noise, interference, and the like. In some variations, one or more of the ultra-wideband network elements can be configured to modify the preamble of a data packet. For example, an initial estimation of the desired signal strength can be provided in the preamble of a UWB data packet. Depending on the burst data rate used for the data transmission and the packet burst mode, the preamble can, for example, consist of 30 symbols for the standard preamble and 18 symbols for the burst preamble. The standard and burst preamble can contain a Packet/Frame synchronization sequence and channel estimation symbols. The Packet/Frame synchronization sequence can provide the wideband estimation. The channel estimation can provide a narrowband observation across the entire UWB bandwidth. Packet/Frame synchronization at an ultra-wideband network element can cause the ultra-wideband network element to perform signal processing in the time domain using a correlation algorithm. Channel estimation processing in the frequency domain can use a Fast Fourier Transform (FFT) algorithm for each channel symbol. In some variations, the correlation algorithm can use a known time domain sequence. The channel frequency estimation algorithm can use a known frequency domain response.

In some examples, the Packet/Frame synchronization sequence of the preamble can make up the first 24 symbols of the standard preamble and first 18 symbols of the burst preamble. Each symbol of the Packet/Frame synchronization sequence (for example, 312.5 ns) can consist of a 128 sample time frequency code (TFC) followed by 37 samples of zeros at a sample rate of 528 Msps (Mega samples per second). Time frequency codes can define the single channel frequency operation or the channel frequency hopping for utilizing multiple bands within a band group as defined in Table 2.

Figure 9:
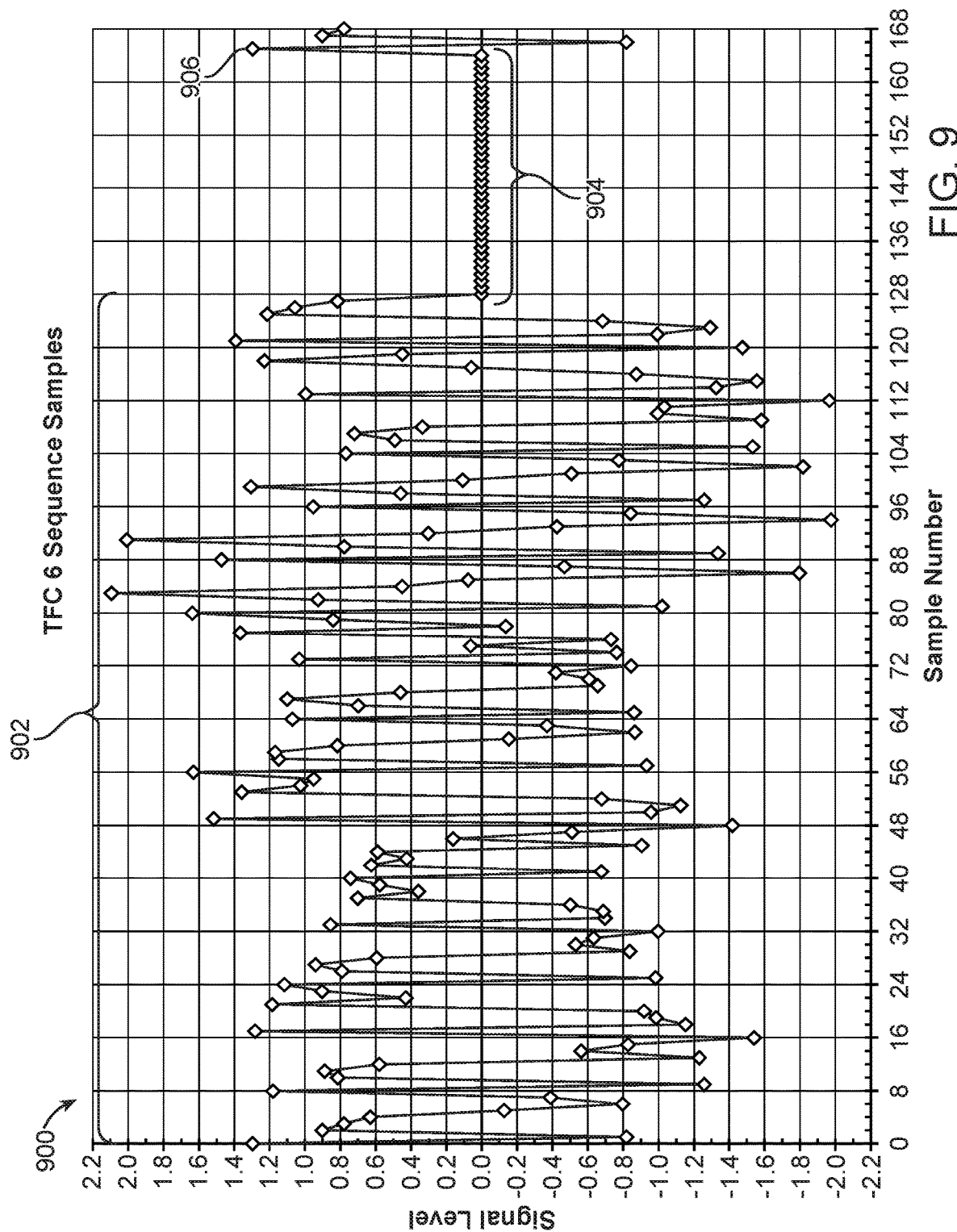
FIG. 9 shows a graph illustrating the sequence for time frequency code (TFC) 6 used in a system having one or more features consistent with the presently described subject matter.

FIG. 9 shows a graph 900 illustrating the sequence 902 for TFC 6, providing a 128 sample code from sample 0 to 127, followed by 37 zeros from sample 128 to 164 (denoted as sequence 904); at sample 165 (denoted at 906) the same sequence 902 followed by sequence 904 repeats. Processing of the Packet/Frame synchronization sequence can provide packet acquisition and detection, coarse carrier frequency estimation, coarse symbol timing, and synchronization within the preamble. Correlation detection of the TFCs can provide the information used for acquisition, detection, estimation, and the like, of the synchronization parameters.

Figure 10:
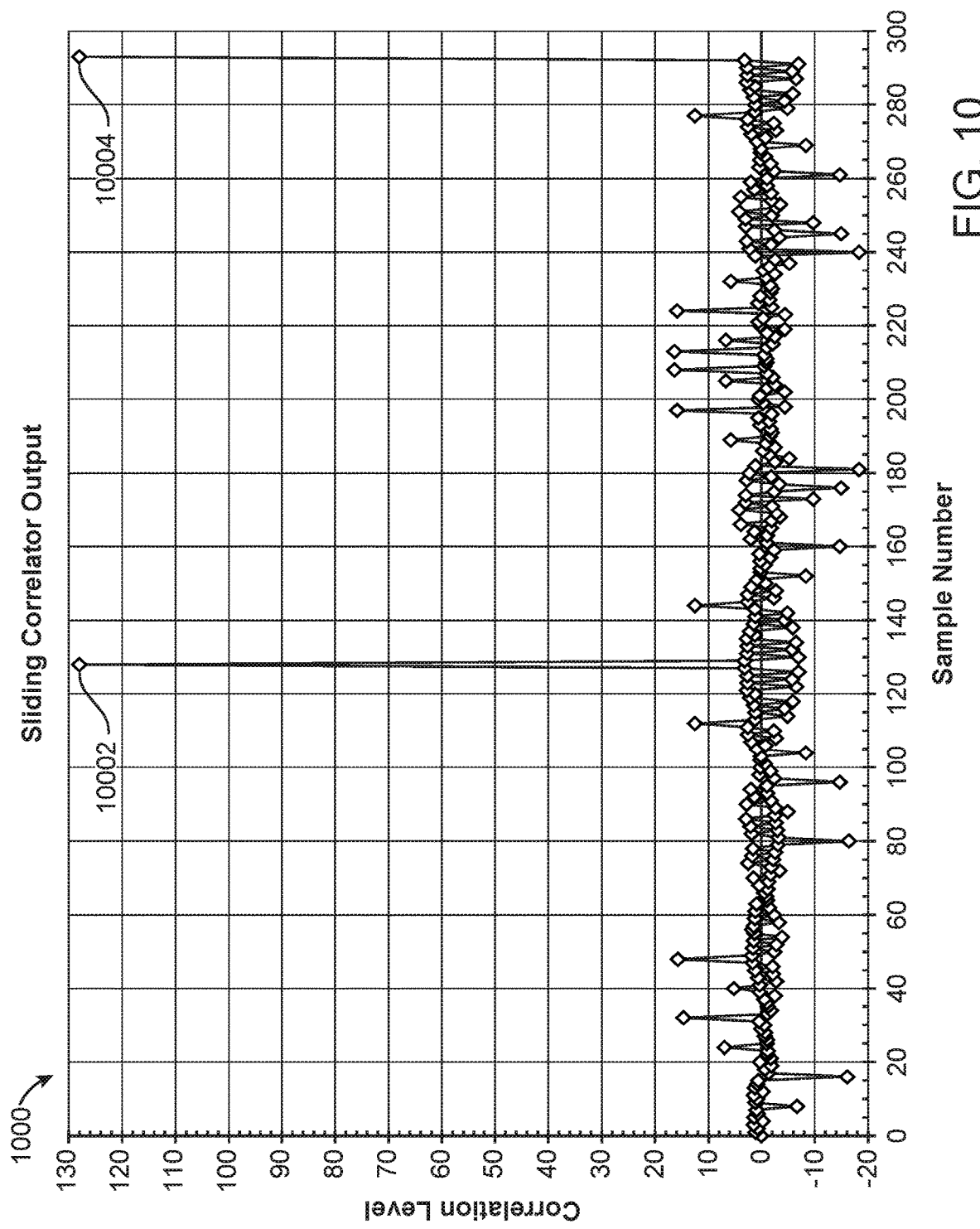
FIG. 10 shows a graph illustrating the sliding correlation output versus time samples for the first and second time frequency code (TFC) 6 sequence of the graph illustrated in FIG. 9.

FIG. 10 shows a graph 1000 illustrating the sliding correlation output versus time samples for the first and second TFC 6 sequence. The first correlation peak 1002 occurs at sample 128, while the second correlation peak 1004 occurs at sample 293, which corresponds to 165 samples between correlation peaks as expected (128 sample TFC plus 37 zero samples equals 165 samples). As shown in FIG. 10 cross correlation results can exist between the correlation peaks as the transmit TFC slides across the TFC correlation reference. Cross correlation magnitude values, shown in FIG. 3, are less than 20, with 88.7% of the cross correlation magnitude values less than or equal to 6 and 93.2% less than or equal to 9. Over these cross-correlation magnitude areas of the correlation signal, an estimation of the noise and interference level can be made, while the correlation peaks can be used to make a wideband estimation of the signal.

For the preamble described above, there are 24 TFC sequences transmitted. The burst preamble, described above, can transmit 12 TFC sequences. The correlation peaks generated by the reception of the multiple TFC sequences can provide the information to estimate the coarse carrier frequency estimation and coarse symbol timing within the preamble. These multiple correlation peaks can also be combined for enhanced wideband estimation. This is particularly the case at the lower received signal levels. In some examples, the impact of the carrier frequency error can be accounted for in the combining of the correlation peaks. When using the ECMA-368 standard, that sets the maximum frequency error requirement equal to ±20 ppm at both the transmitter and receiver, the carrier phase will change across the correlation of the multiple TFCs.

Table 6 gives the maximum carrier phase error introduced between two correlation peaks for the different UWB band groups. As the operational carrier frequency increases, the phase error between correlation peaks also increases. For operation in band groups 3 to 6, the maximum phase error goes from approximately 30 to 46 degrees.

introduced by signal filtering in the transmitter and receiver can also be taken into account when estimating the signal strength.

Figure 11:
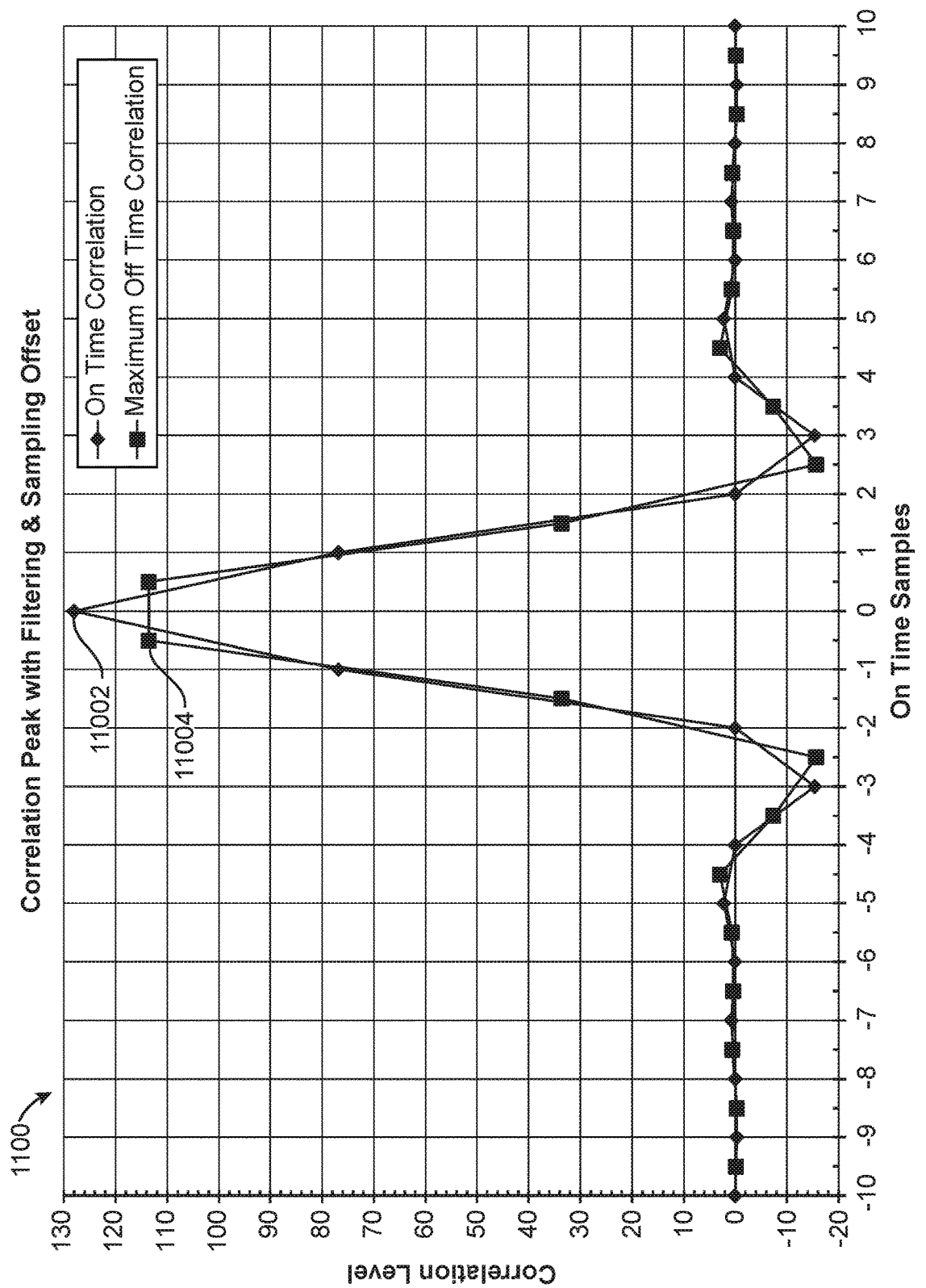
FIG. 11 illustrates a graph showing an example of the time spread of the correlation peak introduced by transmit and received filtering along with timing differences between the transmit and receive signals, using operations having one or more features consistent with the presently described subject matter.

FIG. 11 illustrates a graph 1100 showing an example of the time spread of the correlation peak introduced by transmit and received filtering, using operations having one or more features consistent with the presently described subject matter. The time spread of the correlation peak introduced by transmit and received filtering are the practical effects of bandwidth limitation. The single correlation peak (1002 or 1004) shown in FIG. 10 now spreads across ±6 samples from the correlation peak. In addition, the correlation response shape changes with respect to the sample timing between the transmitter and receiver clock reference. Timing offset of a half of a sampling period can result in the maximum timing offset condition. Graph 1100 shows the different correlation response shapes for on time 1102 and maximum timing offset 1104 conditions. For maximum timing offset 1104, the correlation shape changes significantly with two peak values resulting. The correlation response shape can be used for coarse time synchronization. For signal estimation, three to four samples about the correlation peak can be used in the estimation. The corre-

TABLE 6

Carrier Phase Error across TFC Sequence Correlations

| UWB Band Group | UWB Band Number | Channel Frequencies (MHz) | | | Max Frequency Error (kHz) | | | Max Phase Error (Deg) |
|---|---|---|---|---|---|---|---|---|
| | | Center Freq | Lower Freq | Upper Freq | Center Freq | Lower Freq | Upper Freq | |
| 1 | 1 | 3432 | 3168 | 3696 | 137.28 | 126.72 | 147.84 | 15.44 |
|   | 2 | 3960 | 3696 | 4224 | 158.4 | 147.84 | 168.96 | 17.82 |
|   | 3 | 4488 | 4224 | 4752 | 179.52 | 168.96 | 190.08 | 20.20 |
| 2 | 4 | 5016 | 4752 | 5280 | 200.64 | 190.08 | 211.2 | 22.57 |
|   | 5 | 5544 | 5280 | 5808 | 221.76 | 211.2 | 232.32 | 24.95 |
|   | 6 | 6072 | 5808 | 6336 | 242.88 | 232.32 | 253.44 | 27.32 |
| 3 | 7 | 6600 | 6336 | 6864 | 264 | 253.44 | 274.56 | 29.70 |
|   | 8 | 7128 | 6864 | 7392 | 285.12 | 274.56 | 295.68 | 32.08 |
|   | 9 | 7656 | 7392 | 7920 | 306.24 | 295.68 | 316.8 | 34.45 |
| 4  6 | 10 | 8184 | 7920 | 8448 | 327.36 | 316.8 | 337.92 | 36.83 |
|   | 11 | 8712 | 8448 | 8976 | 348.48 | 337.92 | 359.04 | 39.20 |
|   | 12 | 9240 | 8976 | 9504 | 369.6 | 359.04 | 380.16 | 41.58 |
| 5 | 13 | 9768 | 9504 | 10032 | 390.72 | 380.16 | 401.28 | 43.96 |
|   | 14 | 10296 | 10032 | 10560 | 411.84 | 401.28 | 422.4 | 46.33 |

Two approaches for combining the correlation peaks can include non-coherent or coherent combining. Non-coherent combining can generate the magnitude of the correlation peaks by summing the squared inphase and squared quadrature correlation peaks to remove the carrier phase error.

The more complicated coherent combining approach requires the estimation of the carrier frequency error from the correlation peaks, provided by the shape of the correlation peaks, and using the carrier frequency error to remove the carrier phase drift from the correlation peaks. Besides, introducing additional latency to perform all the carrier phase drift processing, coherent combining, compared to non-coherent combining, will require hardware to estimate the carrier phase drift and generate the cosine and sine signals required to remove the carrier phase drift between the correlation peaks. The non-coherent combining can provide a faster approach with the lowest hardware complexity and power consumption.

When estimating the signal strength, in addition to carrier frequency drift, the time spread of the correlation peak lation samples ±6 from the correlation peak will be excluded from correlation samples used in the wideband noise and interference estimate.

In some variations, 6 symbols used for channel estimation can follow the Packet/Frame synchronization sequence of the preamble. For each of the 6 symbols, a specified Quadrature Phase Shift Keyed (QPSK) modulation phase can modulate each of the FFT subcarriers, except for the six (6) null subcarriers.

Table 7 gives the Quadrature Phase Shift Keyed (QPSK) real and imaginary components that determine the QPSK phase for each of the subcarriers. In addition, Table 7 provides the subcarrier definition within a data section of a packet. Besides providing a channel estimation, the response across the received subcarriers can be used to provide both a wideband and narrowband estimation of received signal power. Subcarrier signal power across the bandwidth can be compared against the individual subcarriers to identify areas of the bandwidth with high interference levels. Measured high interference levels can be compared against the interference measurements from the correlation process.

TABLE 7

Channel Estimation Subcarrier QPSK Modulation

| Symmetric Subcarrier Index | FFT Subcarrier Index | Channel Estimation FFT Components | | | FFT Subcarrier Type |
|---|---|---|---|---|---|
| | | Real | Imag | Phase | |
| −63 | 65 | 0 | 0 | | Null |
| −62 | 66 | 0 | 0 | | Null |
| −61 | 67 | −1 | 1 | 135 | Guard |
| −60 | 68 | −1 | 1 | 135 | Guard |
| −59 | 69 | −1 | 1 | 135 | Guard |
| −58 | 70 | −1 | 1 | 135 | Guard |
| −57 | 71 | −1 | 1 | 135 | Guard |
| −56 | 72 | 1 | −1 | −45 | Data |
| −55 | 73 | 1 | −1 | −45 | Pilot |
| −54 | 74 | −1 | 1 | 135 | Data |
| −53 | 75 | 1 | −1 | −45 | Data |
| −52 | 76 | 1 | −1 | −45 | Data |
| −51 | 77 | 1 | −1 | −45 | Data |
| −50 | 78 | 1 | −1 | −45 | Data |
| −49 | 79 | 1 | −1 | −45 | Data |
| −48 | 80 | −1 | 1 | 135 | Data |
| −47 | 81 | 1 | −1 | −45 | Data |
| −46 | 82 | −1 | 1 | 135 | Data |
| −45 | 83 | −1 | 1 | 135 | Pilot |
| −44 | 84 | 1 | −1 | −45 | Data |
| −43 | 85 | 1 | −1 | −45 | Data |
| −42 | 86 | −1 | 1 | 135 | Data |
| −41 | 87 | −1 | 1 | 135 | Data |
| −40 | 88 | 1 | −1 | −45 | Data |
| −39 | 89 | 1 | −1 | −45 | Data |
| −38 | 90 | 1 | −1 | −45 | Data |
| −37 | 91 | −1 | 1 | 135 | Data |
| −36 | 92 | 1 | −1 | −45 | Data |
| −35 | 93 | −1 | 1 | 135 | Pilot |
| −34 | 94 | −1 | 1 | 135 | Data |
| −33 | 95 | 1 | −1 | −45 | Data |
| −32 | 96 | 1 | −1 | −45 | Data |
| −31 | 97 | 1 | −1 | −45 | Data |
| −30 | 98 | 1 | −1 | −45 | Data |
| −29 | 99 | −1 | 1 | 135 | Data |
| −28 | 100 | −1 | 1 | 135 | Data |
| −27 | 101 | 1 | −1 | −45 | Data |
| −26 | 102 | 1 | −1 | −45 | Data |
| −25 | 103 | 1 | −1 | −45 | Pilot |
| −24 | 104 | −1 | 1 | 135 | Data |
| −23 | 105 | 1 | −1 | −45 | Data |
| −22 | 106 | 1 | −1 | −45 | Data |
| −21 | 107 | 1 | −1 | −45 | Data |
| −20 | 108 | −1 | 1 | 135 | Data |
| −19 | 109 | 1 | −1 | −45 | Data |
| −18 | 110 | −1 | 1 | 135 | Data |
| −17 | 111 | 1 | −1 | −45 | Data |
| −16 | 112 | 1 | −1 | −45 | Data |
| −15 | 113 | −1 | 1 | 135 | Pilot |
| −14 | 114 | −1 | 1 | 135 | Data |
| −13 | 115 | −1 | 1 | 135 | Data |
| −12 | 116 | 1 | −1 | −45 | Data |
| −11 | 117 | 1 | −1 | −45 | Data |
| −10 | 118 | −1 | 1 | 135 | Data |
| −9 | 119 | 1 | −1 | −45 | Data |
| −8 | 120 | −1 | 1 | 135 | Data |
| −7 | 121 | 1 | −1 | −45 | Data |
| −6 | 122 | −1 | 1 | 135 | Data |
| −5 | 123 | −1 | 1 | 135 | Pilot |
| −4 | 124 | 1 | −1 | −45 | Data |
| −3 | 125 | −1 | 1 | 135 | Data |
| −2 | 126 | 1 | −1 | −45 | Data |
| −1 | 127 | 1 | −1 | −45 | Data |
| 0 | 0 | 0 | 0 | | Null |
| 1 | 1 | 1 | 1 | 45 | Data |
| 2 | 2 | 1 | 1 | 45 | Data |
| 3 | 3 | −1 | −1 | −135 | Data |
| 4 | 4 | 1 | 1 | 45 | Data |
| 5 | 5 | −1 | −1 | −135 | Pilot |
| 6 | 6 | −1 | −1 | −135 | Data |
| 7 | 7 | 1 | 1 | 45 | Data |
| 8 | 8 | −1 | −1 | −135 | Data |
| 9 | 9 | 1 | 1 | 45 | Data |
| 10 | 10 | −1 | −1 | −135 | Data |
| 11 | 11 | 1 | 1 | 45 | Data |
| 12 | 12 | 1 | 1 | 45 | Data |
| 13 | 13 | −1 | −1 | −135 | Data |
| 14 | 14 | −1 | −1 | −135 | Data |
| 15 | 15 | −1 | −1 | −135 | Pilot |
| 16 | 16 | 1 | 1 | 45 | Data |
| 17 | 17 | 1 | 1 | 45 | Data |
| 18 | 18 | −1 | −1 | −135 | Data |
| 19 | 19 | 1 | 1 | 45 | Data |
| 20 | 20 | −1 | −1 | −135 | Data |
| 21 | 21 | 1 | 1 | 45 | Data |
| 22 | 22 | 1 | 1 | 45 | Data |
| 23 | 23 | 1 | 1 | 45 | Data |
| 24 | 24 | −1 | −1 | −135 | Data |
| 25 | 25 | 1 | 1 | 45 | Pilot |
| 26 | 26 | 1 | 1 | 45 | Data |
| 27 | 27 | 1 | 1 | 45 | Data |
| 28 | 28 | −1 | −1 | −135 | Data |
| 29 | 29 | −1 | −1 | −135 | Data |
| 30 | 30 | 1 | 1 | 45 | Data |
| 31 | 31 | 1 | 1 | 45 | Data |
| 32 | 32 | 1 | 1 | 45 | Data |
| 33 | 33 | 1 | 1 | 45 | Data |
| 34 | 34 | −1 | −1 | −135 | Data |
| 35 | 35 | −1 | −1 | −135 | Pilot |
| 36 | 36 | 1 | 1 | 45 | Data |
| 37 | 37 | −1 | −1 | −135 | Data |
| 38 | 38 | 1 | 1 | 45 | Data |
| 39 | 39 | 1 | 1 | 45 | Data |
| 40 | 40 | 1 | 1 | 45 | Data |
| 41 | 41 | −1 | −1 | −135 | Data |
| 42 | 42 | −1 | −1 | −135 | Data |
| 43 | 43 | 1 | 1 | 45 | Data |
| 44 | 44 | 1 | 1 | 45 | Data |
| 45 | 45 | −1 | −1 | −135 | Pilot |
| 46 | 46 | −1 | −1 | −135 | Data |
| 47 | 47 | 1 | 1 | 45 | Data |
| 48 | 48 | −1 | −1 | −135 | Data |
| 49 | 49 | 1 | 1 | 45 | Data |
| 50 | 50 | 1 | 1 | 45 | Data |
| 51 | 51 | 1 | 1 | 45 | Data |
| 52 | 52 | 1 | 1 | 45 | Data |
| 53 | 53 | 1 | 1 | 45 | Data |
| 54 | 54 | −1 | −1 | −135 | Data |
| 55 | 55 | 1 | 1 | 45 | Pilot |
| 56 | 56 | 1 | 1 | 45 | Data |
| 57 | 57 | −1 | −1 | −135 | Guard |
| 58 | 58 | −1 | −1 | −135 | Guard |
| 59 | 59 | −1 | −1 | −135 | Guard |
| 60 | 60 | −1 | −1 | −135 | Guard |
| 61 | 61 | −1 | −1 | −135 | Guard |
| 62 | 62 | 0 | 0 | | Null |
| 63 | 63 | 0 | 0 | | Null |
| 64 | 64 | 0 | 0 | | Null |

In some examples, twelve symbols containing the packet header can follow the data packet preamble. The twelve symbols that contain the packet header can also use the orthogonal frequency-divisional multiplexed (OFDM) signal for communications. Packet header subcarriers can be QPSK modulated using the same one hundred data subcarriers, twelve pilot subcarriers and ten guard band subcarriers with six null subcarriers (refer to Table 7 for FFT subcarrier type) as used for the data symbols. Individual subcarrier power levels can provide a narrowband received signal estimation, while the average subcarrier signal power level and variation across the FFT subcarriers can provide a wideband received power estimate. These narrowband and wideband estimations can be compared against previous estimations to determine if interference levels within the communications channels have changed.

For data symbols, the data subcarriers can be modulated by either QPSK or Dual-Carrier Modulation (DCM). DCM is a form of 16 Quadrature Amplitude Modulation (QAM) that introduces amplitude modulation into the data subcarrier. This can result in a signal power difference of 9.54 dB between the minimum and maximum signal power. Average DCM data subcarrier signal power, for all the 16 different data conditions, delivers the same signal power as that obtained for the QPSK modulated data subcarriers. For burst data rates operating in the 53 to 200 Mbps range, data subcarriers can be modulated using QPSK. Data subcarriers can be modulated with DCM for burst data rates operating in the 320 to 480 Mbps range. In some examples, to account for the signal power difference introduced by DCM, the detected four data bits for the data subcarrier can be used to provide the appropriate power weighting to normalize the subcarrier power to the same level. This requires additional processing of the data subcarrier power measurements. To minimize data subcarrier power processing for DCM, the 12 pilot subcarriers which are QPSK modulated can be used for a coarser estimation of the signal power using the same algorithm as used for QPSK data modulation, except with fewer subcarrier measurements. Since DCM does not provide the robust communications against interference, this comparatively simplified pilot subcarrier approach can deliver an adequate estimate without adding significant complexity, power consumption and processing requirements to the system.

The minimum, maximum and average wideband and narrowband subcarrier signal estimation over the entire data packet can be determined by processing the estimations determined over each symbol. Following the data subcarrier signal power estimations, the corrected Viterbi encoded symbol errors in the data communications reception processes can be accumulated to be compared with the measured wideband and narrowband signal levels in estimating the signal and interference levels. Along with the Viterbi symbol correction, the Frame Check Sequence results (Pass/ Fail & number of errors) for the packet can be obtained. In addition, the wideband interference plus noise measurement from the correlation process can be made available.

Figure 12:
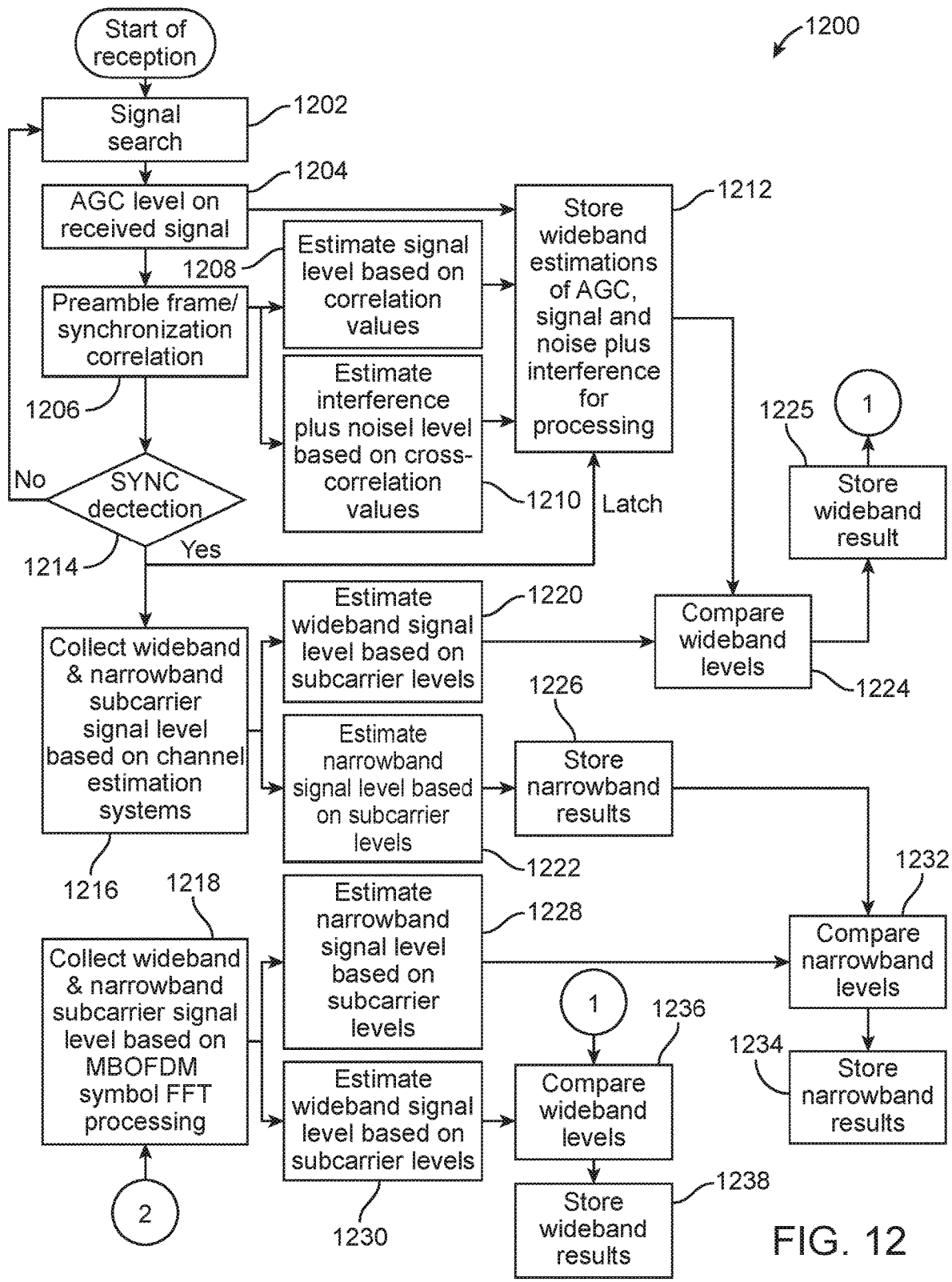
FIG. 12 is a process diagram illustrating a method 1200 that includes one or more features for wideband and narrowband signal, interference and noise estimations at a network node consistent with the presently described subject matter.

FIG. 12 is a process diagram illustrating a method 1200 that includes one or more aspects of the present description. Method 1200 is directed to a receiver wideband and narrowband estimation algorithm process. One or more operations of the method 1200 can be performed by one or more ultra-wideband network elements. For example, the one or more operations of the method 1200 can be performed by each of the ultra-wideband network elements illustrated in FIG. 8, including the user device 804 (functioning as the master node), the user device 806 (functioning as a slave node), and the patient care devices 808-814.

At 1202, the one or more network elements can be configured to search for a signal. The operations conducted at 1202 can be performed by a receiver of the one or more network elements. The receiver can be a standalone receiver and/or part of a transceiver. In some variations, the one or more network elements may comprise multiple receivers configured to detect signals having different signal powers and operating at different carrier frequencies.

At 1204, automatic gain control circuitry can be used to prevent limiting in the receiver front-end amplification and analog-to-digital conversion process. The operations at 1204 can be performed by one or more hardware elements within the one or more network elements. The operations at 1204 can provide a received signal strength indicator (RSSI) measurement that can be used as an estimation of the received signal strength over the wide bandwidth of the ultra-wideband (UWB) signal.

At 1206, the packet/frame synchronization sequence can be read by one or more hardware elements of the one or more hardware elements. At 1208, an estimate of the signal level can be determined based on the correlation values from the packet/frame synchronization sequence. At 1210, an estimate of interference plus noise level can be determined based on the cross-correlation values. The cross-correlation values can be determined by one or more functions as described in the present disclosure.

At 1212, the wideband estimations of automatic gain control, signal and noise plus interference can be stored. The wideband estimations can be stored in memory. The memory can be part of the one or more network elements.

At 1214, in response to no synchronization correlation being present, the process can restart at operation 1202 and the stored wideband estimations can be purged from memory. At 1214, in response to synchronization being detected, the stored wideband estimations can be maintained in memory.

At 1216, in response to detection of synchronization correlation, wideband and narrowband subcarrier signal levels can be collected. The wideband and narrowband subcarrier signal levels can be determined based on the channel estimation systems. Similarly, at 1218, wideband and narrowband subcarrier signal levels can be collected that are based on the MB-OFDM symbol FFT processing.

At 1220, wideband signal levels can be estimated based on the subcarrier levels collected by the operations described at 1216. At 1222, narrowband signal levels can be estimated based on the subcarrier levels collected by the operations described at 1216.

At 1224, the wideband signal levels estimated at 1220 can be compared with the wideband signal level estimations stored in memory at 1212. At 1225, the comparison of the wideband signal level estimations can be stored.

At 1226, the narrowband signal levels estimated at 1222 can be stored in memory.

At 1228, the narrowband signal levels can be estimated based on the subcarrier levels collected at 1218. At 1230, the wideband signal levels can be estimated based on the wideband signal levels obtained at 1218. The signal levels estimated at 1228 and 1230 being based on the MB-OFDM symbol FFT processing that occurs at 1218.

At 1232, narrowband levels estimated at 1226 and 1228 can be compared. At 1234, the comparison of the narrowband results can be stored in memory for comparison against narrowband levels of following OFDM symbols in the transmission. At 1236, wideband levels estimated at 1230 can be compared with the stored results at 1225. At 1238, the wideband results of the comparison at 1236 can be stored in memory for comparison against wideband levels of following OFDM symbols in the transmission.

Figure 13:
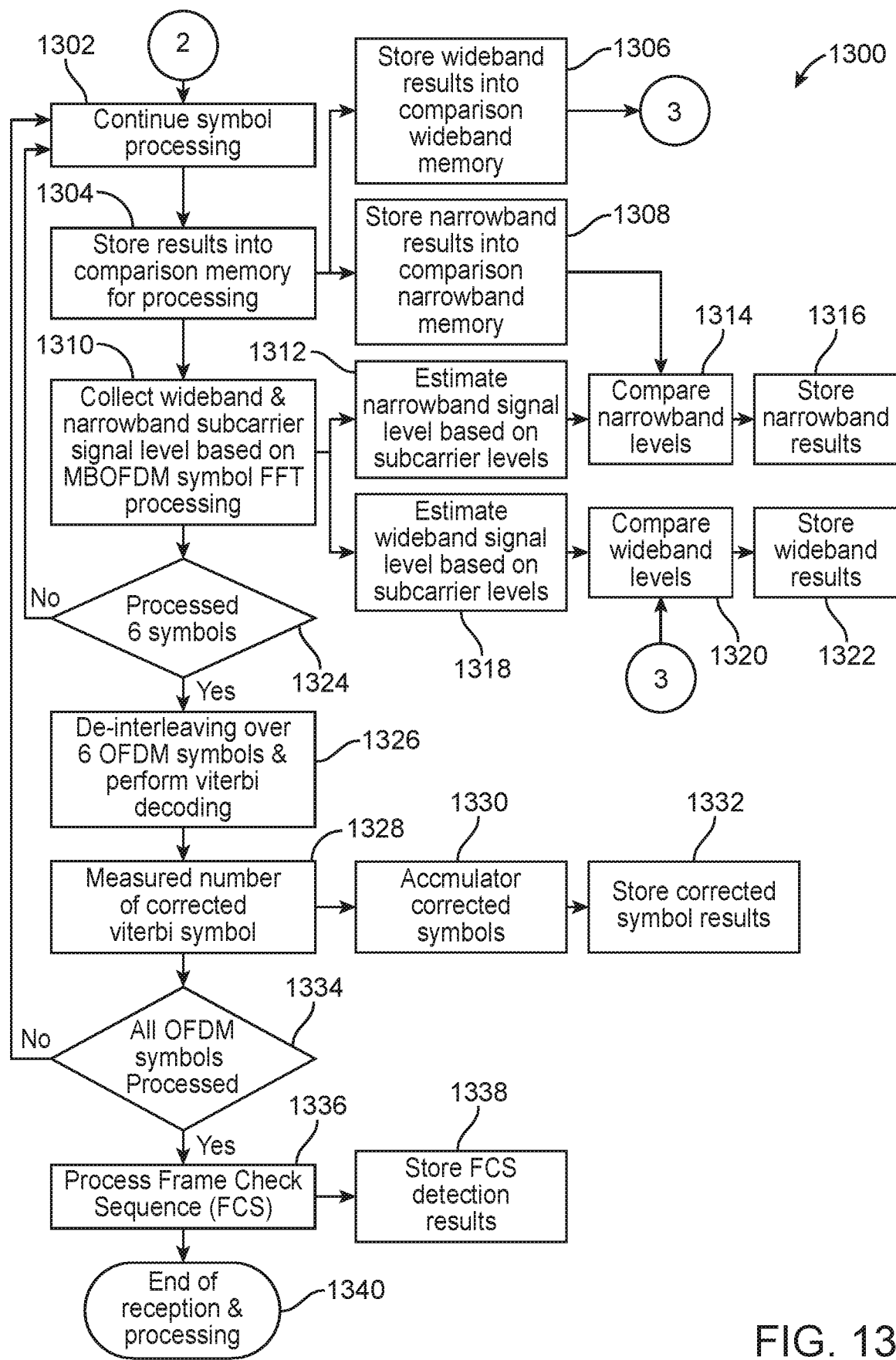
FIG. 13 is the wideband and narrowband signal, interference and noise estimations process continued from FIG. 12 that includes one or more features consistent with the presently described subject matter.

FIG. 13 is a process diagram illustrating a method 1300 that includes one or more aspects of the present description. Method 1300 is directed to one or more aspects additional to the method 1200 illustrated in FIG. 12. One or more operations of the method 1200 can be performed by one or more ultra-wideband network elements. For example, the one or more operations of the method 1300 can be performed by each of the ultra-wideband network elements illustrated in FIG. 8, including the user device 804 (functioning as the master node), the user device 806 (functioning as a slave node), and the patient care devices 808-814.

At 1302, symbol processing can be continued. For example, the symbol processing can be continued from 1218 illustrated in FIG. 12. At 1304, the results from the symbol processing can be stored in memory. The memory can be an electronic memory of the one or more ultra-wide band network elements. The results for wideband results and the results for narrowband results can be stored separately. Separate storage, as used herein, can refer to storing results in different files, different tables of a database, different data objects, in different portions of a data object or the like. In some variations, the narrowband and wideband results can be stored in different electronic memory components. For example, at 1306, wideband results can be stored for comparison with the wideband results previously stored in memory, such as at operation 1238. At 1308, narrowband results can be stored for comparison with the narrowband results previously stored in memory, such as at operation 1234.

At 1310, wideband and narrowband subcarrier signal levels can be collected. The wideband and narrowband subcarrier signal levels can be based on MB-OFDM symbol FFT processing. In some examples, the wideband and narrowband subcarrier signal levels collected at 1310 can be of a different OFDM symbol within the transmission than the wideband and narrowband subcarrier signal levels collected at 1218.

At 1312, the narrowband signal levels can be estimated. The estimation of the narrowband signal levels can be based on the subcarrier levels. At 1314, the estimated narrowband signal levels can be compared with the narrowband results stored into memory at 1308 and/or 1234. At 1316, the results from the comparison at 1314 can be stored into memory. In some examples, storing the results into memory, at 1308 and/or 1316 can include updating the results already stored in memory.

At 1318, the wideband signal levels can be estimated for an OFDM symbol. The estimation of the wideband signal levels can be based on subcarrier levels within the OFDM symbol. At 1320, the wideband signal levels estimated at 1318 can be compared with the wideband signal levels stored in memory at 1306 and 1238. At 1322, the results of the comparison can be stored into memory. In some examples, storing the results into memory can include updating the results already stored in memory.

At 1324, a determination can be made as to whether 6 symbols have been processed. In response to a determination that 6 symbols have not been processed the operations at 1302 can be repeated. In response to a determination that 6 symbols have been processed the operations at 1326 can proceed. The processing of 6 symbols is exemplary. Other numbers of symbols can be processed based on the waveform structure, such as the 6 symbol interleaver depth used in this example. Some packet systems may have varying numbers of symbols, after the packet/frame preamble, that are used for channel estimation.

At 1326, signals can be de-interleaved over 6 OFDM symbols based on the transmitter interleaving depth of 6 OFDM symbols and the Viterbi symbols can be decoded.

At 1328, a measurement of the number of corrected Viterbi symbols can be taken. At 1330, the measurement of the number of corrected Viterbi symbols can be accumulated over a number of iterations of the process represented by the methods 1200 and 1300. At 1332, the corrected symbol measurements can be stored in memory.

At 1334, a determination can be made as to whether all of the OFDM symbols have been processed. In response to a determination that not all of the OFDM symbols have been processed, the operations at 1302 can be repeated. At 1336, in response to a determination that all of the OFDM symbols have been processed a frame check sequence can be processed.

Figure 14:
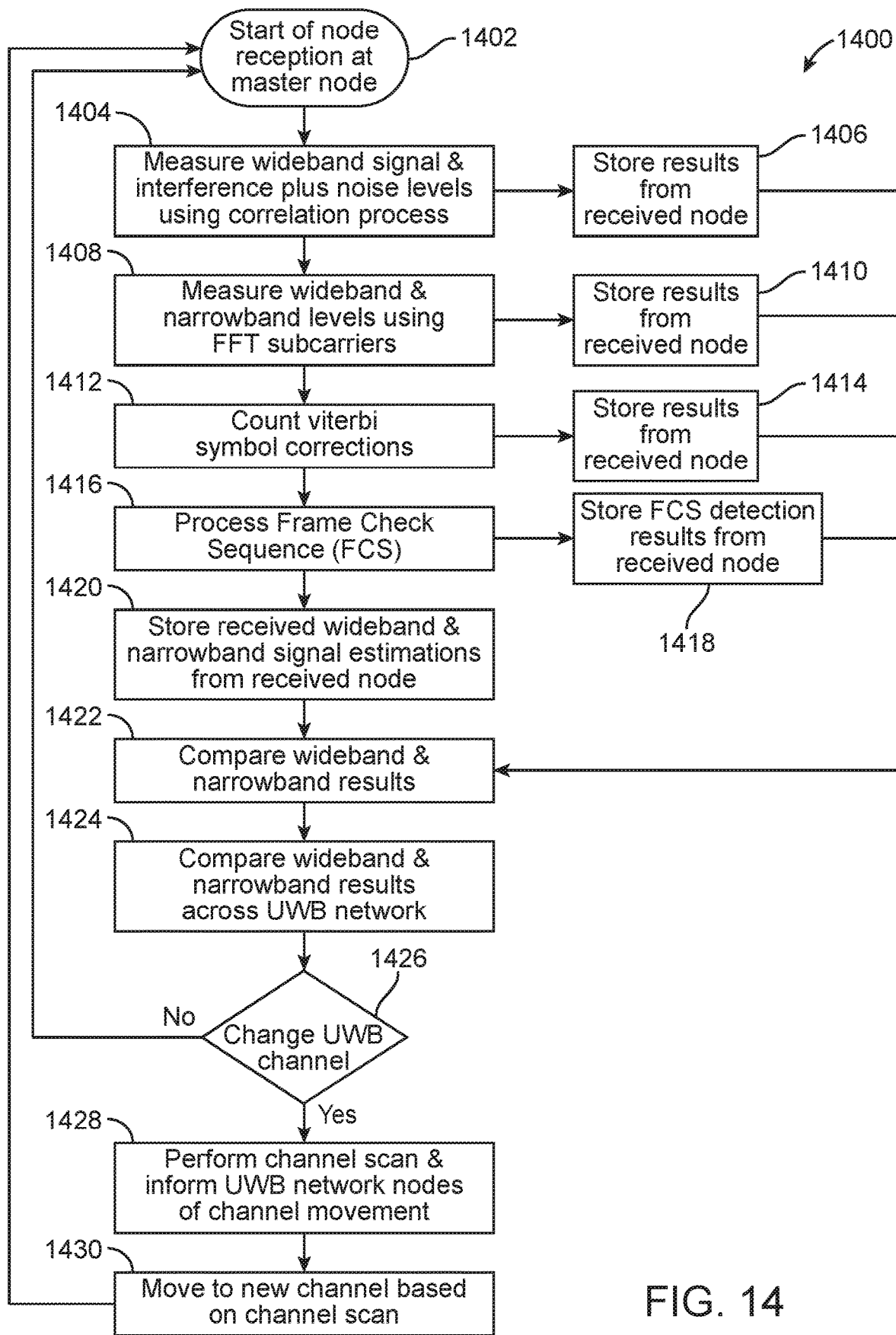
FIG. 14 is a process diagram illustrating the wideband and narrowband signal, interference and noise estimations collection process over the available ultra-wideband (UWB) channels at network node that is a method that includes one or more features consistent with the presently described subject matter.

FIG. 14 is a process diagram illustrating a method 1400 that includes one or more aspects of the present description. Method 1400 is directed to a master node UWB network interference algorithm.

At 1402, interference information measured at one or more network elements using one or more elements of methods 1200 and/or 1300, can be received at a master node. For example, interference information measured by one or more network elements 806-814, illustrated in FIG. 8, can be transmitted to the master node, such as user device 804, illustrated in FIG. 8.

At 1404, a measurement of the wideband signal and interference plus noise levels can be made. The measurement of the wideband signal and the interference plus noise levels can be measured using the correlation process described herein. The measurement of the wideband signal and interference plus noise level can be based on the wideband signal and interference plus noise level measured at a particular slave node of the ultra-wideband network. The measurement of the wideband signal and interference plus noise levels can be performed by the master node. At 1406, the results of the measurement of the wideband signal and interference plus noise levels using the correlation process can be stored in memory of the master node.

At 1408, a measurement of the wideband and narrowband signal levels using FFT subcarriers can be made. The measurement of the wideband and narrowband signal levels using FFT subcarriers can be based on a particular slave node of the ultra-wideband network. Measurement of the wideband and narrowband signal levels using FFT subcarriers can be performed by the master node. At 1410, the results of the measurement of the wideband and narrowband signal levels using FFT subcarriers can be stored in memory.

At 1412, a count of the Viterbi symbol corrections can be performed. The count can be based on a particular slave node of the ultra-wideband network. The count can be performed by the master node. At 1414, the results of the count can be stored in memory of the master node.

At 1416, a Frame Check Sequence (FCS) can be performed. The FCS can be based on a particular slave node. The FCS can be performed by the master node. At 1418, the results of the FCS can be stored in memory of the master node.

At 1420, the wideband and narrowband signal estimations from each node of the ultra-wideband network can be stored in memory.

At 1422, the wideband and narrowband signal estimations stored at 1420 can be compared with the results stored at 1406, 1410, 1414, and 1418.

At 1424, the wideband and narrowband signal estimations from each network element of the ultra-wideband network can be compared. For example, the wideband and narrowband signal estimations from the user devices 804 and 806, and the patient care devices, 808-814, illustrated in FIG. 8 can be compared by the user device 804.

At 1426 a determination can be made as to whether to change the ultra-wideband channel used for communication by the network elements in the ultra-wide band network. In response to determining at 1426 that no change of the channel is required, the process starting at 1402 can be repeated.

At 1428, in response to determining, at 1426, that a change in the ultra-wideband channel is required, a channel scan can be performed by the master node. An instruction to change the channel can be sent by the master node to each slave node.

At 1430, in response to an acknowledgement, received at the master node and from the slave nodes of the ultra-wideband network, the channel used for communication by the network elements of the ultra-wideband network can be changed based on the channel scan.

FIGS. 12-14 show Viterbi symbol correction and Frame Check Sequence (FCS) information being used to estimate the signal and interference levels in the communications channel. This information can be collected at the patient care devices CAMIT modules, such as patient care devices 808, 810, 812 and 814 illustrated in FIG. 8 and one or more slave user device CAMIT modules, such as user module 806 illustrated in FIG. 8. The information can be sent back to the master user device CAMIT module node, for example, user device 804 illustrated in FIG. 8. The master user device CAMIT module can be configured to estimate the signal and interference levels across the ultra-wide band network, based on the received information, and determine if a change in the ultra-wideband network channel should be made.

The master node, such as user device 804 illustrated in FIG. 8, can use the received signal and interference levels received from each of the connected nodes combined with the received signal and interference levels collected at the master node, from the signal reception from each node, to estimate the interference level at each node within the ultra-wideband network, such as ultra-wideband network 802 illustrated in FIG. 8. The master node can process this signal and interference data and determine if the operational channel needs to be changed. If the master node decides on using a different channel, the master node can be configured to scan the list of available channels followed by a message to the connected nodes within the ultra-wideband network instructing them to change to the new channel. For example, with reference to FIG. 8, user device 804 can be configured to send an instruction to the other ultra-wideband network elements to change a channel. Patient care devices 808 and 812 and user device 806 may have a direct connection with the user device 804. Patient care devices 810 and 814 may directly connect to the user device 806, which is a slave node to the master node that is use device 804. User device 806 can be configured to relay the instruction to change channel to the patient care devices 810 and 814. The connected nodes will, in turn, acknowledge this channel change before moving to the selected channel. For example, patient care devices 808 and 812 and user device 806 can directly communicate acknowledgement the change. User device 806 can be configured to relay, to the user device 804, the acknowledgement from patient care devices 810 and 814.

During channel scan, the master node, such as user device 804, can use previous channel information in the scanning algorithm. This can result in channels that have previously been found with significant interference being moved to the bottom of the scan list. In this manner, the master node does not waste time trying to determine whether there is interference on a channel that has previously been known to have significant interference.

One non-limiting exemplary advantage of the presently described subject matter can include improved estimation of interference to communications over a channel in a UWB network.

Figure 15:
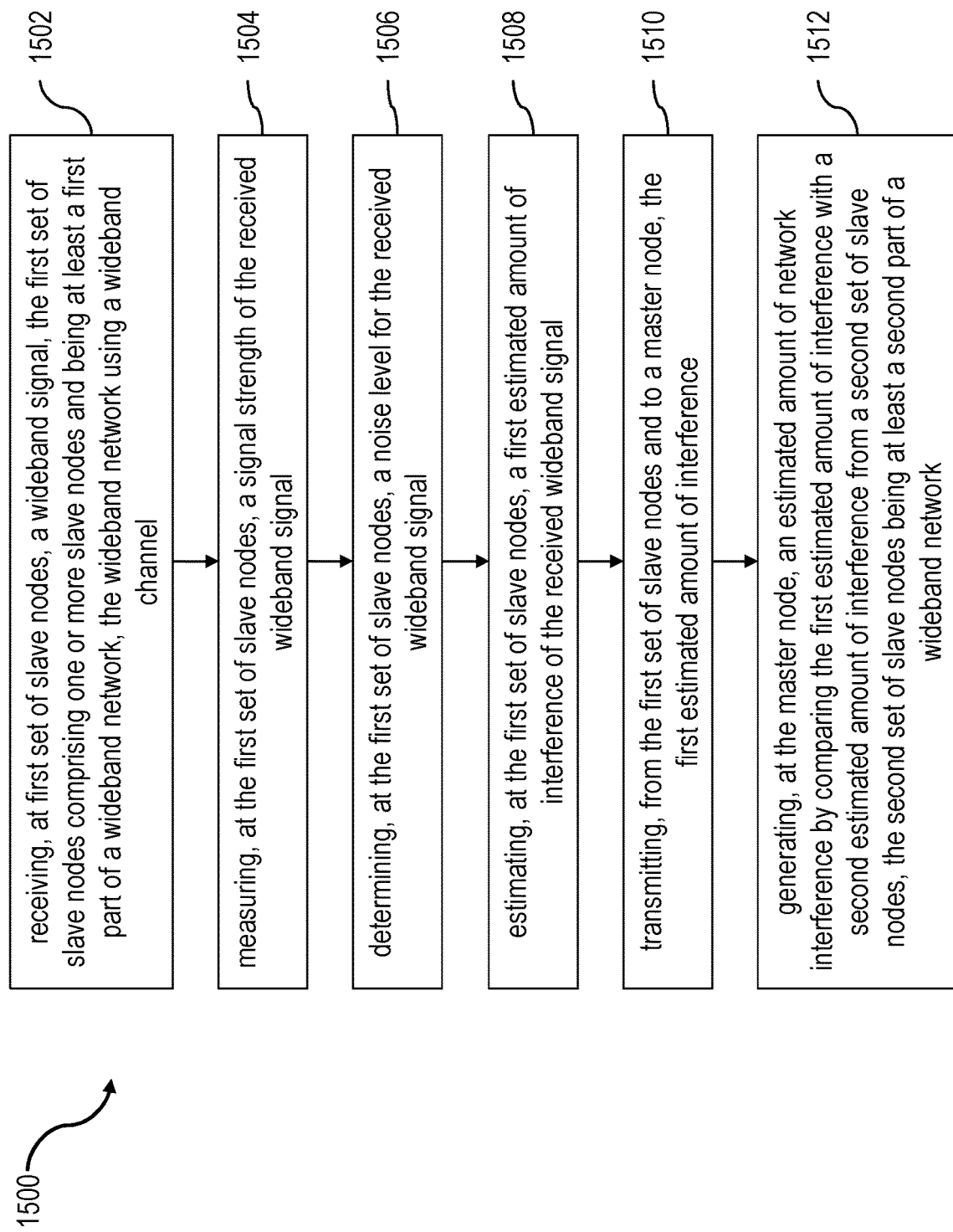
FIG. 15 shows a process flow of a method for estimation of interference and having one or more features consistent with the presently described subject matter.

FIG. 15 shows a process flow of a method 1500 having one or more features consistent with the presently described subject matter. One or more operations described with respect to method 1500 can be performed by one or more of the network elements described with respect to FIG. 8.

At 1502, a wideband signal can be received. The wideband signal can be received by a first set of slave nodes. In some variations, the first set of slave nodes can comprise one or more slave nodes. The first set of slave nodes can be at least a first part of a wideband network. The wideband network can use a wideband channel for communicating between network elements of the wideband network.

In some variations, the first set of slave nodes comprise a patient care device. The master node can comprise a user device. For example, patient care devices 808-814 illustrated in FIG. 8 and user devices 804 and 806 illustrated in FIG. 8.

In some variations, the wideband signal received at the first set of slave nodes can comprise a signal burst preamble.

At 1504, signal strength of the received wideband signal can be measured. The signal strength of the received wideband signals can be measured by the first set of slave nodes. The measurement of the signal strength of the received wideband signals can include signal processing, using one or more of the signal processing techniques described herein.

At 1506, a noise level can be determined for the received wideband signal. The noise level can be determined by the first set of slave nodes. The noise level can be determined using one or more signal processing techniques described herein. In some examples, the determining of the noise level can be based on a number of symbol corrections required for the received wideband signal.

At 1508, a first estimated amount of interference, of the received wideband signal can be estimated. The first estimated amount of interference can be estimated by the first set of network nodes.

At 1510, the first estimated amount of interference can be transmitted from the first set of slave nodes and to a master node.

At 1512, an estimated amount of network interference can be generated. The estimated amount of network interference can be generated by comparing the first estimated amount of interference with a second estimated amount of interference from a second set of slave nodes. The second set of slave nodes can be at least a second part of a wideband network. The estimated amount of network interference can be generated by the master node.

In some variations, the method 1500 can comprise estimating the interference level at the master node. The master node estimates the amount of interference at the master node using the received signal from the slave nodes. The master node estimates amount of interference at the master node by comparing the received signal strength from the slave nodes versus the transmitted signal level by the slave nodes. In addition, the master node can measure signal strength during none reception intervals for an estimation of the node noise level at the master node.

The generated estimated amount of network interference can be further based on the estimated amount of interference of the master node wideband signal.

Figure 16:
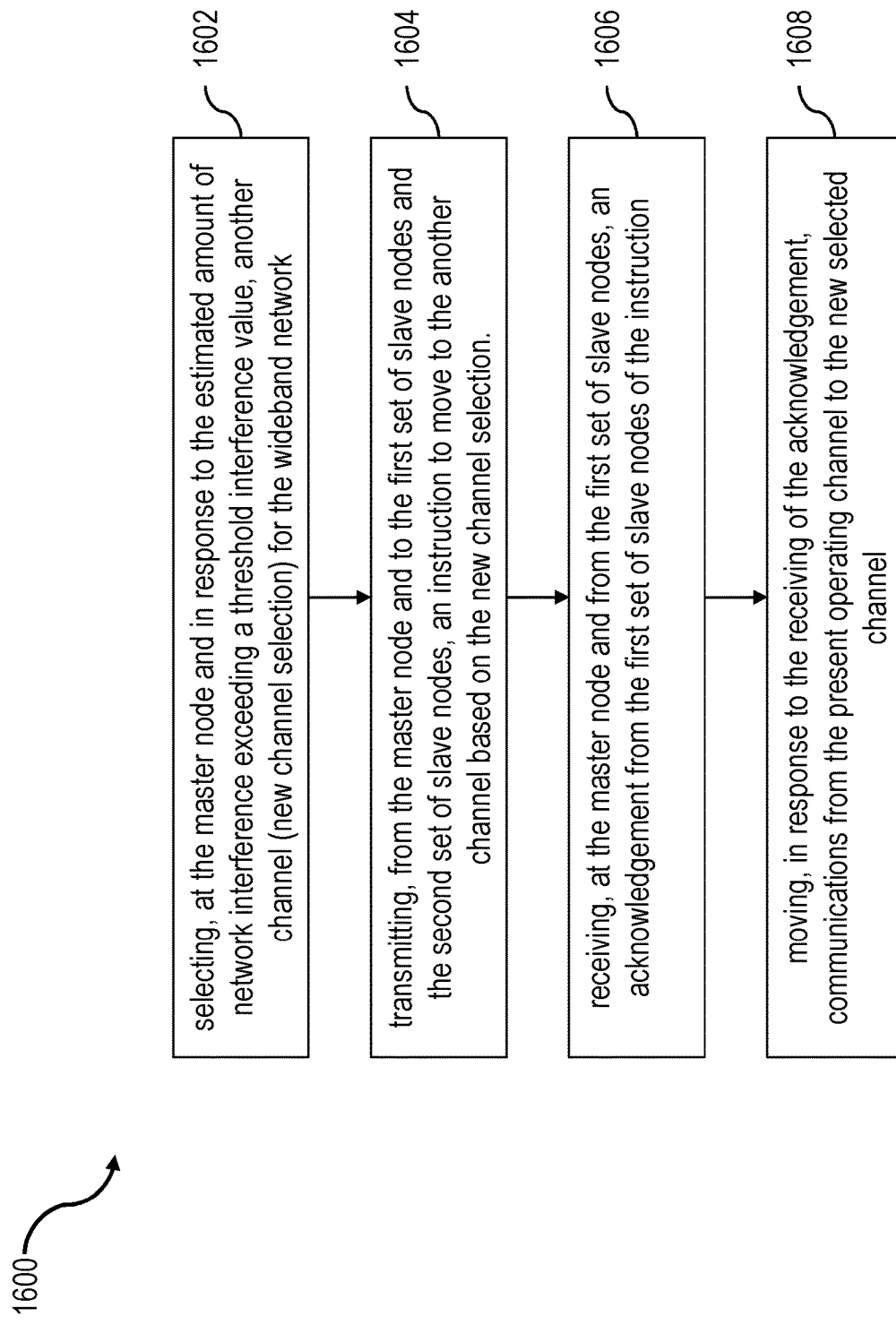
FIG. 16 shows a process flow of a method for operating on the present communications channel or selecting a new communications channel and having one or more features consistent with the presently described subject matter.

FIG. 16 shows a process flow of a method 1600 having one or more features consistent with the presently described subject matter. One or more operations described with respect to method 1600 can be performed by one or more of the network elements described with respect to FIG. 8. The method 1600 can include one or more operations that are supplemental to the operations described for method 1500.

At 1602, another channel (new channel selection) for the wideband network can be selected. The new channel can be used by the one or more network elements to communicate with each other. The new channel can be selected by the master node. The new channel can be selected in response to the estimated amount of network interference on the channel exceeding a threshold interference value.

At 1604, an instruction to move to another channel (new channel selection) can be transmitted. The instruction can be transmitted from the master node and to the first set of slave nodes and the second set of slave nodes.

At 1606, an acknowledgement from the first set of slave nodes of receipt of the instruction can be received. The acknowledgement can be received at the master node and from the first set of slave nodes and the second set of slave nodes.

At 1608, communications can be moved from the present operating channel to the new selected channel. The communications can be moved from the present operating channel to the new selected channel in response to the receipt of the acknowledgement from the first set of slave nodes and the second set of slave nodes.

In one aspect, a burst rate can be selected for a wireless network that is less than the maximum possible burst rate for the wireless network. The wireless network can be an ultra-wideband network. In some examples, the wireless network can facilitate communication between a Patient Care Device (PCD) to a medic's User Device (UD). The PCD can be configured to monitor one or more physical characteristics of a patient associated with the PCD. One or more Close Area Medical Integration Technology (CAMIT) modules can be configured to use the Ultra-Wideband (UWB) Multi-Band Orthogonal Frequency Division Multiplexing (MB-OFDM) together with a selection of a reduced burst data rate, compared to the maximum possible data rate between the CAMIT modules, for communications. The reduced burst rate can be determined using one or more burst rate selection algorithms, as described herein.

Some exemplary use cases for the presently described burst rate selection for wireless communications, is the transmission of medical data. To provide a robust secure wireless transmission of medical data from a Patient Care Device (PCD) monitoring one or more characteristics of a patient, for example, a patient's vitals, to a medic's User Device (UD), the Close Area Medical Integration Technology (CAMIT) modules using the Ultra-Wideband (UWB) Multi-Band Orthogonal Frequency Division Multiplexing (MB-OFDM) can be configured to use a reduced burst data rate selection for communications and a different selection algorithm to select the reduced burst data rate.

TABLE 8

UWB Burst Data Rates

| Data Modulation | Code Rate | Redundant Coding TDS | Redundant Coding FDS | Burst Data Rate (Mbps) | Coded bits per 6 Mod Symbol | Info bits per Symbol |
|---|---|---|---|---|---|---|
| QPSK | 1/3 | 2 | 2 | 53.33 | 300 | 100 |
| QPSK | 1/2 | 2 | 2 | 80.00 | 300 | 150 |
| QPSK | 1/3 | 2 | 1 | 106.67 | 600 | 200 |
| QPSK | 1/2 | 2 | 1 | 160.00 | 600 | 300 |
| QPSK | 5/8 | 2 | 1 | 200.00 | 600 | 375 |
| DCM | 1/2 | 1 | 1 | 320.00 | 1200 | 600 |
| DCM | 5/8 | 1 | 1 | 400.00 | 1200 | 750 |
| DCM | 3/4 | 1 | 1 | 480.00 | 1200 | 900 |

Table 8 shows an example of eight different data rates that are available with the MB-OFDM ultra-wideband waveform with Quadrature Phase Shift Keying (QPSK) modulation being used for the lowest five data burst rates. The five lowest QPSK burst data rates, shown in Table 8, can provide the five different burst data rates by changing a Forward Error Code (FEC) rate (for example, by ⅓, ½, ⅝, or the like), the Time Domain Spreading (TDS) parameters, the Frequency Domain Spreading (FDS) parameters, or the like.

TABLE 9

ECMA-368 Receiver Sensitivity

| Burst Data Rate (Mbps) | Receiver Sensitivity (dBm) from ECMA-368 Standard |
|---|---|
| 53.33 | −80.8 |
| 80.00 | −78.9 |
| 106.67 | −77.8 |
| 160.00 | −75.9 |
| 200.00 | −74.5 |
| 320.00 | −72.8 |
| 400.00 | −71.5 |
| 480.00 | −70.4 |

Table 9 provides the ultra-wideband receiver sensitivity requirements given in the ECMA-368 standard. As shown Table 9, the five lowest data rates can provide a 6 dB change in receiver sensitivity for approximately a 3.7 times change in data burst rate. The lower receiver sensitivity offered by the 53.33 Mbps burst rate provides a 6 dB lower receiver sensitivity, which can be used to overcome path loss variations introduced by the spatial movement of the user device (UD) with respect to the patient care devices (PCD). This lower data burst rate can require more transmission time to communicate the medical information compared to higher data burst rates. However, the lower receiver sensitivity level can provide a higher reliability of the signal being received at the user device from the patient care device. This is especially true when the user device is spatially moving relative to the patient care device. By increasing the reliability of a signal being successfully received at the user device, the number of retransmissions of the same critical medical data can be reduced. Operation at the lower burst data rates can increase the reliability of the communications. Increasing the reliability of the communications can have a net positive impact by providing increased reliability on the data being received at the medic's user device as well as reducing the frequency at which retransmissions have to occur.

The presently described subject matter comprises at least two changes to the burst data rate selection from the ultra-wideband standard implementation. For example, the presently described algorithm can reduce the burst data rate selection from the lowest burst data rate to higher burst data rates associated with QPSK modulation. In some variations, the presently described algorithm can reduce the burst data rate selection from the lowest burst data rate to higher burst data rates associated with QPSK modulation only. The selected burst data rate can be significantly reduced from the 5 maximum to 2 or even 1 burst data rate, based on the system operational environment.

As another example, the user device (UD) that is configured to perform the network coordination, for example, the master node, can be configured to start communication with patient care devices (PCDs) at the lowest available burst data rate for the ultra-wideband network parameters used. This can be an alternative method to selecting the burst data rate which may use collected channel information to select the burst data rate and selects the burst data rate by first selecting a higher burst data rate and moving down to a lower burst data rate. By starting at the lowest burst data rate, the communications link can be configured to support the highest communications path loss capability. Communications path loss can be influenced by spatial movement of the user device (UD) and blockage by objects within the communication path between the user device (UD) and the patient care devices (PCDs).

In some variations, channel information and communications performance at the patient care device and the user device, can be estimated. Estimated channel information and communications performance can be used to determine if the burst data rate can be increased to a higher burst data rate.

Figure 17:
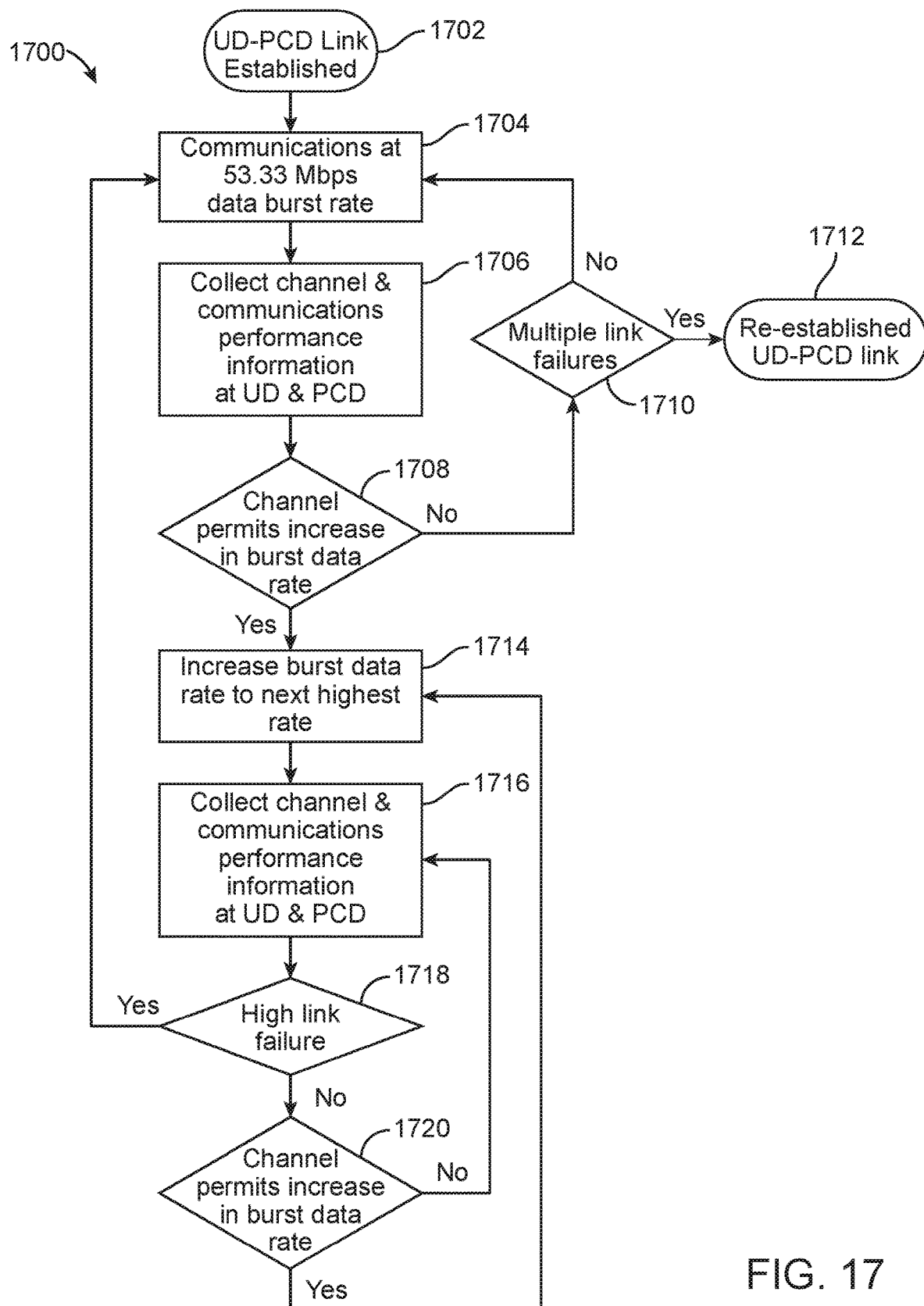
FIG. 17 is a process flow diagram illustrating data burst data rate control for robust communications for higher data throughput traffic such as video communications that includes one or more features consistent with implementations of the current subject matter.

FIG. 17 is a process flow diagram illustrating aspects of a method 1700 having one or more features consistent with implementations of the current subject matter. The method 1700 can be for selection of a burst data rate. The method 1700 can be illustrative of a burst data rate control algorithm. A burst data rate control algorithm can be configured to slowly increase the burst data rate being used between wireless communication devices, based on the collected channel and communications performance information. Degradation in the communications link obtained from this collected information or link failure can cause the wireless communication devices, such as a medic's user device and the patient care device(s), to return to the lowest burst data rate to maintain the communications link between the patient care device(s) and medic's user device. If the communication link is not maintained at the lowest burst data rate, re-establishment of the patient care device(s) and the user device link can be addressed. In the re-establishment condition, the patient care device can find that the user device it was previously connected to is no longer in range, no user device is presently in range or that a new user device has entered into the range of the patient care device and a new link needs to be established between these two network elements.

At 1702, a user device (UD) and patient care device (PCD) communication link can be established. The UD-PCD communication link can be an ultra-wideband communication link. In some variations, the communication link can be initiated by a master node, such as a user device that is configured to manage the communication network on which the user device and the patient care device is communicating over.

At 1704, the user device and/or the patient care device can select the lowest available burst data rate for the communications between the user device and the patient care device. In some variations, the selection can be made by a master node, such as a user device that is configured to manage the communication network on which the user device and the patient care device is communicating over.

At 1706, channel and communications performance information at the user device and/or the patient care device can be collected. In some variations, the collection of data can be done by a master node, such as a user device that is configured to manage the communication network on which the user device and the patient care device is communicating over.

At 1708, a determination can be made as to whether the channel, currently being used for communications between the user device and the patient care device, permits an increase in the burst data rate. In some variations, the determination can be made by a master node, such as a user device that is configured to manage the communication network on which the user device and the patient care device is communicating over.

At 1710, in response to a determination that the channel, currently being used for communications between the user device and the patient care device, does not permit an increase in the burst data rate, a determination can be made as to whether there are multiple communication link failures. If multiple communication link failures are not a problem, the lowest available burst data rate can be maintained.

At 1712, in response to there being multiple communication link failures, a communication link re-establishment procedure can be initiated. The re-establishment procedure can be initiated by a master node, such as a user device. In some variations, the patient care device can be configured to initiate the re-establishment procedure. The patient care device can be configured to re-establish communication links with the same or a different user device.

At 1714, in response to a determination that the channel, currently being used for communications between the user device and the patient care device, does permit an increase in the burst data rate, the burst data rate can be increased to the next highest burst data rate.

At 1716, channel and communications performance information at the user device and/or the patient care device can be collected. In some variations, the collection of data can be done by a master node, such as a user device that is configured to manage the communication network on which the user device and the patient care device is communicating over.

At 1718, a determination of whether there is a high communication link failure can be made. The determination can be made by the user device and/or the patient care device. In response to a determination that there is a high communication link failure, the user device and/or the patient care device can be configured to decrease the burst data rate for the communication channel to the lowest available data burst rate.

At 1720, in response to a determination that high communication link failure is not a problem, a determination can be made as to whether the channel permits an increase in the burst data rate. In some variations, the determination can be made by a master node, such as a user device that is configured to manage the communication network on which the user device and the patient care device is communicating over. In response to a determination that the channel can permit an increase in burst data rate, the operations at 1718 can be performed. In response to a determination that the channel does not permit an increase in burst data rate, the operations at 1716 can be performed.

In some variations, the channel and communications performance information collected at the patient care device and the user device can include, at least: (1) Received Signal Strength out of the FFT detection process with the RF Front-End Receiver Gain; (2) Number of Error Correction out of the Error Detection Process; and/or (3) Packet Failure determined by the incorrect Frame Check Sequence comparison.

In the examples where the user device sets the burst data rate, channel and communications performance information collected at the patient care devices can be sent back to the user device for burst data rate selection in the data packet. Since channel conditions can be different at both ends of the link, burst data rate selection can be configured to use the received channel and communications performance information from the patient care device and user device so that a burst data rate is selected that is compatible with both devices. Since the medical data typically flows from the patient care device to the user device, the reception of the medical data at the user device may have increased critically compared to other data transmission paths. Communications from the user device to the patient care device can typically provide scheduling and acknowledging information to the patient care device and therefore might be less critical than the actual medical data transmitted by the patient care device.

In some variations, the required data transmission rate for medical data transmitted from the patient care device to the user device may be less than 2.56 kbps. A low burst data rate can provide significant data throughput to support this data throughput rate. Furthermore, the packet size for the medical data can be relatively small, for example, in the order of a 2500 bit (320 byte) data packet, and can be packed into half a Medium Access Slot (MAS=256 μs).

The more MASs the higher the network through-put. Using up less time slots in a waveform for a low data rate allows for the time slots to be available for higher data rate applications and/or additional low data rate node connections.

Figure 18:
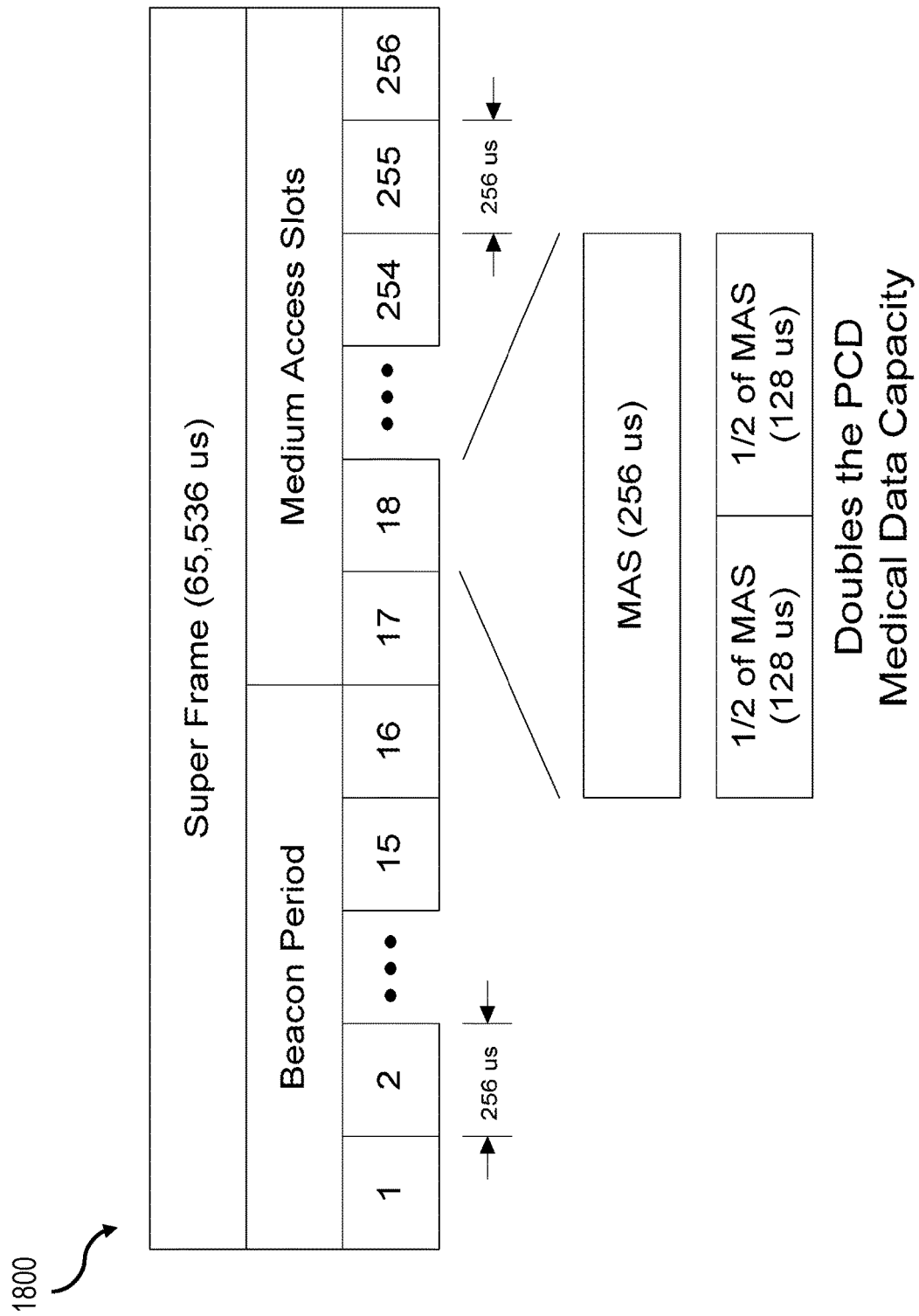
FIG. 18 is an illustration of a modification to the super frame for increased data capacity that includes one or more features consistent with the presently described subject matter.

FIG. 18 is an illustration of a super frame 1800 having one or more features consistent with the presently described subject matter. FIG. 18 shows that a 320 byte data packet with data and waveform overhead requirements of approximately 66 μs, which is less than half of a Medium Access Slot (MAS), to transmit. Increasing the number of data packet to 700 bytes (5.6 kbits) can still enable the burst to fit into the 128 μs time interval of a half a MAS. This reduction in MAS size, allows more users and data capacity, while freeing up more MASs for high data throughput requirements. Table 10 illustrates packet details for the 53.33 Mbps burst rate which is an example of the lowest burst rate in an example of a channel having one or more features consistent with the presently described subject matter.

TABLE 10

Packet Details for 53.33 Mbps Burst Data Rate

| Data | Data & | 53.33 Mbps Packet Details | | |
|---|---|---|---|---|
| Payload Size (bytes) | Overhead Payload (bytes) | Data Throughput (Mbps) | Data Payload (us) | Overhead & Payload (us) |
| 1 | 23 | 1.28 | 5.625 | 18.75 |
| 10 | 32 | 5.12 | 5.625 | 18.75 |
| 30 | 52 | 11.38 | 9.375 | 22.5 |
| 80 | 102 | 21.87 | 16.875 | 30 |
| 320 | 342 | 39.25 | 52.5 | 65.625 |
| 480 | 502 | 42.84 | 76.875 | 90 |
| 700 | 722 | 45.38 | 110.625 | 123.75 |
| 1200 | 1222 | 48.38 | 185.625 | 198.75 |
| 1700 | 1722 | 49.74 | 260.625 | 273.75 |
| 2200 | 2222 | 50.51 | 335.625 | 348.75 |
| 2700 | 2722 | 51.01 | 410.625 | 423.75 |
| 3200 | 3222 | 51.36 | 485.625 | 498.75 |
| 4075 | 4097 | 51.77 | 616.875 | 630 |

Figure 19:
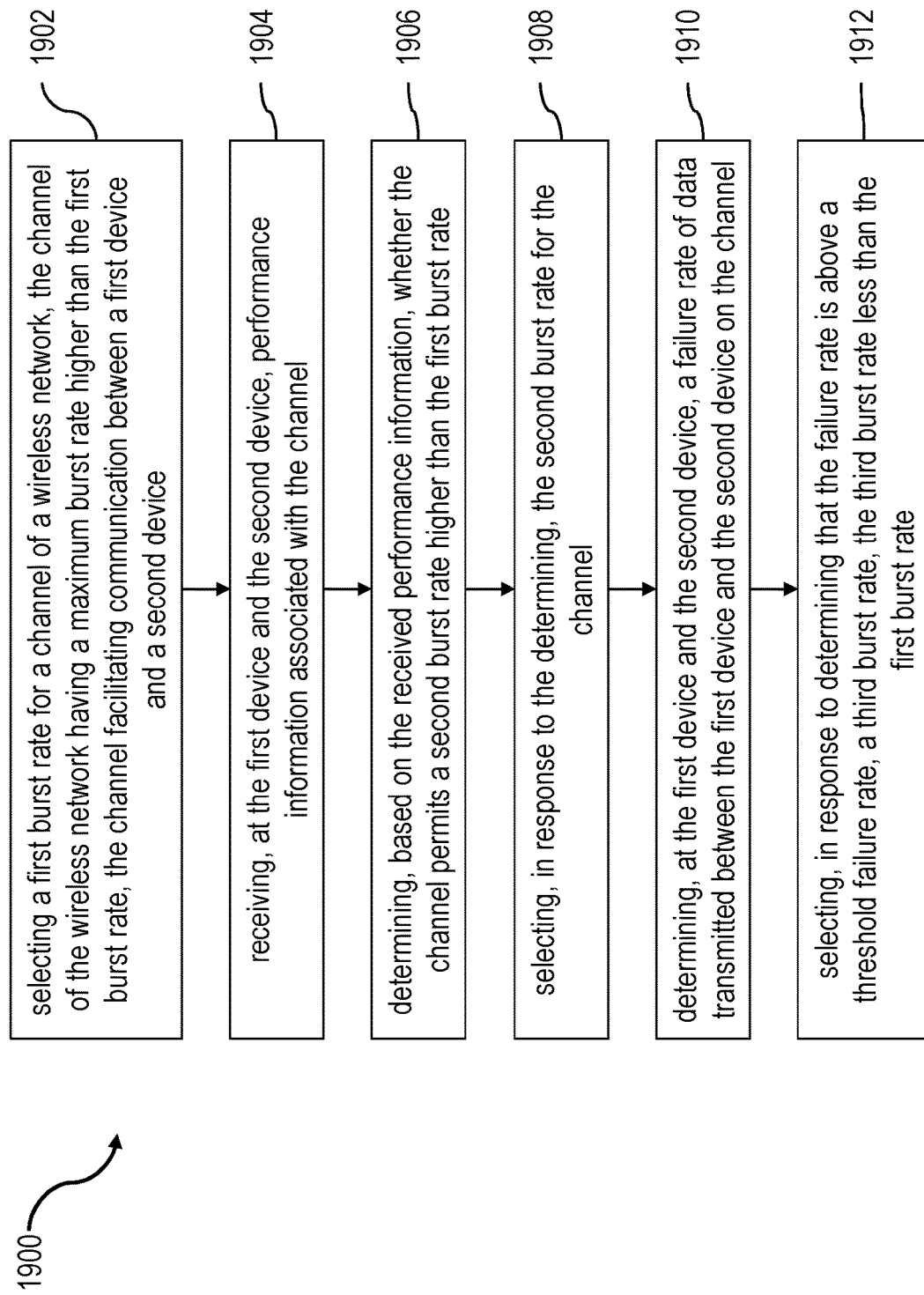
FIG. 19 is a process flow showing a method for selection of the burst data rate based on channel estimation and having one or more features consistent with the presently described subject matter.

FIG. 19 is a process flow showing a method 1900 having one or more features consistent with the presently described subject matter. The operations of method 1900 can be performed by one or more of the features described herein.

At 1902, a first burst rate for a channel of a wireless network can be selected. The first burst rate can be selected by a user device and/or a patient care device communicating over the wireless network. The channel of the wireless network can have a maximum burst rate higher than the first burst rate. The channel can facilitate communication between a first device and a second device.

At 1904, performance information associated with the channel can be received at the first device and/or the second device.

At 1906, a determination of whether the channel permits a second burst rate higher than the first burst rate can be made. The determination can be based on the received performance information.

At 1908, the second burst rate for the channel can be selected in response to the determining.

At 1910, a failure rate of data transmitted between the first device and the second device on the channel can be determined. The failure rate can be determined at the first device and/or the second device.

At 1912, a third burst rate can be selected. The third burst rate can be selected in response to determining that the failure rate is above a threshold failure rate. The third burst rate can be less than the first burst rate.

One none limiting advantage of the presently described subject matter is the ability to reduce the radio frequency (RF) transmit power, thereby reducing heat in the patient care devices and the user devices and increasing battery life.

The operation at the lowest burst data rate for low data rate applications can enable time and frequency redundancy (providing processing gain of 6 dB, for example), combined with Viterbi decoder error correction capability, to reduce the RF transmit power for short range communications links. Any added redundancy to the data signal, such as data spreading or additional repeated symbols, can increase the processing gain that can be used to reduce the RF transmit power. The power control algorithm utilized by the user device(s) and/or patient care device(s) can be configured to override the burst data control. The burst data control could increase the burst data rate based on the improved received signal level for a low data rate application. By reducing the RF transmit power, power consumption and heat generation within the patient care device (PCD) can be reduced, resulting in a longer battery life. In addition, the lower RF transmit power level can improve the Low Probability of Intercept/Low Probability of Detection (LPI/FLPD) performance by driving the signal lower into the noise floor. For communications within a transport vehicle or treatment area, the ultra-wideband network can consist of short range communication devices, for example, patient care devices (PCDs) and user devices (UDs). The PCDs and UDs can be configured to collect and monitor the patent medical data supplied by the PCDs. For short range communications operating at a low data rate, the collected channel and communications performance information can be used with a wideband and narrowband signal strength measurement to provide an estimation of the received signal strength. By comparing the received signal strength estimation against the minimum operational signal strength reference for the low burst data rate, for example, a burst data rate of 53.3 Mbps, with an additional controllable signal margin parameter (for example, in the range of 2 to 3 dB), the recommended reduction in RF transmit power can be determined.

To mitigate small changes in RF transmit power levels that do not significantly reduce power consumption, a power reduction step size of 2 dB or greater is recommended. For the existing UWB waveform with maximum processing gain of 6 dB, the power reduction algorithm provides a range of 2 to 6 dB. Providing additional redundancy to the ultra-wide band waveform through added redundant symbols or data spreading, the maximum processing gain can be expanded to a range of 20 dB. Before communicating the recommended RF transmit power from the receiver to the transmitter, the receiver can be configured to check the Viterbi error correction across the data packet to verify the reliability of the existing communications link. A high number of error corrections can result in recommending no change in the RF transmit power. At the PCD, the recommended RF transmit power reduction level can be sent as an attachment to the patient medical data. At the UD, the recommended RF transmit power reduction level can be sent as an attachment to the acknowledgement packet to one or more received data packets.

One non-limiting exemplary advantage of the presently described subject matter is to provide wireless communication of data with reduced loss, thereby improving the accuracy of the data being received at a UD and reducing the need to retransmit data.

Figure 20:
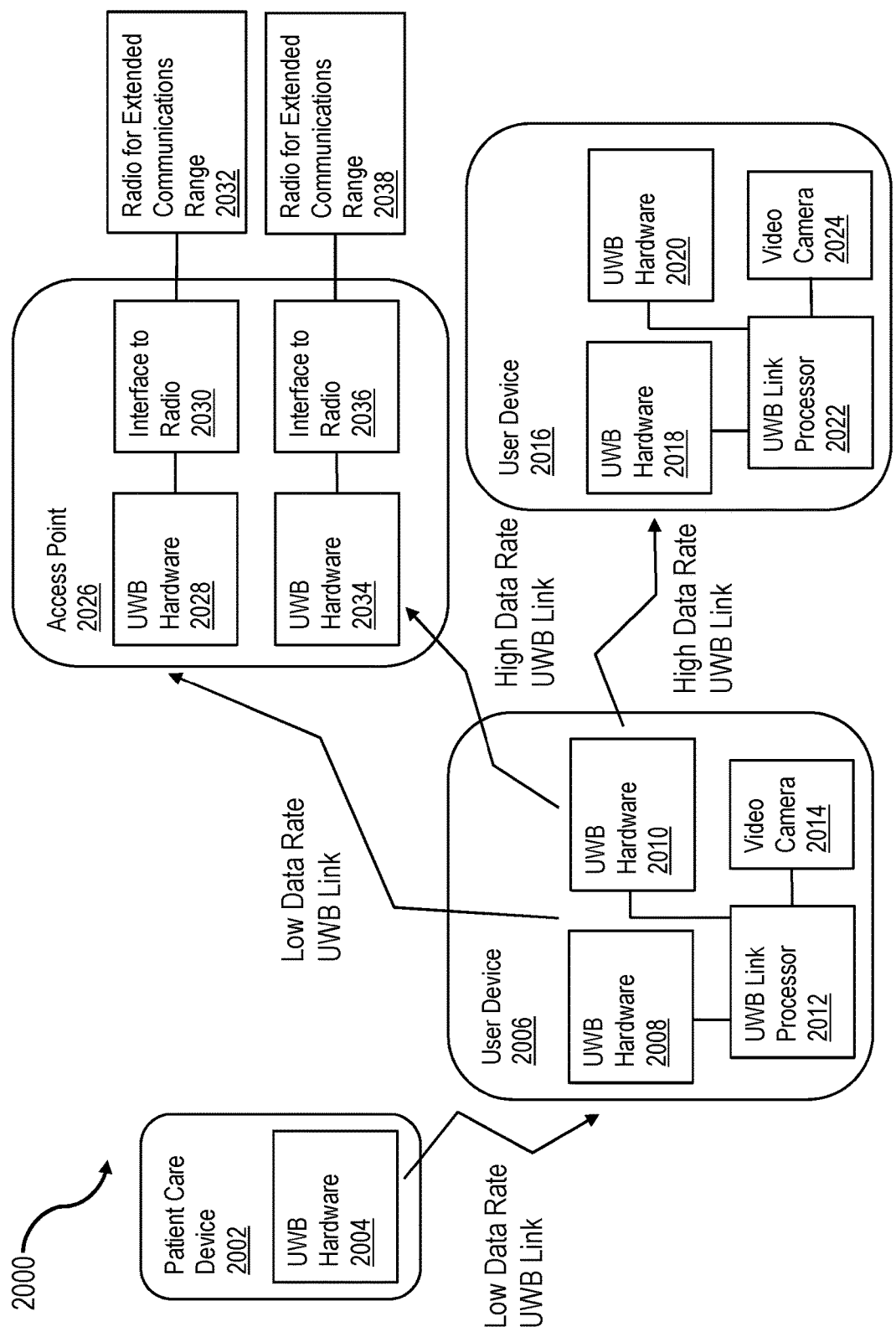
FIG. 20 is an illustration of a system supporting a low and high data throughput ultra-wideband communications and having one or more features consistent with the presently described subject matter.

FIG. 20 is an illustration of a system 2000 having one or more features consistent with the presently described subject matter with the addition of a lower and higher data rate UWB link. The UWB hardware 2004, 2008, 2010, 2018, 2020, 2028 and 2034 of the system 2000 consists of a chipset, transceiver and antenna section given in FIG. 1 that implements the UWB communications link and interface with the respective equipment, such as a patient care device or user device tablet, smartphone or laptop.

The system 2000 can include one or more patient care devices 2002 that are connected on the low data rate UWB link to the user device 2006. The UWB hardware 2004 in the patient care device 2002 communications to the UWB hardware 2008 in the user device 2006 over the lower data rate UWB communications link setup by the UWB link processor 2012 in the user device 2006. The user device 2006 contains two UWB hardware elements that can be configured to provide a low or high data rate UWB link. For the specific system configuration 2000 given in FIG. 20, the user device UWB hardware 2008 provides connection to the low data rate UWB link and the user device UWB hardware 2010 provides connection to the high data rate UWB link for supporting video and other higher data rate applications. The low data rate link provided by the UWB hardware 2008 enables the user device 2006 to support low data rate information to another user device 2016 or/and an access point 2026 connected to a radio 2032 capable of supporting the low data rate information for extended communications range. The high data rate link provided by the UWB hardware 2010 enables the user device 2006 to support video traffic to another user device 2016 or/and an access point 2026 connected to a high data rate radio 2038 for extended communications range. Interface between the low data rate UWB hardware 2028 and the radio 2032 used for extended range communications of low data rate transmission is support by the interface element 2030. Interface between the high data rate UWB hardware 2034 and the radio 2038 used for extended range communications of high data rate transmission is support by the interface element 2036.

Received high data rate information can be generated from an external video device that communicates with the user device using the ultra-wideband waveform discuss throughout or a cable connection, such as a universal serial bus (USB) cable or the link. With video capabilities being built in laptops, tablet, smartphones, and the like, the video capabilities are generated internally at the user device. Internal video generation enables the user to provide added capability without an added device.

The UWB link processor 2012 collects the measured channel information, data requirements, the number of patient devices connected to the user device to determine the allocation of the two UWB hardware elements. Channel information with respect to received signal strength, interference estimation, and burst data rate capability based on the approaches presently described are used to select the operational frequencies for the two UWB link. As shown in system 2000, one UWB link supports low data rate operation with the other UWB link supports high data rate operation. FIG. 20 demonstrates a typical configuration where patient data from a patient care device 2002 is received at a user device 2006 over the low data rate UWB link and the user device 2006 uses the high data rate UWB link to transmit patient pictures and/or video information to another user device 2016 and/or an access point 2026 for transmission over a radio link. The user device 2006 can use the low data rate to transmit low data rate information to an access point 2026 for extended range communications.

This does not preclude the two UWB links being configured in one of the three possible configurations of two low data rate links, one low data rate with one high data rate link, or two high data rate links. A high data rate UWB link can also be used to connect the user device 2006 wirelessly to other equipment over an UWB link that requires a high data throughput link, such as an external video camera with UWB hardware.

For systems requiring short time periods of high data rate traffic, the low data rate UWB link can be used to signal the requirement for a high data rate UWB link. The high data rate UWB link would be placed in a hibernation mode until receiving a command to be activated by a message sent across the low data rate UWB link from the user device to the other units going to receive the high data rate UWB communications message. This approach requires the nodes using the high data rate UWB link to have two UWB hardware elements, which increases size, but can offer significant power consumption reduction, by using the UWB hardware hibernation mode on the high data rate UWB link units.

The UWB link processor 2012 connects the internal video camera 2014 to the UWB hardware 2010 that supports the high data rate UWB link to another user device 2017 and/or an access point 2026. A multicast transmission can be used to send the high data rate information, such as video, to the user device 2016 and access point 2026 in the same transmission to increase data throughput capability. This method can be used to transmit video and/or picture information to other medical staff for supportive help at the point of care, storage of patient information, and support of preparation for the patient arrival at the next medical site. Besides medical applications, this dual UWB link can be used to support multiple links between low data and high data rate sensors, such as for military or commercial applications.

This dual UWB link approach can also be used to provide a relay element that can be cascaded for extended communications range. To optimize the relay element performance, operation at two different channel frequencies combined with external directional antennas would reduce the interference between the two UWB links. Spectral reuse of channel frequencies would be done based on the communications coverage area and location of the different relay elements within the coverage area to mitigate interference. Channel interference measurement approaches presently described can be used to adjust the channel frequencies across the network to mitigate interference and increase data throughput across the UWB network.

Figure 21:
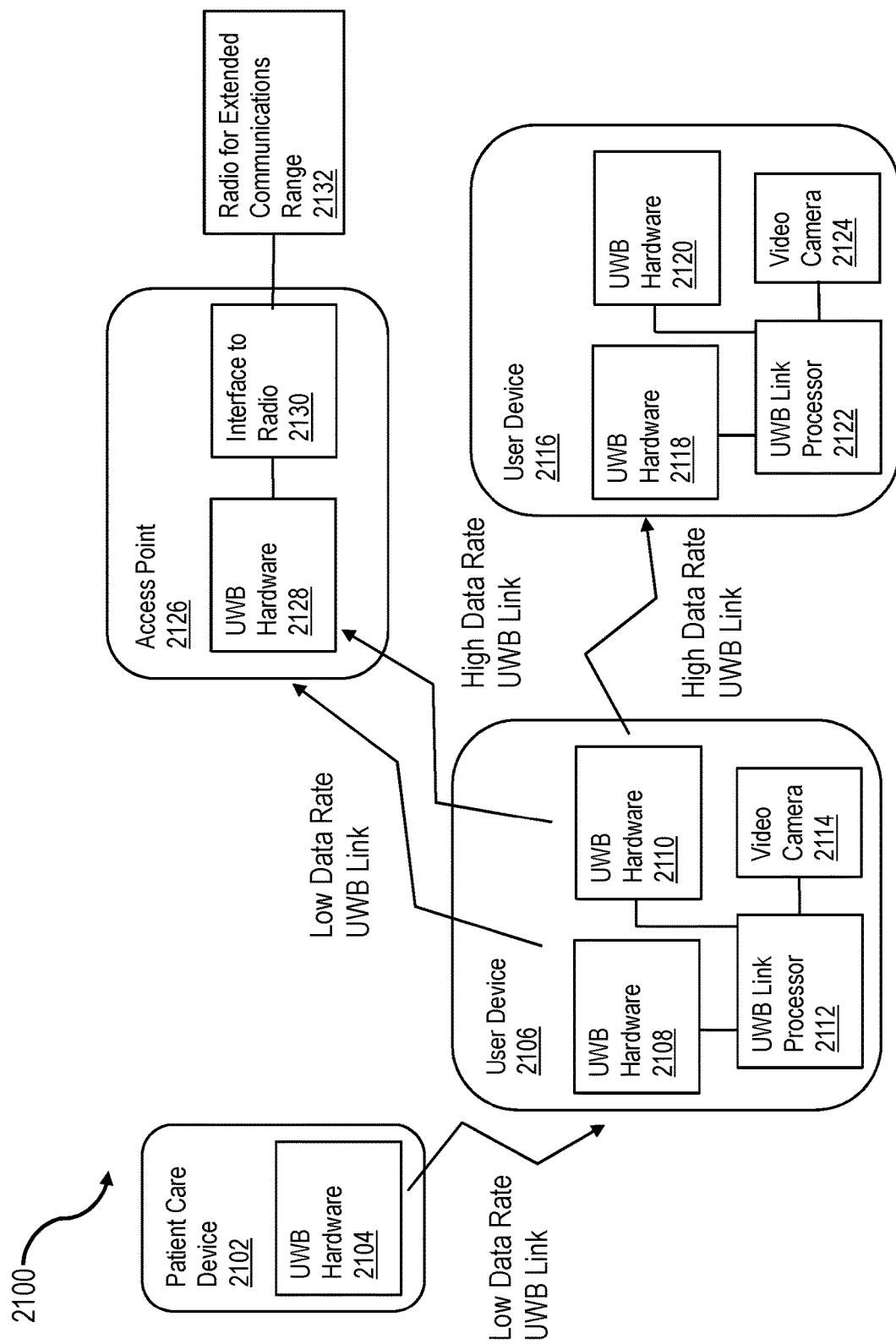
FIG. 21 is an illustration of a system supporting either a low, high or switching between the low and high data throughput ultra-wideband communications to an Access Point and having one or more features consistent with the presently described subject matter.

The system 2100 is one of numerous modifications to system 2000 that can support low and/or high data rate communication links. System 2100 can include one or more patient care devices 2102 that are connected on the low data rate UWB link to the user device 2106. The UWB hardware 2104 in the patient care device 2102 communications to the UWB hardware 2108 in the user device 2106 over the lower data rate UWB communications link setup by the UWB link processor 2112 in the user device 2106. The user device 2106 contains two UWB hardware elements that can be configured to provide a low or high data rate UWB link. For the specific system configuration 2100 given in FIG. 21, the user device UWB hardware 2108 provides connection to the low data rate UWB link and the user device UWB hardware 2110 provides connection to the high data rate UWB link for supporting video and other higher data rate applications. The low data rate link provided by the UWB hardware 2108 enables the user device 2106 to support low data rate information to another user device 2116 or/and an access point 2126 connected to a radio 2132 capable of supporting the low data rate information for extended communications range. For low data rate information in the access point 2126, the UWB hardware 2128 is configured to operate over the low data rate link. The high data rate link provided by the UWB hardware 2110 enables the user device 2106 to support video traffic to another user device 2116 or/and an access point 2126 connected to a radio 2132 capable of supporting the high data rate information for extended communications range. For high data rate information in the access point 2126, the UWB hardware 2128 is configured to operate over the high data rate link. Interface between the UWB hardware 2128 and the radio 2132 used for extended range communications of either low or high data rate transmission is support by the interface element 2130. This single radio 2130 configuration connected to the access point 2126 requires a radio capable of supporting high data rate communications. For this configuration, the low and high data rate information at the access point would be competing for the same radio channel, unless two different radio systems were supplied. An algorithm in the access point would control access to the radio link based on a priority level of the information that needs to be sent. The single UWB hardware 2128 in the access point 2126 can be configured to support a low data rate and high data rate radio as shown in FIG. 21. For this configuration, the UWB hardware 2128 output is routed to the low data rate radio for low data rate transmissions and the high data rate radio for high data rate transmissions. This radio configuration prevents the low and high data rate information from competing for the same radio channel, allowing both transmissions during the same time periods assuming that each radio channel operates on a different carrier frequency to prevent channel interference.

Figure 22:
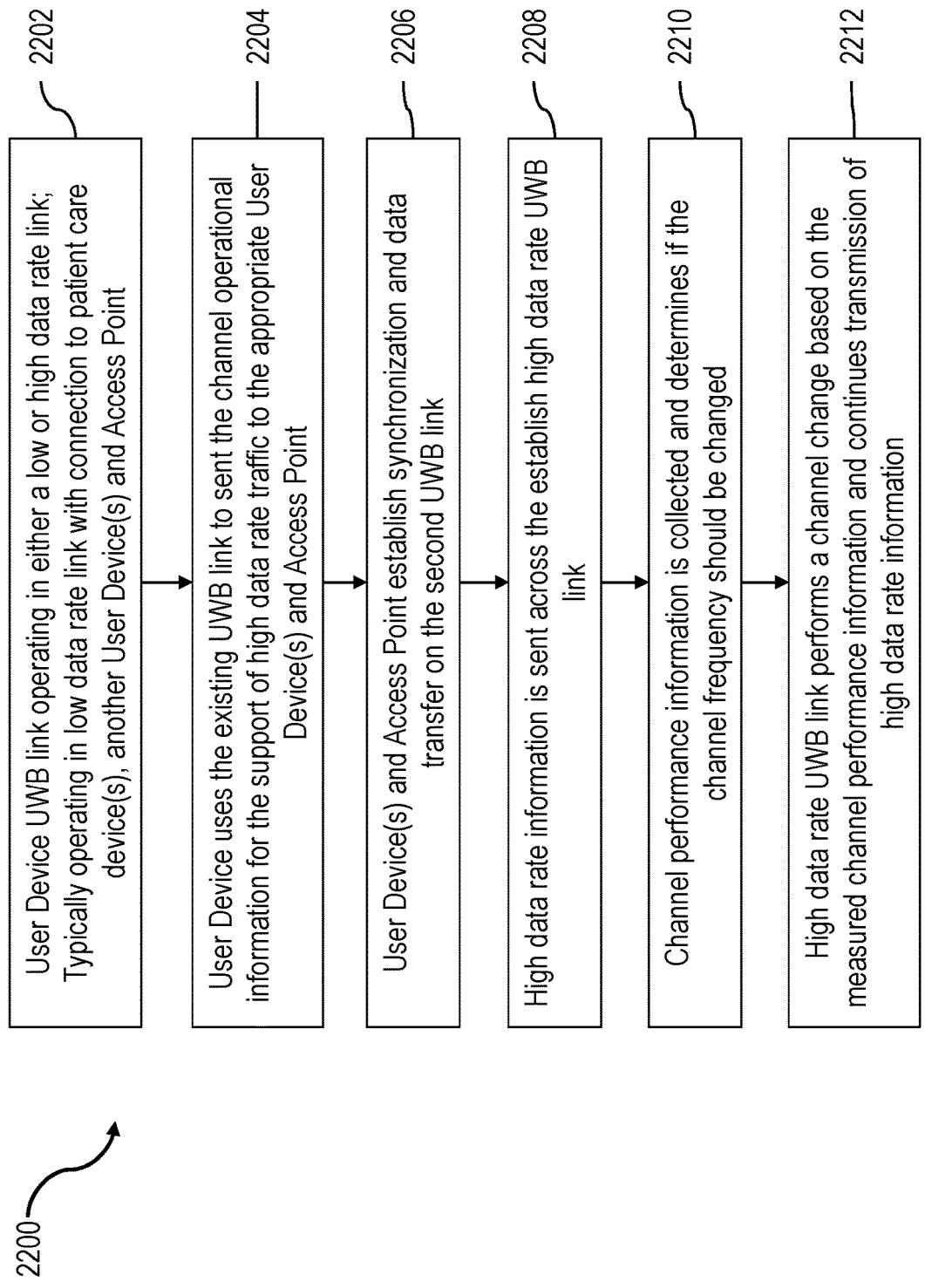
FIG. 22 is a process flow showing a method having one or more features consistent with the presently described subject matter for addressing the two UWB data rate configuration, establishing synchronization and passing channel and low/high data rate operation information in a low and/or high data rate UWB links.

FIG. 22 is a process flow showing a method 2200 having one or more features consistent with the presently described subject matter addressing the two UWB data rate configuration, which typically would be configured in a low and/or high data rate UWB links.

This same approach of switching between low and high data rate transmission using a single UWB hardware element can be easily applied to the use devices. The operations of method 2200 can be performed by one or more of the features described herein.

At 2202, an initial low or high data rate UWB link exists that provides communications to the different nodes within the UWB network. Since the user device for a medical application will typically be connected to patient care devices that are collecting patient data for transmission to the user device, this initial link will typically be a low data rate UWB link. This does not exclude an initial high data rate UWB link within the UWB network.

At 2204, the user device uses the existing UWB link to send the channel operational information for the support of high data rate traffic to the appropriate user device(s) and access point. The access point 2028 shown in FIG. 20 consists of two UWB hardware elements and the access point shown in FIG. 21 consists of one UWB hardware element. Using a single UWB hardware element requires the access point to switch between the low and high data rate UWB link, where the low data rate UWB link provides the channel information to the access point for the high data rate UWB link. By operating on the low data rate UWB link, the channel information for the high data rate link is available at the access point, providing a fast synchronization with the high data rate UWB link.

A dual UWB hardware approach, like shown in FIG. 20 for the access point enables the low data rate UWB link operation to collect channel information that can be used to select the channel with less interference and highest data rate capacity for the high data rate UWB link.

Another approach to the access point network connection allows the UWB hardware to operate in the UWB channel search mode and synchronize with the newly established low or high date rate UWB link. This approach requires less hardware, but will require more time to establish the link to the access point, since the access point does not know the operational channel for the UWB link and must search the UWB channels to locate the channel being used for the UWB link.

At 2206, the high data rate UWB link is established between the different node elements consisting of user devices and access point as shown in FIG. 20, which does not exclude other types of devices with UWB hardware to be connected to the high data rate UWB link network.

At 2208, the high data information is sent across the UWB link between the different node elements consisting of user devices and access point as shown in FIG. 20, which does not exclude other types of devices with UWB hardware to be connected to the high data rate UWB link network.

At 2210, channel information is being collected during the transmit and received operations over the UWB link to determine interference and data rate capacity of the existing operational channel using the previous disclosed approaches. The channel information is processed to determine if a channel change should be made.

At 2212, the high data rate UWB link performs a channel change based on the measured channel performance information and continues transmission of high data rate information when the network is reestablished.

One or more of the features described herein can be performed by one or more processors. The processor(s) can be configured to provide information processing capabilities to one or more computing devices having one or more features consistent with the current subject matter. The computing device(s) can be, for example, a smart device, a telephone, a computer, or the like. Processor(s) may include one or more of a digital processor, an analog processor, a digital circuit designed to process information, an analog circuit designed to process information, a state machine, and/or other mechanisms for electronically processing information. Processors can be a single entity, multiple entities, collocated, or located in separate buildings. In some implementations, the processor(s) can include a plurality of processing units. These processing units can be physically located within the same device, or processor and may represent processing functionality of a plurality of devices operating in coordination. The processor can be configured to execute machine-readable instructions, which, when executed by the processor(s) may cause the processor(s) to perform one or more of the functions described in the present description. The functions described herein may be executed by software; hardware; firmware; some combination of software, hardware, and/or firmware; and/or other mechanisms for configuring processing capabilities on the processor(s).

The processor(s) can be disposed in one or more of the PCD, medic's UD, a server, or the like, and the one or more of the processors can be configured to perform the various features described herein. The processor(s) can be configured to execute machine-readable instructions stored on electronic storage media. The machine-readable instructions, when executed by the processor(s), can cause the processor(s) to perform one or more of the functions described herein. In some variations, one processor disposed at one device may perform a first set of functions and a different processor disposed at a different device may perform a second set of functions, for example, a processor(s) at a UD may perform the bulk of selecting and/or determining the burst data rate for transmission between a PCD and a UD.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A data system comprising:
   at least one processor;
   a memory storing machine-readable instructions which, when executed by the at least one processor, cause the at least one processor to perform one or more operations, the one or more operations comprising:

selecting a first burst rate for a channel of a wireless network, the channel of the wireless network having a maximum burst rate higher than the first burst rate, the channel configured to at least facilitate communication between a first device and a second device;

determining, at the first device and the second device, a performance information associated with the channel, the performance information including a failure rate of data transmitted between the first device and the second device on the channel;

determining, based on the performance information, whether the channel permits a second burst rate higher than the first burst rate;

selecting, in response to the failure rate being below a threshold value the second burst rate for the channel; and selecting, in response to the failure rate being above the threshold value, a third burst rate for the channel, the third burst rate being lower than the first burst rate.

2. The system of claim 1, wherein the first device is a patient care device.

3. The system of claim 2, wherein the second device is a user device or another patient care device.

4. A method comprising:

selecting a first burst rate for a channel of a wireless network, the channel of the wireless network having a maximum burst rate higher than the first burst rate, the channel configured to at least facilitate communication between a first device and a second device;

determining, at the first device and the second device, a performance information associated with the channel, the performance information including a failure rate of data transmitted between the first device and the second device on the channel;

determining, based on the performance information, whether the channel permits a second burst rate higher than the first burst rate;

selecting, in response to the failure rate being below a threshold value, the second burst rate for the channel; and selecting, in response to the failure rate being above the threshold value, a third burst rate for the channel, the third burst rate being lower than the first burst rate.

5. The method of claim 4, wherein the first device is a patient care device.

6. The method of claim 5, wherein the second device is a user device or another patient care device.

\* \* \* \* \*